United States Patent
Faulkner

(10) Patent No.: US 9,590,409 B2
(45) Date of Patent: Mar. 7, 2017

(54) UNDERGROUND MODULAR HIGH-VOLTAGE DIRECT CURRENT ELECTRIC POWER TRANSMISSION SYSTEM

(71) Applicant: Roger W. Faulkner, Melrose, MA (US)

(72) Inventor: Roger W. Faulkner, Melrose, MA (US)

(73) Assignee: Alevo International, S.A., Martigny, Valais (CH)

( * ) Notice: Subject to any disclaimer, the term of this patent is extended or adjusted under 35 U.S.C. 154(b) by 167 days.

(21) Appl. No.: 14/222,752

(22) Filed: Mar. 24, 2014

(65) Prior Publication Data

US 2014/0202765 A1   Jul. 24, 2014

Related U.S. Application Data

(63) Continuation of application No. 13/395,886, filed as application No. PCT/US2010/048719 on Sep. 14, 2010, now Pat. No. 8,796,552.

(Continued)

(51) Int. Cl.
*H02G 15/02* (2006.01)
*H02G 9/00* (2006.01)
(Continued)

(52) U.S. Cl.
CPC ............. *H02G 15/08* (2013.01); *H02G 1/08* (2013.01); *H02G 9/06* (2013.01); *H02G 15/20* (2013.01); *H02G 15/24* (2013.01); *Y02E 40/648* (2013.01)

(58) Field of Classification Search
CPC  H02G 15/08; H02G 1/08; H02G 9/06; H02G 15/20; H02G 15/24; Y02E 40/648
(Continued)

(56) References Cited

U.S. PATENT DOCUMENTS 417,992 A    12/1889  Dell
2,706,496 A * 4/1955  Bond .................. F16L 3/18
                                              138/113
(Continued)

FOREIGN PATENT DOCUMENTS

DE    102004056489 A1   5/2006

OTHER PUBLICATIONS

International Preliminary Report on Patentability of International Application No. PCT/US2010/048719 mailed Mar. 20, 2012, 9 pages.
(Continued)

*Primary Examiner* — Sherman Ng
(74) *Attorney, Agent, or Firm* — Brian M. Dingman; Dingman IP Law, PC

(57) ABSTRACT

High capacity (10 GW, for example) passively cooled non-superconducting underground high voltage direct current electric power transmission lines (100) of very low loss (1% per 1,000 km, for example) and competitive cost. The transmission lines (100) include segment modules (101) linked together with compliant splice modules (102) between the segments (101), typically installed in a protective conduit (103). The segment modules (101) include relatively rigid pipe-shaped conductors (117) insulated by pipe-like solid insulating layers (131) to form segment modules (101) that resemble pipe. The segment modules (101) are linked together through radially and axially compliant splice modules (102) to form the transmission line (100). There are preferably wheels (300) deployed to ease insertion and removal of the assembled segment modules (101) and splice modules (102) into the conduit (103), to center each segment module (101) within the conduit (103), and/or to provide motive force and/or braking to allow the (Continued)

assembled segment modules (101) and splice modules (102) to be installed on a slope.

19 Claims, 40 Drawing Sheets

Related U.S. Application Data

(60) Provisional application No. 61/242,159, filed on Sep. 14, 2009, provisional application No. 61/259,167, filed on Nov. 7, 2009, provisional application No. 61/371,722, filed on Aug. 8, 2010, provisional application No. 61/371,924, filed on Aug. 9, 2010.

(51) Int. Cl.
| | |
|---|---|
| *H01R 4/00* | (2006.01) |
| *H01B 5/10* | (2006.01) |
| *C23C 28/02* | (2006.01) |
| *H01B 17/00* | (2006.01) |
| *H02G 15/08* | (2006.01) |
| *H02G 1/08* | (2006.01) |
| *H02G 9/06* | (2006.01) |
| *H02G 15/20* | (2006.01) |
| *H02G 15/24* | (2006.01) |

(58) Field of Classification Search
USPC ........ 174/37, 75 R, 88 R, 129 R, 130, 133 R, 174/137 R
See application file for complete search history.

(56) References Cited

U.S. PATENT DOCUMENTS

| | | | |
|---|---|---|---|
| 3,566,008 A | 2/1971 | Ettlinger | |
| 3,775,550 A * | 11/1973 | Olsen | H02G 5/063 174/149 B |
| 3,786,174 A * | 1/1974 | Floessel | H02G 5/066 174/13 |
| 3,806,626 A | 4/1974 | Liao | |
| 3,909,501 A | 9/1975 | Johnsen | |
| 3,949,153 A | 4/1976 | Pirooz | |
| 4,006,288 A | 2/1977 | Stevens | |
| 4,056,679 A | 11/1977 | Brandt | |
| 4,092,485 A | 5/1978 | Wanser | |
| 4,132,855 A | 1/1979 | Clark | |
| 4,181,396 A | 1/1980 | Olashaw | |
| 4,270,021 A | 5/1981 | Gold | |
| 4,343,665 A * | 8/1982 | Pugh | H01B 13/062 156/145 |
| 4,354,053 A * | 10/1982 | Gold | H02G 15/003 174/76 |
| 4,372,043 A | 2/1983 | Cookson | |
| 4,581,478 A | 4/1986 | Pugh | |
| 4,705,914 A | 11/1987 | Bondon | |
| 4,730,855 A * | 3/1988 | Pelletier | H02G 3/06 174/71 R |
| 4,782,194 A * | 11/1988 | Johnsen | H01B 9/0611 174/106 R |
| 4,783,576 A * | 11/1988 | Silver | H01B 9/0605 156/53 |
| 4,786,760 A | 11/1988 | Friedhelm | |
| 4,833,278 A | 5/1989 | Lambeth | |
| 4,838,170 A * | 6/1989 | Illakowicz | B61C 13/00 104/138.2 |
| 5,060,737 A * | 10/1991 | Mohn | E21B 4/006 174/47 |
| 5,093,758 A | 3/1992 | Funaki | |
| 5,612,508 A | 3/1997 | Kasper | |
| 5,798,484 A | 8/1998 | Yamagiwa | |
| 5,834,699 A | 11/1998 | Buck | |
| 5,902,518 A | 5/1999 | Khazai | |
| 6,134,766 A | 10/2000 | Sievert | |
| 6,259,345 B1 | 7/2001 | De | |
| 6,417,265 B1 | 7/2002 | Foulger | |
| 6,417,456 B1 | 7/2002 | Leijon | |
| 6,445,269 B1 | 9/2002 | Sylvain | |
| 6,489,554 B1 | 12/2002 | Bertini | |
| 6,554,609 B2 | 4/2003 | Yadav | |
| 6,593,428 B2 | 7/2003 | Dean | |
| 6,596,945 B1 | 7/2003 | Hughey | |
| 6,599,631 B2 | 7/2003 | Kambe | |
| 6,670,554 B1 | 12/2003 | Jow | |
| 6,845,789 B2 | 1/2005 | Field | |
| 6,864,432 B2 | 3/2005 | Boettcher | |
| 6,924,435 B2 | 8/2005 | Jow | |
| 6,980,076 B1 | 12/2005 | Rolling | |
| 7,048,875 B2 | 5/2006 | Oommen | |
| 7,085,457 B2 | 8/2006 | Lancaster | |
| 7,262,367 B2 | 8/2007 | Donzel | |
| 7,405,358 B2 | 7/2008 | Emerson | |
| 7,489,140 B1 | 2/2009 | Butterworth | |
| 7,518,266 B2 | 4/2009 | Eckroad | |
| 7,569,774 B2 | 8/2009 | Huston | |
| 7,579,397 B2 | 8/2009 | Nelson | |
| 7,767,741 B2 | 8/2010 | Nylander | |
| 8,378,216 B2 | 2/2013 | Perego | |
| 8,586,173 B2 | 11/2013 | Yializis | |
| 2002/0079043 A1* | 6/2002 | Garneau | B29C 53/8066 156/184 |
| 2005/0005986 A1 | 1/2005 | Topek | |
| 2005/0069718 A1 | 3/2005 | Voss | |
| 2005/0137281 A1 | 6/2005 | Voss | |
| 2006/0169480 A1 | 8/2006 | Bates | |
| 2007/0199729 A1 | 8/2007 | Siegel | |
| 2007/0215393 A1 | 9/2007 | Voss | |
| 2008/0061919 A1 | 3/2008 | Marek | |
| 2009/0131261 A1* | 5/2009 | Schmidt | H01B 12/02 505/231 |
| 2009/0308656 A1* | 12/2009 | Chitwood | E21B 36/04 175/40 |
| 2010/0212932 A1 | 8/2010 | Glore | |

OTHER PUBLICATIONS

International Search Report and Written Opinion of International Application No. PCT/US2010/048719 mailed Feb. 28, 2012, 14 pages.

Tatsuya Nagata, et al., "Flexible Joint for 275kV XLPE Cable" Fujikura Technical Review, 2000, pp. 42-46.

Akira Suzuki, et al., "Installation of the World's First 500-kV XLPE Cable with Intermediate Joints", Furukawa Review No. 19, 2000, pp. 115-122.

Kiyomi Adachi, et al., "Supply of Dry Type Terminations for 275-kV XLPE Cables", Furukawa Review No. 19, 2000, pp. 97-102.

Hideo Takei, et al., "Development of Cold-Shrinkable Straight-Through Joints for 22-kV XLPE Cables", Furukawa Review No. 19, 2000, pp. 103-108.

Hiroaki Suzuki, et al., "Development of Cold-Shrinkable Joint for 110-kV XLPE Cables", Furukawa Review No. 19, 2000, pp. 109-114.

Hiroaki Kurihara, et al., "Cold Shrinkable Joint for 66-kV and 110-kV XLPE Cables Applied to Practical Transmission Lines", Furukawa Review No. 20, 2001, pp. 47-52.

Shinji Umeda, et al., "Underground Power Cable, Distribution Cable, Overhead Transmission Line, Industrial Cable and Their Accessories," Furukawa Review No. 32, 2007, pp. 2-20.

Erivelto Luís de Souza, et al., "Improvement of metallic joint electrical conductivity using a novel conductive paste produced from recycled residues", Revista Escola de Minas, Jun. 2006, 59(2), pp. 213-216.

Liang Chuan Peng, "Stress analysis methods for under ground pipe lines—Part 1," Pipeline Industry Magazine, Apr. 1978, pp. 69-71.

Liang Chuan Peng, "Stress analysis methods for under ground pipe lines—Part 2," Pipeline Industry Magazine, May, 1978, 5 pages.

(56) References Cited

OTHER PUBLICATIONS

Alvara Maia Da Costa et al, "An engineering solution to the problem of thermal buckling of heated pipelines buried in soft clay," Pipes & pipelines international 2003, vol. 48, No. 1, pp. 19-31.
Hermann Koch, "Experience with 2nd generation Gas-Insulated Transmission Lines GIL", World Energy Transmission System Workshop, Meudon, France, Jun. 2003, 6 pages.
Naoki Takinami, et al., "Gas Insulated Line Takes Power to the People", Transmission & Distribution World, Apr. 1, 2004, 5 pages.
Advances in High Voltage Engineering, edited by A. Haddad and D. Wayne, IEE Power and Energy Series 40; Chapter 10, 39 pages.
Hitoshi Okubo et al., "Insulation Performance of Permittivity Graded FGM (Functionally Graded Materials) in SF6 Gas under Lightning Impulse Conditions," 2006 IEEE International Symposium on Electrical Insulation, pp. 332-335.
Cable Systems for High and Extra-High Voltage, Egon F. Peschke, Rainer von Olshausen, Pirelli Kabel and Systeme GmbH, Publicis MDC Verlag, Chapter 3, 57 pages.
Datasheet for Ideal Industries Noalox® Anti-Oxidant Compound, Ideal Industries Inc., http://www.idealindustries.com/prodDetail.do?prodId=noalox, 1 page.
Datasheet for Aladdin Welding Products #604 3-in-1 Rod, http://www.aladdin3in1.com/products/3in1rod.php,1 page.

\* cited by examiner

UNDERGROUND MODULAR HIGH-VOLTAGE DIRECT CURRENT ELECTRIC POWER TRANSMISSION SYSTEM

CROSS-REFERENCE TO RELATED APPLICATIONS

Pursuant to 35 U.S.C. §120, this application is a continuation of and claims the benefit of prior U.S. application Ser. No. 13/395,886, filed on Mar. 13, 2012, which is a U.S. National Phase application of International Patent Application No. PCT/US2010/048719 filed Sep. 14, 2010, which claims the benefit of U.S. Patent Application Ser. No. 61/242,159 filed Sep. 14, 2009, U.S. Patent Application Ser. No. 61/259,167 filed Nov. 7, 2009, U.S. Patent Application Ser. No. 61/371,722 filed Aug. 8, 2010 and U.S. Patent Application Ser. No. 61/371,924 filed Aug. 9, 2010, the entire contents of all of which are incorporated herein by reference in their entireties.

BACKGROUND

Electric power transmission has traditionally utilized overhead power lines suspended from pylons. To transport large amounts of power over long distances with low loss, it is necessary to use high-voltage direct current (HVDC) and low resistance (thus thick) conductors. Using overhead conductors in this application requires tall, sturdy towers. Particularly in urban or scenic areas, there is substantial resistance to allowing such towers to be built. Alternatively, power lines can be insulated and placed underground. The three basic prior art technologies to do this are (non-superconducting) underground cables, gas insulated lines (GIL), and superconducting underground cables.

An individual underground cable is limited in its diameter to that which can be coiled on a spool and transported to the point of installation. This diameter limit in turn limits the thickness of the electrical insulation and thickness of the conductor in such a wire. The conductor size (cross-sectional area for DC) determines its resistance, which sets the amount of heat generated ($I^2R$) by the current it carries. The insulation must be thick enough to prevent electrical breakdown at the intended working voltage. The higher the voltage, the more power that can be transported at a given current (and thus a given level of heating), but the thicker the required insulation. A thicker insulation causes a higher temperature for a given level of waste heat generation. The insulation will fail if its upper temperature limit is exceeded, so these factors conspire to set an upper limit of around 1.1 GW of power that can be transported per state-of-the-art underground cable. Distances must be kept relatively short, as losses are relatively high (19% for 1,000 km is typical today). Unlike overhead lines, where capacity scales approximately with the square of voltage, the need to move the waste heat out of a cable through the insulation means that capacity of a cable scales more nearly linearly with the voltage.

GIL, on the other hand, uses rigid conductor sections, and thus is not limited by the requirement of needing sufficient flexibility for the conductor to be coiled onto a transportable spool. Pressurized sulfur hexafluoride ($SF_6$) gas mixed with pressurized nitrogen gas ($N_2$) provide the insulation. Because of gas convection, GIL is far better at moving waste heat out of the conductor to the outer perimeter of the insulation, which in GIL is usually a metal pipe. Although this technology can scale up to larger capacities and keep losses small by using large conductor sizes, the requirement to manage a pressurized gas along with the fact that $SF_6$ is a very potent greenhouse gas (22,800 times as bad as $CO_2$ over 100 years, and thus suitable precautions must be taken to prevent accidental discharges), make this technology comparatively expensive.

Even "high temperature" superconducting (HTS) power transmission lines require cryogenic cooling (liquid nitrogen temperature) to maintain the conductors in a superconducting (zero resistance) state. The refrigeration equipment adds a power loss penalty and creates a reliability issue for such power lines, since they must go out of service if the refrigeration falters.

It is a widely held belief within the electric power industry that long distance transmission lines cannot be made out of short (15 meter, easily truck-transportable sections) because the cumulative reliability for ~130,000 splices ($\lambda^{130,000}$, where $\lambda$ is the reliability of one splice over a given time) needed for a 1,000 km transmission line would be unacceptably low. (For example with a single splice reliability of 99.999% over a year, the above 1,000 km transmission line as a whole would have a reliability of only 26% over the same year—or a 74% probability of failing). Thus an unacceptable aggregate reliability is a problem with the splicing technology currently deployed for underground cables.

To illustrate, splicing of underground power cables using current methods as shown by Tatsuya Nagata, et al., in "Flexible Joint for 275 kV XLPE Cable", and Akira Suzuki, et al., in "Installation of the World's First 500-kV XLPE Cable with Intermediate Joints" first involves stripping and exposing the multiple layers of the cable, then butt welding or soldering the numerous individual conductor strands that make up the complete conductor. Wrapping the conductor with semiconductive tape, and then casting or extruding insulating polymers over the electrical connection follows this.

Gold's U.S. Pat. No. 4,270,021 shows one such method. Any imperfections in this process [such as Contaminants, Protrusions, or Voids (referred to as CPV's in the industry) in excess of a few microns, whether the contaminants be conductive or insulative] can result in premature failure by electrical breakdown, per *Advances in High Voltage Engineering*, page 494. Thus a clean room is assembled around each splice out in the field, and equipment is used to detect the presence of microscopic impurities in the insulation resin, followed by sensitive inspection equipment (such as X-ray) to gain assurance that the completed splice will be reliable. The next step is to cover the insulation with semiconductive tape, followed by cushioning, sheathing, and jacketing layers. The whole existing process is labor intensive, time consuming, and complex, and constitutes a weak point in transmission system reliability even with only a small number of splices.

Many methods have existed to form a splice between aluminum and copper conductors. These methods are relatively complex and thus costly and a source of unreliability.

When splicing rigid conductors in GIL transmission lines, one must allow for the expansion and contraction of the conductor due to changes in its temperature. Over typical temperature excursions, a rigid aluminum conductor that is nominally 15 meters in length may contract or expand by nearly 2.5 cm. This can be caused by both changes in the environmental temperature and the current (thus $I^2R$ loss) that the line is carrying. With wires or flexible cables this expansion or contraction can be taken up by small changes in droop or snaking of the wire or cable, but not so with rigid conductors.

One GIL electrical expansion joint method that is in current use involves a sliding mechanical contact between overlapping sections of adjoining conductor sections. This method uses spring force to assure that the contact pressure is sufficient to achieve low resistance, and thus loss. Since this process inherently involves sliding metal-to-metal contact under pressure, wear will occur. This wear will produce a conductive metallic dust. Since a gas insulates GIL transmission lines, the dust may freely move about within this medium. The insulating gas contains an electric field. These particulates modify the electric field around themselves, leading to regions of increased electrical stress, which can initiate electrical breakdown. Thus GIL designs include particulate traps to hopefully gather these particles and remove them from areas where they could induce a failure.

When particulates become electrically charged they will be attracted to and move toward an oppositely charged surface. In an HVDC GIL environment, the particles generated from sliding contactors and other sources can and do go back and forth between the conductor and the outer conduit as their charge changes each time they touch a metal wall or conductor, and this allows the particles to bounce along and accumulate, which is particularly a problem only when GIL is deployed in an HVDC transmission mode. This bouncing dust problem is much less severe for GIL lines carrying AC power.

Transporting large amounts of power, even at relatively high efficiency, results in the generation of a significant amount of waste heat. For instance, to move 10 GW of power with a loss of 3% per 1,000 km (corresponding to the loss of the best conventional conductor-based power transmission lines built to date) creates 150 watts of waste heat per meter, per conductor. This is well above the maximum waste heat that can reliably be shed by underground conductors through soil, even if a cable that could carry 10 GW were available. Thus, a breakthrough on higher capacity underground passively cooled power lines will require higher efficiency than the best available power lines of today. Larger capacities and larger loss levels result in proportionally larger amounts of waste heat. Different dirt and soil types have varying (with moisture level, for instance) and relatively low thermal conductivities (0.06 to 3 W/m·° K), and coupling of waste heat that has been brought to the surface to be removed by the surrounding air can be hindered by vegetation and debris.

To summarize, the key technical obstacles for achieving commercially viable underground high-power electric transmission lines using conventional conductors are:
 1. High voltage electrical insulation for the conductors
 2. Removal of waste heat from the conductors
 3. Accommodating thermal expansion and contraction of the conductors, insulation, splices, and housings
 4. Making low loss, high current, highly reliable electrical splices in the field at low cost
 5. Reliably insulating high voltage field-made splices at low cost Since misguided digging accounts for about one-half of the field failures (per *Advances in High Voltage Engineering*, page 491) seen with underground power cables, it is likewise desirable to make it extremely unlikely that an underground transmission line would be severed accidentally by digging or other construction activity. One prior art way to accomplish this is to install cables inside pipes (conduit); these are known as "pipe-type cables," and actually pre-date directly buried high voltage cables. Pipe type cables make it far less likely for digging to damage a buried electric line. In present practice, pipe-type cables are installed between maintenance and repair vaults that are no more than about a kilometer apart (the maximum distance that can be pulled without a splice in a large cable).

Perhaps the most common examples of a high voltage, high current conductors that are not wires are the buss bars found in power plants and transformer yards. These are made of extruded aluminum and are air-insulated. These are not used for transmission outside of power plants, electric utility transformer and switching sites, and within the facilities of large industrial power users.

All power lines have some limitation on the minimum radius of curvature for each particular type of power line. In fact, there can be different limitations for minimum radius of curvature for shipping a conductor (where it is generally tightly wrapped on a reel for transport), compared to installation. For example, large pipe-type cables may come on a 3 meter diameter cable reel, but they cannot be pulled through a conduit with less than about a 30 meter radius of curvature. To achieve tighter turns than this, it is necessary to have a maintenance vault and a splice where the pipe-type cable turns a corner.

SUMMARY

This invention features in one embodiment a modular high-voltage direct current electric power transmission system. The system has an elongated containment system, a plurality of elongated generally annular rigid primary conductors generally aligned end-to-end within the containment system, a generally annular primary insulator surrounding each of the primary conductors, a plurality of compliant conductive electrical splice members, one splice member located between and electrically coupled to two of the primary conductors, to accomplish electrical continuity while allowing for axial misalignment between such conductors, and a plurality of splice insulators, one such splice insulator surrounding each splice member.

The containment system may be a conduit. The containment system may comprise a plurality of protective enclosures. At least some of the protective enclosures may comprise liquid-tight vessels. The system may further comprise a convective heat transfer fluid within one or more of the vessels. The system may further comprise a compressible member within the vessels that contain heat transfer fluid, to allow the heat transfer fluid to expand and contract within the vessel. The enclosures may further comprise bulkheads coupled to at least some of the vessels. The primary insulation may be coupled to a bulkhead. The system may further comprise trays located between and physically interconnecting adjacent enclosures. The trays may comprise sealing flaps that are coupled to the enclosures, and the trays may further comprise a removable cover. The liquid-tight vessels may comprise a concrete shell surrounding a liquid-impervious liner.

The primary conductors may comprise one or more aluminum members. At least some of the primary conductors may define a generally annular wall with one or more full-length voids. At least one void may contain sodium. One or more voids with sodium may further contain a volume compensation device, wherein the sodium and the volume compensation device together substantially fill the void. The volume compensation device may be constructed and arranged to change its volume enough to equal or exceed the total volume change of the sodium over the rated temperature range of the primary conductor. The volume compensation device may be under axial tension, and the cross-section of the volume compensation device may be nearly constant when the sodium is entirely molten, at a temperature up to the upper rated limit.

At least some of the primary conductors may be made from a plurality of separate segments. The segments may comprise wedges. At least some of the wedges may be extruded or cast. At least some of the wedges may be hollow. At least some of the hollow wedges may contain sodium. At least some of the wedges may be substantially partially annular. At least some of the substantially partially annular wedges may comprise male features and female features that are constructed and arranged such that a male feature on one wedge can interlock with a female feature on an adjacent wedge. The male feature may comprise a protruding tab along one side of the wedge and the female feature may comprise a slot along an opposite edge of the wedge, wherein the slot defines an inner portion that is wider than the slot opening, so that the tab can be bent after it is inserted into the slot and thus occupy more space than the slot opening, to inhibit removal of the tab from the slot.

The system may further comprise one or more splice transition conductors, with a splice transition conductor located between and electrically coupled to a primary conductor and a splice member. The splice transition conductor may comprise a threaded copper insert into the end of an aluminum pipe-shaped primary conductor. The splice transition conductor may define a generally annular end that is adapted to be directly coupled to an end of a primary conductor, a more narrow opposite end, and a tapered transition region between such two ends. The splice transition conductor may be directly coupled to the primary conductor by spin welding. The surfaces that are spin welded may be chamfered so as to fit together along an angled face. The surfaces that are spin welded may be flat and generally perpendicular to the longitudinal axes of the splice transition conductor and the primary conductor. The system may further comprise a heat pipe with one end in the splice transition conductor and the other end in the primary conductor, to assist with the transfer of heat out of the splice transition conductor. The system may further comprise an end cap insulator located over one or more of the splice transition conductors. The end cap insulators may be coupled to the ends of the splice transition conductors by a snap fit joint. The system may further comprise a high dielectric strength grease located in the snap fit joints. The system may further comprise an elastomer boot located over the snap fit joint in such a way as to inhibit loss of grease from the joint. The system may further comprise two end cap insulators located over the ends of a primary conductor or a splice transition conductor via a snap fit, and further comprise one or more biaxially oriented elastomeric pipe-like insulators located over the first end cap insulator, in which the second end cap insulator is located over the biaxially oriented elastomeric pipe-like insulators, to trap the biaxially oriented elastomeric pipe-like insulators between the second end cap and either the primary conductor, the splice transition conductor or the first end cap insulator.

At least one primary conductor may comprise sodium within a metal, ceramic, polymer, or composite shell that primarily determines the axial thermal expansivity of the primary conductor, in which the majority of the current flowing through the primary conductor flows within the sodium. The system may further comprise, located within the sodium, a volume compensation device that can change its volume enough to equal or exceed the total volume change of the sodium over the rated temperature range of the primary conductor. The volume compensation device may be under axial tension, and the cross-section of the volume compensation device may be nearly constant when the sodium is entirely molten, at a temperature up to the upper rated limit of the primary conductor.

At least some of the splice members may comprise an electrically conductive braid. The braid may have two ends and be terminated at both ends in threaded bushings with one thread right-handed and the other left-handed. The braid may be terminated in threaded bushings with threads that are tapered. The electrically conductive braid may be coated or impregnated with a flexible substance. The conductive braid may be generally cylindrical. The braid may fit over the ends of two primary conductors, and the splice members may further comprise fasteners to fasten the braid to the primary conductors. At least some of the splice members may comprise compliant electrically conductive braid strips. At least some of the splice members may comprise electrically conductive rigid straps. At least some of the splice members may comprise an elastomer bag containing sodium that is held within a solid or elastomeric enclosure of high dielectric strength, wherein the enclosure has ports which expose the surface of the bag through the port, the ports located where a high dielectric strength sleeve intersects the enclosure, and such splice members may further comprise conductive needles that project through the elastomer bag into the sodium.

At least some of the splice insulators may define opposing internally threaded ends that are coupled to external threads on two adjacent primary insulators. At least some of the splice insulators may comprise a generally spherical hollow structure at least in part made from a flexible electrically insulating material. The inner and outer surfaces of the hollow structure may be semiconductive. The surface of the threads of the hollow structure may be semiconductive. At least some portion of the inner surface of the hollow structure may be sticky. The splice insulator may further comprise flanges surrounding one or both thread openings of the hollow structure. The primary insulator may have externally threaded ends, and the exterior surface of the primary insulator away from the threads, and the thread face, may be semiconductive. The surface of the threads may also be semiconductive.

The primary insulator may comprise a relatively rigid pipe-like member. The system may further comprise a lubricant between the primary insulator and the primary conductor. The primary insulator may comprise one or more compliant sleeves placed over the primary conductor. One or more of the sleeves may be biaxially stressed and placed over the primary conductor and then allowed to retract, in which the interface between a biaxially stressed sleeve and the primary conductor may be either dry or lubricated, and when a lubricant is used the lubricant may be either permanent or temporary, and the lubricant may be an adhesive that cures to a hard polymer. The system may further comprise one or both of rollers and mechanical fingers that are used to pull an originally un-oriented elastomer over one or both of a smooth mandrel and a primary conductor. A plurality of sleeves may be are nested one on top of another. The system may further comprise lubricant applied between the sleeves, in which the lubricant is one or more of a permanent lubricant, an adhesive that cures and joins the sleeves irreversibly, and an oil that dissolves into one or more of the sleeves over time. The primary insulator may comprise an elastomer tube or a plurality of nested elastomer tubes, wherein at least one elastomer tube is under a biaxial strain in the middle section of the primary conductor. The elastomer tube may be biaxially extended through inflation with a gas or liquid, followed by freezing at a temperature below the glass transition of the elastomer, placing the frozen biaxially oriented elastomer over a primary conductor, and then heating the elastomer above its glass transition temperature to cause it to contract onto the primary conductor. The elastomer tube may be pulled over the primary conductor via wheels or mechanical fingers, in which the primary conductor has smooth contours and a smooth lubricated surface, so that at least the middle portion of the elastomer tube is biaxially oriented. The lubricant may be a high dielectric strength grease that ranges in resistivity from $10^{21}$ ohm-cm to $10^{12}$ ohm-cm. The lubricant may be a conductive grease that ranges in resistivity from $10^{-1}$ ohm-cm to $10^{12}$ ohm-cm. The system may further comprise a snap-fit end cap insulator that snaps over the elastomeric tube to capture and hold the tube in place. The elastomer tube may be both biaxially and uniaxially strained, and the uniaxial strain may be captured and held by the snap-fit end cap insulator.

The system may further comprise rollers that support the primary conductors and the primary insulators. The system may further comprise wheels located between the primary insulator and the containment system. The wheels may be mounted at or proximate both ends of one or more primary conductors. The wheels may be mounted proximate the splice insulator. The wheels may be part of a powered carriage module that comprises reversible drives and brakes, to allow for self-propelled movement. The system may further comprise a high thermal-conductivity gas located between the primary and splice insulators and the containment system. The primary insulator may comprise a spirally-wrapped insulation structure comprising at least two layers. The insulation structure may comprise an insulative layer and a semiconductive layer. The semiconductive layer may accomplish a spiral semiconducting path from the primary conductor to ground. The primary insulator may comprise a series of nested generally conical insulators. The generally conical insulators may span the distance between the primary conductor and the elongated containment system, and the system may further comprise a dielectric fluid maintained at a positive pressure and filling the rest of the space between the primary conductor and the elongated containment system.

Featured in another embodiment is an electrical splice that accommodates expansion and contraction, comprising a generally cylindrical section of electrically conductive braid and defining two ends and threaded bushings coupled to each end of the generally cylindrical section.

Featured in another embodiment is a modular high-voltage direct current electric power transmission system, comprising an elongated conduit, a plurality of elongated generally annular rigid primary conductors generally aligned end-to-end within the conduit, a generally annular primary insulator within the conduit and surrounding each of the primary conductors, a plurality of compliant conductive electrical splice members, one splice member located between and electrically coupled to two of the primary conductors, to accomplish electrical continuity while allowing for axial misalignment between such conductors, a plurality of splice transition conductors, a splice transition conductor located between and electrically coupled to a primary conductor and a splice member, in which the splice transition conductors where they meet the splice member have a smaller diameter than the primary conductor, a plurality of splice insulators within the conduit, one such splice insulator surrounding each splice member, and a powered carriage module located between the primary insulator and the inside of the conduit and comprising wheels, reversible drives and brakes, to allow for self-propelled movement.

BRIEF DESCRIPTION OF THE DRAWINGS

FIG. 2 shows a circular cross-section hollow cylinder with outside radius 120 and inside diameter 212; the same amount of aluminum per km is used in FIG. 3 through FIG. 7.

FIG. 3 shows an elliptical cross section hollow cylinder.

FIG. 4 is like FIG. 2, except it is composed of multiple wedge (or keystone) shaped components.

FIG. 5 is like FIG. 4, except the keystones form a helix.

FIG. 6 is like FIG. 3, except it is composed of multiple keystone-shaped components.

FIG. 7 is similar to FIG. 4, except it is composed of flattened keystones.

FIG. 8 shows extruded keystones with circular inner and outer edges.

FIG. 9 shows strip cast keystones with flat inner and outer edges.

FIG. 10 shows a keystone like in FIG. 8, except with a hollow core.

FIG. 20 shows a nominal case,

FIG. 21 shows that shorter segments allow greater curvature,

FIG. 22 shows that higher conduit diameter allows greater curvature or longer segments.

FIG. 23 shows one option with highly efficient insulation bonded to a splice transition conductor, and FIG. 24 shows a second option, where a snap fit end cap insulator snaps over the end of an XLPE or other stretched elastomer insulator.

DESCRIPTION OF EMBODIMENTS

Figure 1:
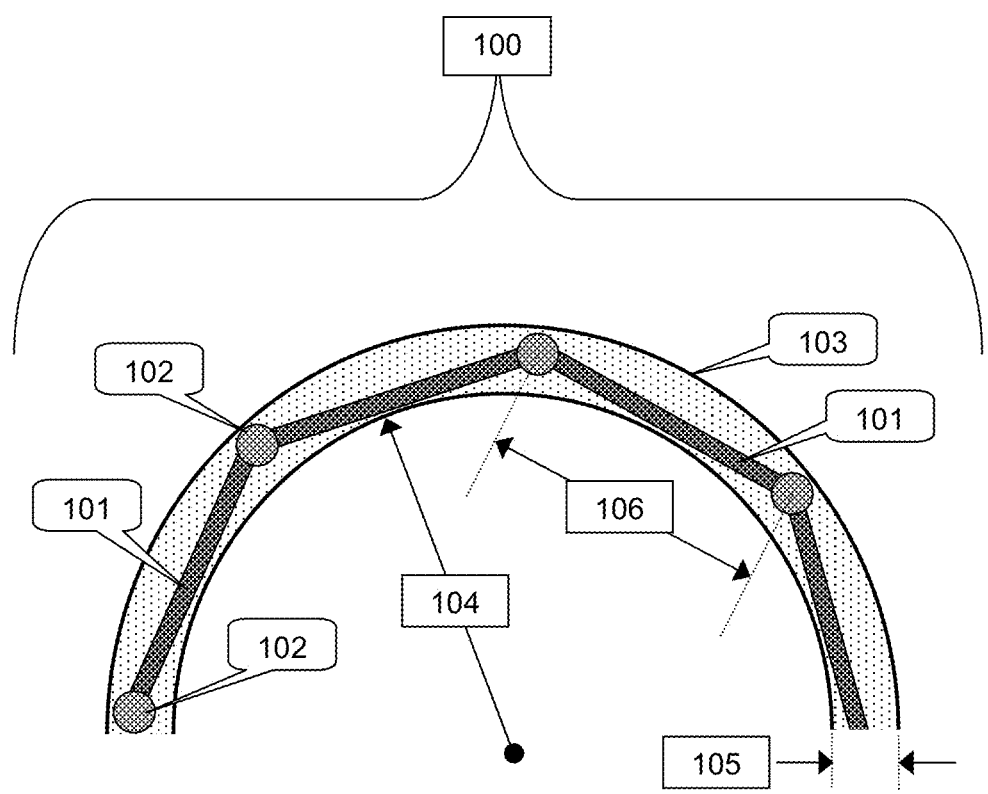
FIG. 1 shows cartoon view of an elpipe (segment modules plus splice modules) in a conduit.
Figure 2:
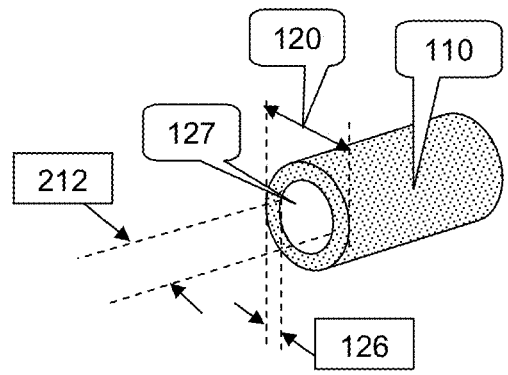
FIG. 2 through FIG. 7 show options for pipe-shaped conductors made out of aluminum.
Figure 3:
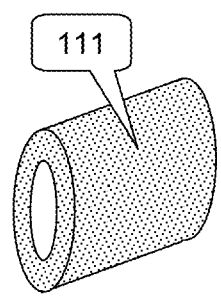
Figure 4:
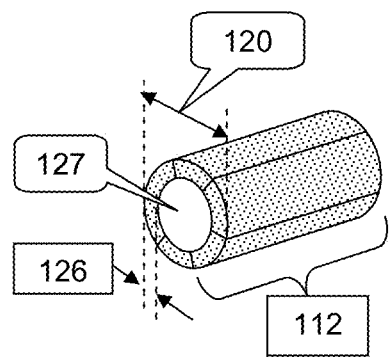
Figure 5:
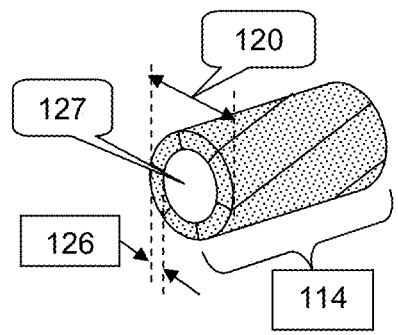
Figure 6:
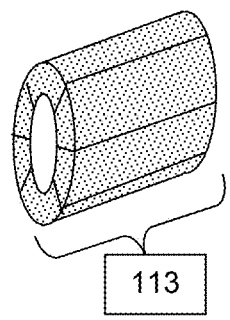

FIG. 1 gives a simplified view of the primary components of the transmission line 100, which is sometimes termed an "elpipe" herein. The elpipe can be a combination of two types of modules: segment modules 101 and splice modules 102, normally but not necessarily deployed in a conduit 103. The preferred design is highly modular, and so are the component parts of the segment modules and splice modules themselves modular. Because the elpipe segments are straight and relatively rigid, there is a minimum radius of curvature of the elpipe 104 that may be installed in a conduit; this minimum radius of curvature can be reduced either by increasing the diameter of the conduit 105, or reducing the length 106 of the segments. There are preferably wheels deployed that attach to the elpipes either at the segment modules, as in FIG. 25, or at the splice modules as in FIG. 26. These sets of wheels suspend the elpipe within the conduit and ease insertion and removal of the assembled elpipes into the conduit. The wheels also center each elpipe segment within the conduit, and can provide motive force and/or braking to allow the elpipe to be installed on a slope. The wheels enable installation into long runs of conduit; much longer than the maximum run between vaults for conventional pipe-type cables. In the case that the wheels are powered, it is feasible for the assembled elpipe to climb and descend hills between vaults. The conduit can be a metal pipe or corridor, a polymer or polymer composite pipe or corridor, or a cementitious pipe or corridor, including polymer-modified cements, as several non-limiting embodiments. "Conduit" refers to any feasible protective installation option, whether it is a pipe or a corridor. Conduits may also in general have multiple layers, each with a different composition. It is necessary to maintain a very dry environment for some particular known insulations that may be deployed on an elpipe, such as specifically XLPE and MIND insulations; where such water-sensitive insulations are used it is highly desirable that the conduit include at least one highly water permeation resistant layer such as a metalized polymer film, a metallic foil, or a solid metal pipe.

(XLPE means crosslinked polyethylene; it is a partially crystalline elastomer, and can be made from any grade of polyethylene. XLPE may be either peroxide crosslinked or radiation crosslinked. There are also various silane-grafted polyethylenes that crosslink by reactions with water that are sometimes used to make XLPE insulation.)

(MIND means mass-impregnated, non-draining insulation, a version of oil impregnated paper insulation in which the oil does not drain out of the paper.)

In such instances, it is also desirable that a high efficiency water adsorbent be present inside the elpipe, such as calcium oxide (which chemically reacts with water) or molecular sieves optimized for strong, yet reversible water adsorption. It is further desirable to monitor the dryness of the gas, and to be able to circulate dry gas, especially during installation and maintenance. Circulation of a gas in the conduit also opens the possibility of sensitive chemical monitoring of the gas via gas chromatography-mass spectroscopy analysis, which can make it feasible to sniff out incipient insulation breakdown, or permeation into the pipe. In the case that the volume between the conduit wall and the elpipe is isolated from the environment, a high thermal conductivity gas such as hydrogen or helium may be used to fill this volume to improve thermal coupling between the outer surface of the elpipe and the inner surface of the conduit.

The conduit itself is subject to thermal expansion and contraction. Where the conduit is steel or another high modulus material, very large forces can be generated by long straight runs. By deliberately "snaking" a steel pipeline slightly, damaging buckling can be prevented, even given substantial temperature swings in very weak wet clay soils that do not restrain the pipe substantially. Lower stiffness, more compliant pipe such as polyethylene pipe can be laid between points at which it is held firmly by concrete, even with straight runs, and will not buckle due to the compliance of the polyethylene. Polyethylene pipe, however is much more permeable to water and oxygen than metal pipe, and would require extra care to maintain the desired level of dryness inside the conduit to avoid "treeing" due to partial discharges inside XLPE insulation.

Figure 66:
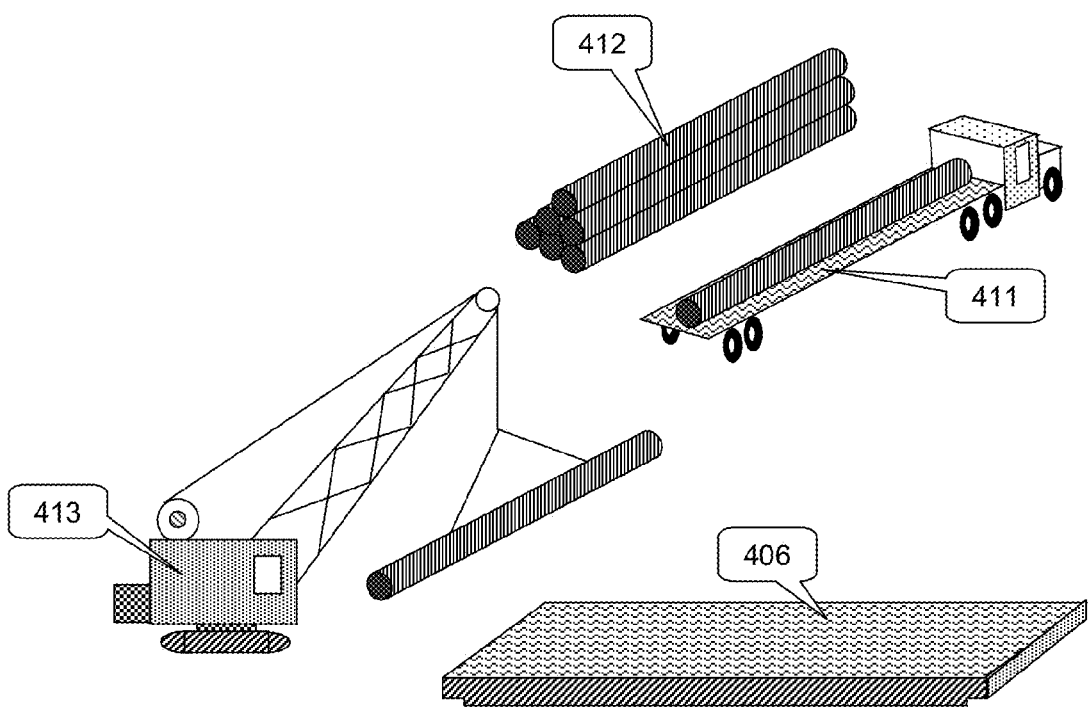
FIG. 66 shows installation of elpipe in a maintenance vault with a portable clean room.

The conduit is installed by prior art methods between two maintenance vaults. At least one of said maintenance vaults has therein a facility for assembling the elpipe segments together in a clean room environment (see FIG. 66). The clean room facility may optionally be mobile, so that it can be transported to different vaults as needed. The maintenance vault is surrounded by a floor 409, walls 402, and lid 406. Along the walls, it is provided with drainage 401 that separates it from local soil 1220, to prevent damage from freeze/thaw of water saturated soils next to the vault wall 402 for example. The floor 407 may optionally be heavy enough to prevent the maintenance vault from floating in case of a flood that submerges the vault (only relevant in places prone to flooding). It is long enough to receive truck-length elpipe segment modules and splice modules off a delivery truck for example. These modules are removed from a delivery truck 411 by a crane 413, and placed into temporary storage 412, or directly onto a portion of half-round conduit 407, which also has a lid (not shown) that can be assembled to close up the elpipe within the maintenance vault after installation, repair, or maintenance activities are completed. The crane 413 can also move the modules from storage 412 onto the half-round conduit 407. From there the modules can be rolled into the mobile clean room through an air curtain to prevent environmental dust entering the clean room. The surface of the module would also be washed (not pictured) before it enters the clean room. Once the segment module end to be spliced is inside the clean room, an inflatable seal 408 closes around the elpipe segment module for zone isolation so as to keep the area inside the clean room where splices are assembled and evaluated 403 very clean. The clean room is supplied with slightly pressurized air that has been filtered to remove sub-micron particulates by an air filtration system 410. Splice modules are introduced to the clean room by a second air lock (not shown). In this region inside the clean room where splices are made, the elpipe is supported on an open scaffolding 405 which allows access all around the splices and the splice module for making and inspecting the splice.

We discuss the major components sequentially below, beginning with the segment modules, then the splice modules.

Various other types of modules are required to complete an HVDC grid, within which elpipe transmission lines will need to interface with other technologies. A multi-terminal HVDC transmission line based on elpipes will also need power taps, elbows, circuit breakers, and adapters to overhead power lines, gas-insulated lines (GIL), cables, and eventually, to superconducting lines. Each of these items is a "module" in the sense that we discuss segment modules, splice modules, and carriage modules, however these modules are not part of this disclosure.

We shall consider each of these components separately.

Elpipe Segment Modules

Figure 12:
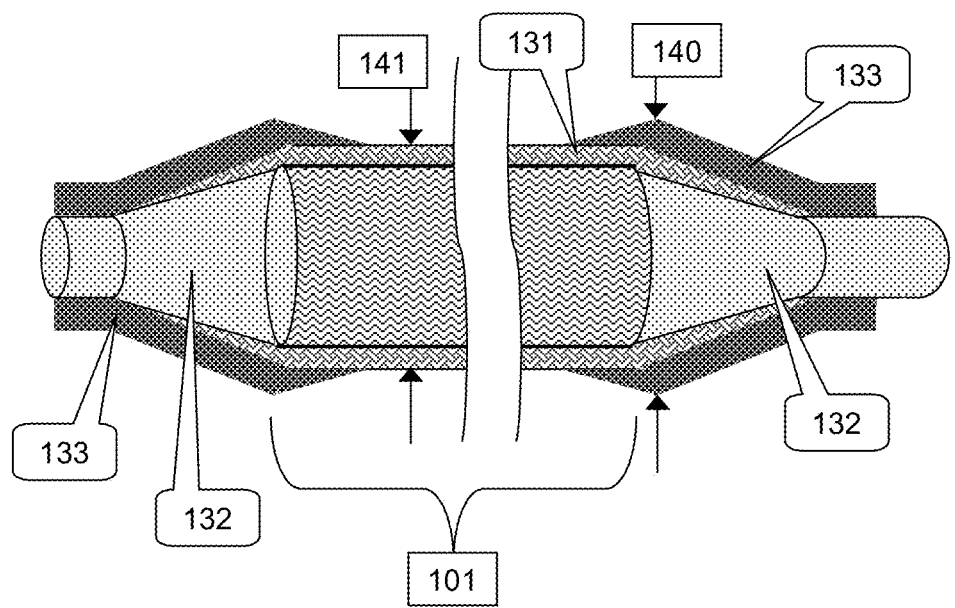
FIG. 12 shows the major components of a particular elpipe segment module.

The segment modules constitute most of the mass of the elpipes, and are themselves highly modular in that the conductor, insulator, and (where used) also the end pieces (splice transition conductor and end cap insulator) are separately manufactured and quality controlled prior to being assembled into a segment module (see FIG. 12). This is substantially different than the case for present technology high voltage cables, where the insulating layer is typically applied to the conductor either by wrapping (oil/paper cables) or extrusion coating (XLPE cables). If the insulation on a present technology cable fails during post-manufacturing testing, the entire length of cable must be scrapped (though in some cases the conductor can be salvaged); contrast this with the case for the present elpipe segments, for which high voltage testing is applied to the polymeric insulators before they are assembled into an elpipe segment, so that most failures in testing occur at the component level, rather than at the level of the segment module (where a failure is much more expensive). Conducting quality control on the component insulators decreases the cost of a failure, since failures in the insulators are relatively inexpensive compared to failures on a cable or an elpipe segment. Also, component testing rather than assembly testing allows more aggressive test conditions to be used, which is advantageous for reliability and for heat transfer (because more aggressive testing enables thinner insulation layers, which pass the waste heat out more efficiently).

There exists an optimum test voltage for finding flaws in insulation; going above this optimum will damage the remaining insulation and decrease its service life, and testing at lower voltage will fail to identify flaws that weaken the insulation substantially. In present practice, since roughly kilometer-long segments of cable are manufactured at a time, testing aggressiveness is lower than would be feasible if the economic penalty for failure were less. By increasing the test voltage beyond the voltage conventionally used for cable, to the point that a targeted number of failures occur, it will be possible to achieve higher voltage withstand than has heretofore been possible (by breaking down the biggest flaws). The basis for this statement is that failures are linked with flaws, and as higher test voltages are applied, smaller flaws can be detected.

Since modular elpipes normally use relatively short pieces of polymer pipe as insulation, with most elpipe segments less than 20 meters in length, failure densities that are well above one per kilometer can be tolerated; especially where the insulation is recyclable and re-usable (after removing the area surrounding a flaw). This is also true in part because the main way to accommodate a reduction of the minimum bend radius of the elpipe is to use shorter elpipe segments; therefore in addition to elpipe segments intended to be deployed in straight conduits (which may be the maximum practical length that can be shipped on a truck or train, depending on how the elpipe segment is delivered to the construction site; note though that longer segments imply longer maintenance vaults where these are employed, so there is a trade-off economically), shorter segments will also be needed to accommodate tighter curvature in some areas. Some short pieces of insulating pipe generated because of failures can therefore still be used, and do not represent scrap, even if the insulating pipe per se is not recyclable into the same application (XLPE insulation, a main candidate for the pipe-type insulation, will not be recyclable if tested after it is cured).

The modular design concept of this invention is quite flexible, and applicable to a wide variety of materials for forming each of the three major components of the modular elpipe segments which are:
1. Conductive core
   a. Pipe-shaped conductor (normally extruded)
   b. Splice transition conductor (these end pieces may be integrated with insulation)
2. Pipe-shaped insulator (can be, for example, polymer, glass, ceramic, or a combination of these)
3. End cap insulator (in some designs, integrated with splice transition conductor)

Elpipe Splice Modules

Elpipe splice modules link the segment modules together. The splice modules require that a flexible conductor be used, such as wire mesh or looped wires, or a liquid or very soft metal such as sodium. Such modules must allow both axial and angular movement of the mating ends of the segment module conductive cores. The degree of axial movement of the segment module conductive core that must be accommodated varies depending on the length and construction of the segment module from a few millimeters to as much as ten centimeters.

Elpipe Carriage Modules

Figure 25:
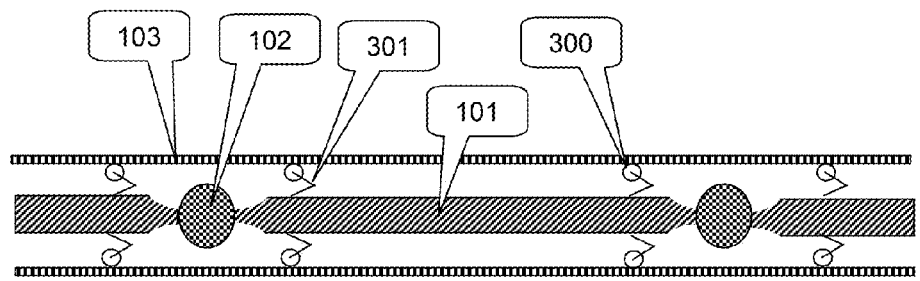
FIG. 25 and FIG. 26 show options for wheel placement to support an elpipe during installation in a protective conduit.
Figure 26:
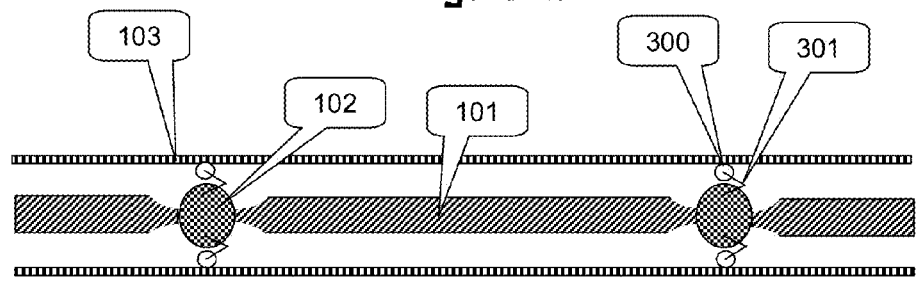
Figure 35:
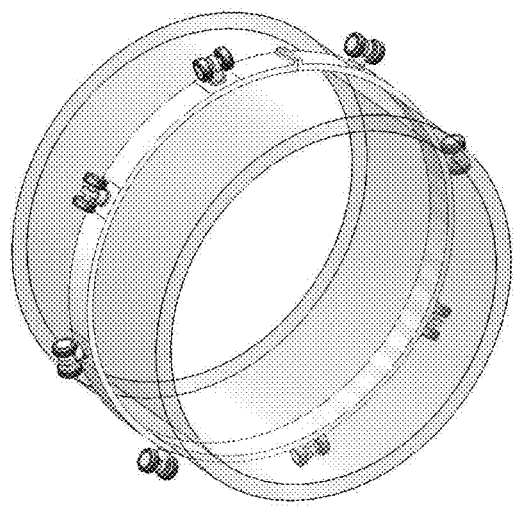
FIG. 35 shows a simple roller harness to suspend an electric pipeline segment module or splice module; not powered, no brakes.
Figure 36:
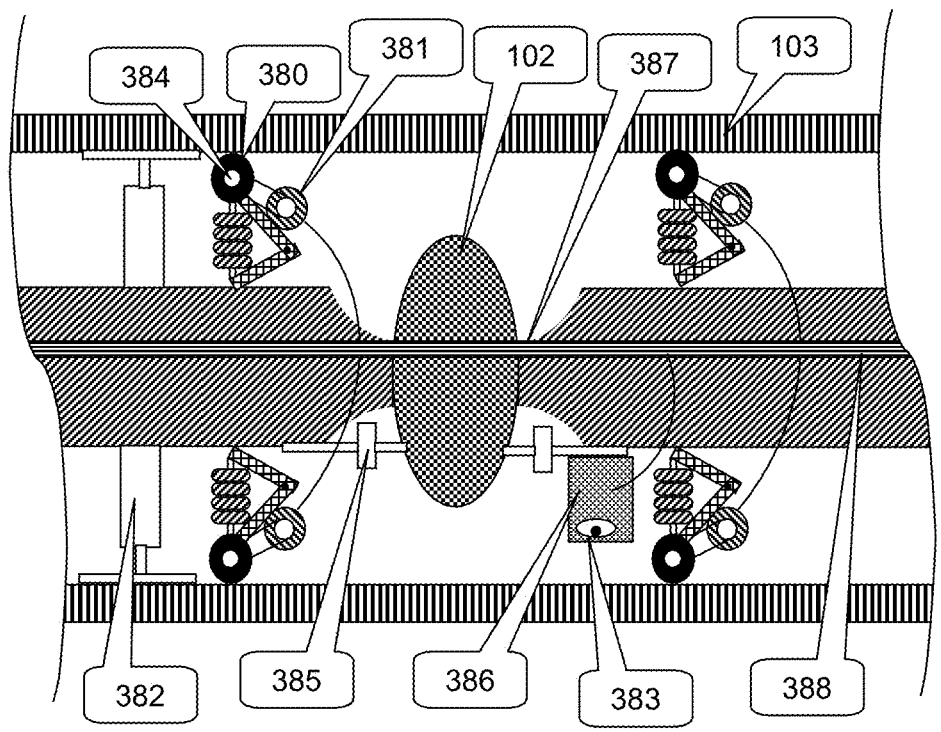
FIG. 36 shows a sophisticated carriage assembly comprising two sets of wheels which are powered and have brakes, a gas-operated emergency/parking brake, sensors, and a control module, connected and communicating via an elpipe intranet.
Figure 37:
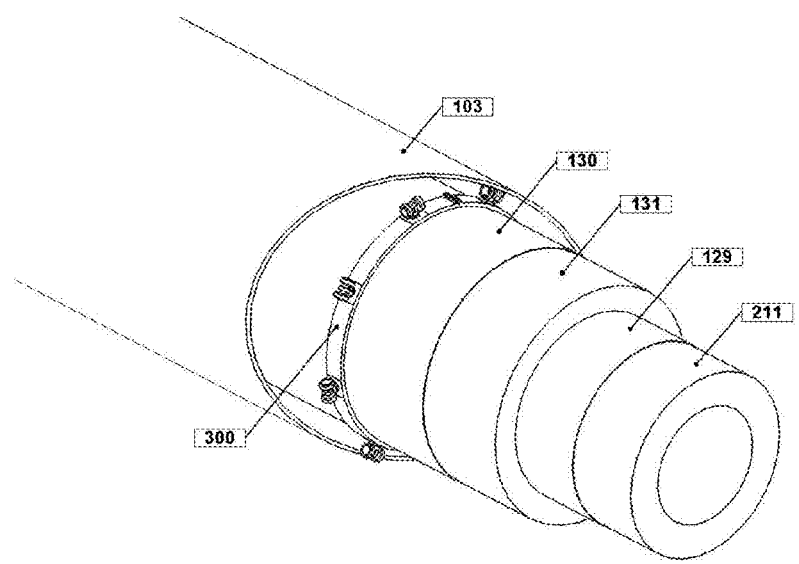
FIG. 37 shows a slice through an elpipe segment module near where a roller harness such as that shown in FIG. 35 is attached.
Figure 67:
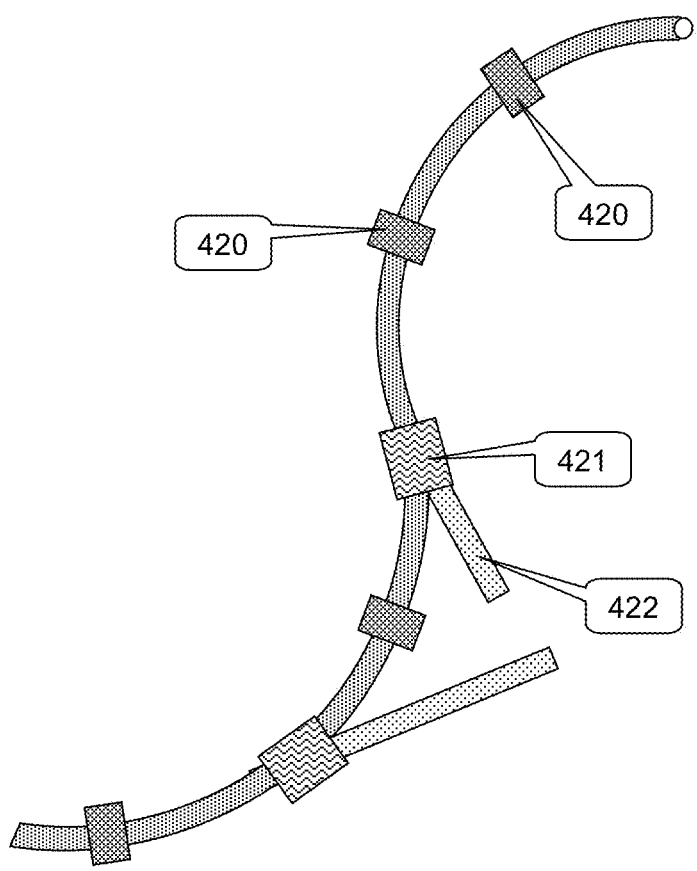
FIG. 67 shows side tracks in a long elpipe run.

Elpipe carriage modules are shown in FIG. 25, FIG. 26, FIG. 35, and FIG. 36. FIG. 25 shows an implementation in which there are two carriage modules per segment module, while FIG. 26 shows an implementation in which there is one carriage module per splice module. FIG. 35 and FIG. 37 show simple implementations of the carriage modules; FIG. 35 shows a roller harness that is not powered nor supplied with brakes, while FIG. 37 shows a cutaway view of a segment module and its conduit 103 at its carriage module as per FIG. 35. FIG. 36 is a carriage module illustration that has brakes 382 and reversible electric drives 381 which can control torque and speed of the wheels 380. There is a load cell between each segment to splice module connection 385. Additional data is provided by an inclinometer 383 and torque load cells on the wheel shafts 384. The data is collected and analyzed locally in a control module 386, and the data is also exported via the intranet connection cable 387. Power is supplied through the power cable 388. Some decisions are delegated to local control; for example when stress on a junction between two modules is getting close to the maximum sustainable stress, the local controllers can work together to prevent damage to the junction. All the data is uploaded via an intranet that is installed with the elpipe. During installation and maintenance this data allows for highly coordinated movements of long "trains" of elpipe modules on carriage modules. The ability to move in this way makes rapid repairs feasible, since many kilometers of elpipe can readily be backed out of its conduit for repair of an individual module, without digging to get to the place a repair is needed. Only two "side tracks" along a 2000 kilometer elpipe (for example) could allow the elpipe train to be backed up until the flawed section is within a maintenance vault. Because of the ability of thousands of kilometers of elpipe to move together in a coordinated manner, if the maintenance vault spacing is 10 km at most, then a pair of 10-km long side tracks 422 would allow any flaw to be rapidly positioned at a maintenance vault 420 or a special conduit junction/maintenance vault 421 (see FIG. 67).

Examples of pipe-shaped conductors that can be used in modular elpipe segments of the invention are shown in FIG. 2 through FIG. 11, and include:
1. extruded aluminum pipes, including circularly symmetric tubes 110 and other non-symmetrical tubes, for example the ellipse of 111;
2. conductors formed by bundling together wedge-shaped conductors to form a hollow keystone conductor; straight hollow keystone conductors can have a partially annular cross-section 112 or another shape such as 113; circular hollow keystone conductors may be assembled so the wedges are helically twisted as in 114; the wedge components of the hollow keystone conductors may themselves be solid 190, hollow 191, or hollow and filled with sodium 192; the core of the hollow keystone conductor 193 may by a gas, liquid, a solid conductor, a hollow conductor, or a sodium-filled conductor; the wedge-shaped conductors may be either extruded 115 or strip-cast 116;
3. extruded conductors with a smooth outer perimeter in a desired shape formed by extrusion, which also contain open pockets 118 and 119; Such shapes can have much better crushing resistance than a circular tube, and the resistivity of such a pipe-shaped conductor can be adjusted by flooding one or more of the open pockets with a conductor that is liquid or at least semi-solid (and thus flowable) at the insertion temperature, e.g., sodium;
4. centrifugally cast aluminum pipes;
5. conductors formed by bundling continuously strip cast aluminum keystone conductors 116 into a hollow keystone conductor.

Figure 7:
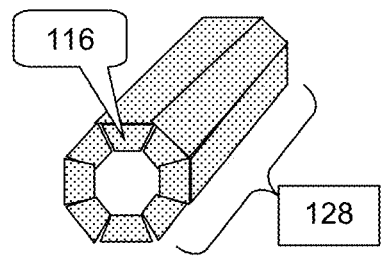
Figure 8:
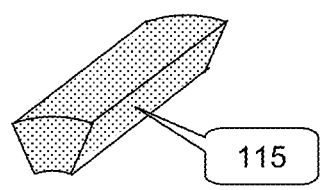
FIG. 8 through FIG. 10 show some options for keystones.
Figure 9:
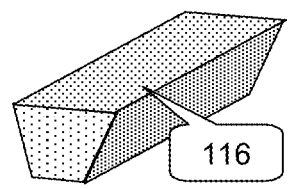
Figure 10:
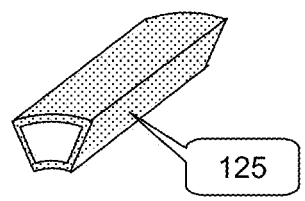

Hollow keystone conductors can take varied shapes; in general, a circular shape is preferred such as 110, 112, 114, 117. The circular conductor may be a hollow keystone conductor such as 112, 114, or 194, which can have any number of component wedges to form a circular hollow keystone conductor, though in most cases 5-12 wedges are used. These wedges themselves can be hollow 191, and may contain sodium 192. Shapes that approximate hollow wedges can be made by strip-casting 116, a well established way to produce ingots at many different smelting operations. It is not possible in strip-casting to produce highly accurate and flexibly defined shapes, as can be done with extrusion; however, strip cast shapes are less expensive than extruded shapes, and can be bundled together to produce a polygonal bundled conductor (FIG. 7). A combination of strip-cast and extruded wedges can be assembled into a single hollow keystone conductor; this can include both solid and hollow wedges; and among the hollow wedges, both gas-filled and sodium-filled wedges are possible. Non-circular hollow keystones are also feasible, but this implies several different kinds of wedges will be required to assemble the hollow keystone conductor (for example, the elliptical hollow keystone conductor 113 of FIG. 6 requires keystones with two different cross-sectional shapes). This design, a hollow keystone conductor based on a range of standardized component wedges, affords a remarkable degree of control of resistance per kilometer of an elpipe pipe-shaped conductor:

- The lowest resistance corresponds to solid wedges forming a straight hollow keystone conductor 112; for optimum conductivity these wedges 115 should be extruded with well-defined partially circular cross-sections on the inner and outer surfaces of each wedge. For the lowest possible resistance the core of the keystone conductor 127 or 193 should also be a circular conductor.

- The strip cast option lowers the cost of the metal wedges in a purely aluminum-based polygonal-shaped conductor 128 about 20% compared to using extruded aluminum. The resultant hollow keystone conductor is polygonal rather than circular, but is still an example of a "pipe-shaped conductor.".

- If the economic optimum resistance for the line is higher (implying less aluminum/km is optimal) it is possible to keep the diameter of the pipe-shaped conductor constant, while reducing the amount of aluminum used per kilometer, by replacing solid wedges with hollow extruded wedges. It is even possible to stock several different extruded hollow wedges with different wall thicknesses to allow extremely fine control of elpipe resistance per kilometer that spans the range from all the wedges being the hollow extruded design with the thinnest walls, down to the lowest feasible resistance, where all the wedges are solid aluminum.

Figure 15:
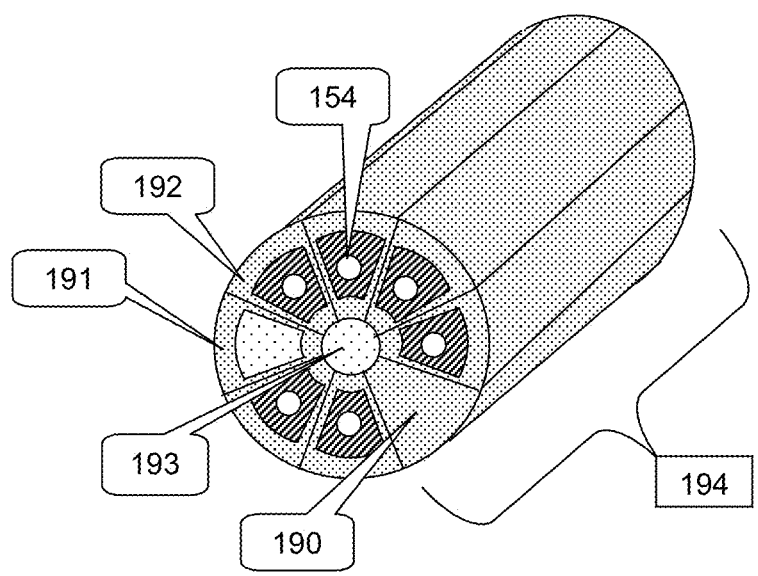
FIG. 15 shows a generalized hollow keystone conductor, containing one solid wedge, one hollow wedge, and sodium-flooded wedges.

- FIG. 15 illustrates a highly modular implementation of a hollow keystone conductor, in which some of the wedges are themselves hollow containers that can be filled with sodium. Hollow extruded wedges with solid, metallurgically bonded end caps form containers that can be filled with sodium 192, or not filled with sodium 191. A solid aluminum wedge 190 is also shown in FIG. 15 to demonstrate the flexibility of this design.

Another reason that it is appealing to use a hollow keystone conductor rather than an extruded aluminum pipe is that the size of the individual wedges is much smaller than the size of a conductor formed by combining the wedges. If for example, one were to base a 12 GW elpipe on a 30 cm diameter extruded aluminum pipe, there are a small number of aluminum extruders worldwide who could extrude this pipe, which tends to increase the cost per unit mass of the extruded product. If, by contrast, the 30 cm diameter elpipe pipe-shaped conductor is a hollow keystone conductor formed from 12 wedges, each corresponding to 30 degrees of arc in the wall of the elpipe pipe-shaped conductor, this puts the extruded aluminum components in a very conventional size range for aluminum extruders worldwide, and as a result, lower acquisition costs are anticipated.

In principle, the pipe-shaped conductor could comprise the entire conductive core of an elpipe, in which case the conductive core would couple directly with the splice module. For various reasons that will be explained in the subsequent discussion, however, it is desirable in most cases to attach a transitional segment, the splice transitional conductor, to both ends of the pipe-shaped conductor. Various desirable ends can be achieved via the splice transitional conductor, such as to transition to copper conductor at the ends, or to reduce diameter of the pipe at the ends (to allow more room for insulation in the splices) for example.

Figure 13:
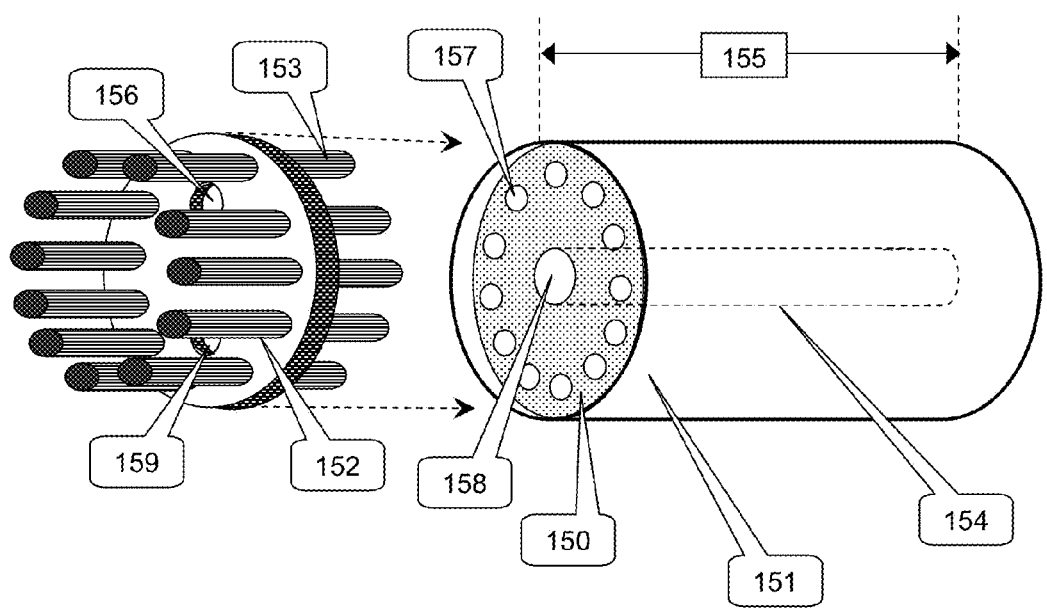
FIG. 13 shows a sodium filled steel, Invar alloy, or fiber-reinforced composite elpipe segment pipe-shaped conductor with copper or aluminum ends.

Sodium conductors are envisioned in several different designs; one example is shown in FIG. 13, in which a volume of sodium 150 is contained in a strong outer shell 151 that dominates the axial expansivity of the segment module component of FIG. 13. Said strong outer shell can be composed of metals or fiber-reinforced composites; specific desirable embodiments of the strong outer shell are steel, Invar alloy, and carbon-fiber-reinforced pultrusions. At the ends, the strong outer shell does not cover the ends, but is instead bonded to the sodium cell end plate adapter 152; it is also permissible for the strong outer shell to curl around said sodium cell end plate adapter. Said end plate adapter 152 is preferably made of aluminum or copper. The electrical connection between the end plate 152 and the sodium in volume 150 is aided by connection rods 153 that are imbedded into the sodium via holes in the sodium 157; the connection rods 153 are mechanically and electrically bonded to the end plate 152, and extend far enough into the sodium to create excellent electrical connectivity of the end plate 152 to the sodium in volume 150. In this design, the axial length of the segment 155 will be determined by the metal enclosure 151 as long as the enclosed sodium in 150 has sufficient volume within the enclosed volume (defined by the volume within the outer metal tube 151 and the end plates 152) to expand and contract. Because sodium is very soft and malleable compared to the enclosure, it will deform so that its volumetric expansion is forced to be primarily radial rather than longitudinal, as long as the sodium is not volumetrically constrained. This could require that the enclosure is strong enough to force the plastic flow of solid sodium rather than allowing the sodium to dominate the overall thermal expansivity of the segment module component of FIG. 13; however, the way that sodium is introduced into the segment module component conductor of FIG. 13 means that normally sodium will shrink to a smaller size than the outer shell 151, rather than expand to push against the end plates.

Within the mass of sodium is a volume compensation device 154 that can be easily compressed when liquid sodium is flowed into the volume shown as 150 through entry port 156. During said compression of 154 the volume change of 154 should be at least as large as the expected volume reduction of the sodium in 150 as it crystallizes and undergoes thermal contraction down to the minimum operating temperature of the module. Said volume compensation device should desirably also be able to survive a vacuum, since a highly desirable implementation of FIG. 13 would involve evacuating volume 150 through vacuum port 159 prior to introduction of pressurized liquid sodium through port 156. After the correct amount of sodium has been placed into the segment module component of FIG. 13, the ports 156 and 159 are sealed. After filling volume 150 with molten sodium, the sodium crystallizes and contracts, and it may pull away from one or both of the endcaps, but it will remain in good electrical contact with the end plates via the connection rods 153.

One way to implement the volume compensation device 154 is for it to be a flexible tube inflated with a non-reactive gas. The volume compensation device 154 could also be a polymer foam in which the foam cells are inflated with a non-reactive gas such as nitrogen or argon, as may be produced for example in the MuCell® Process of Trexel, Inc, Woburn, Mass., USA. Any components such as the volume compensation device outer surface that are exposed directly to metallic sodium must not be reactive with sodium at any temperature within the contemplated range of temperatures over which the elpipe segment may operate. Similarly, any molecule that might escape from inside the volume compensation device (such as an inflation gas) should also not be reactive with sodium. Gases however are not the only compressible phase that can be used to design a volume compensator, as various microporous and/or nanoporous open-cell polymer foams or some forms of aerogel (for example the hydrophobic granular aerogel sold by Cabot Corporation, Boston, Mass., USA as Nanogel™) could also serve the function of providing a compressible volume to compensate for volume changes of the sodium due to thermal expansion and/or melting.

A desirable characteristic of the elpipe segment design of FIG. 13 is that the axial thermal expansion is dominated by the wall material 151, which can be selected to have much lower thermal coefficient of expansion (TCE) than aluminum. The TCE of steel is about one third that of aluminum, and Invar (an iron/nickel alloy) has a TCE around $\frac{1}{30}^{th}$ that of aluminum. [Common grades of Invar have a thermal coefficient of expansion measured between 20-100° C. of about $1.2 \times 10^{-6}$ $K^{-1}$ (1.2 ppm/° C.). However, extra-pure grades (<0.1% Co) can readily produce values as low as 0.62-0.65 ppm/° C.] TCE may vary in different directions for anisotropic solids such as fiber reinforced composites, indeed some grades of carbon-fiber reinforced polymer composites can have zero thermal expansivity in the fiber orientation direction. Using such low TCE materials makes it easier to deal with thermal expansion of the elpipe segments, and would simplify the design of the splice modules.

Figure 14:
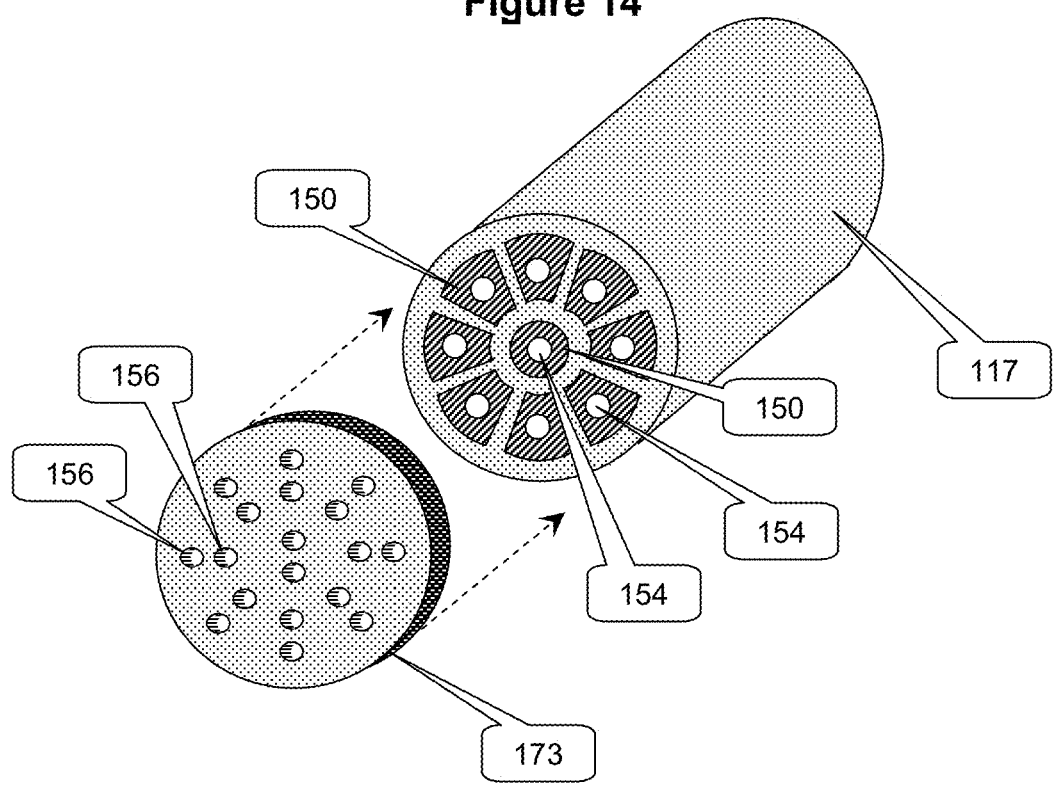
FIG. 14 shows an extruded pipe-like primary conductor shape, similar to a hollow keystone conductor, but all one piece with numerous cavies that could be filled in with sodium.

FIG. 14 shows an alternative and flexible way of using sodium, in which pockets for sodium are formed in an extruded aluminum conductor. Hollow cavities 118 within an aluminum extrusion 117 are converted to sealed chambers by a solid, metallurgically bonded aluminum end cap 173. These sealed chambers can either be left alone, in which case they contain gas, or they can be filled with sodium. When they are filled with sodium, the chambers are filled through a fill hole through the end cap 156, which is sealed after the chamber is filled with liquid sodium at modest pressure (<1 MPa). Each chamber that is filled with sodium also contains a compressible volume compensation device 154, which is mounted to the ends of the chamber via an attachment point to the aluminum end cap, and held under tension between the ends of the chamber. When a chamber is filled with sodium it is first evacuated, then sodium is forced into the chamber under pressure, so that the volume compensation device is sufficiently compressed so that as the sodium crystallizes and contracts, the volume compensation device expands and prevents formation of a void within the sodium. Preferably, the volume compensation device should be located within the sodium-filled chamber so that it is surrounded by the last portion of the sodium to crystallize. Such a conductor can be designed so that most of the current is carried by the sodium, yet the sodium is safely contained within the aluminum shell. (An advantage of using sodium to carry most of the current it is that sodium is much more economical than aluminum).

Figure 11:
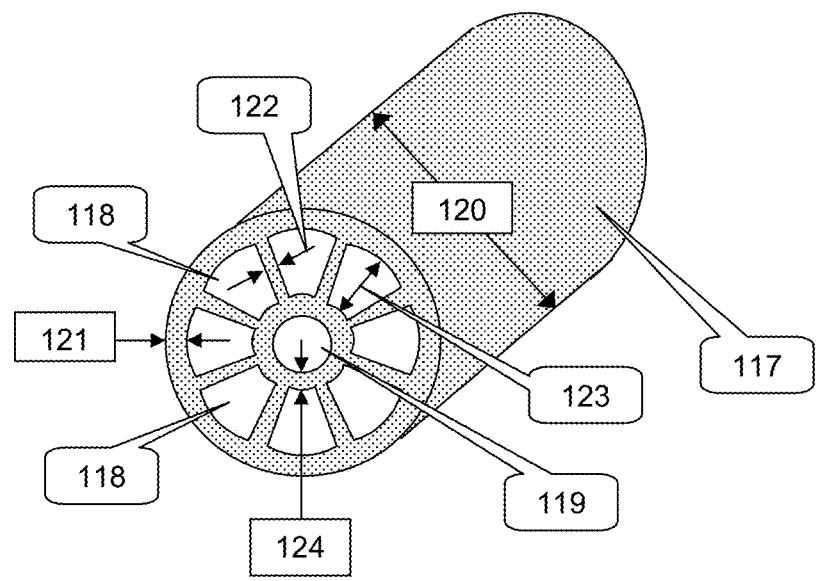
FIG. 11 shows a complex primary conductor extrusion with multiple hollow cavities.

There could be only one cavity inside the aluminum extrusion that can be filled with sodium to adjust and optimize the resistance of a particular elpipe segment, as in a simple extruded tube 110, fitted with metallurgically bonded end caps, sodium fill adapters, and volume compensation devices (similar to FIG. 13, but with aluminum walls). This shape however affords little opportunity for fine tuning electrical resistance of the segment, as is desirable; one can either fill the inner cavity or not fill the inner cavity with sodium, but doing a partial fill is risky because the sodium could potentially melt in service, and pool up at one end if the elpipe segment is installed on a slope. The aluminum extrusion design 117 of FIG. 14 is also shown in FIG. 11; this extrusion design has the same outside diameter 120 as the simple tube 110 in which the same amount of aluminum is used per unit length, and therefore the DC electrical resistance is the same per unit length as the simple aluminum tube 110. The design of 117 has nine independent cavities (eight wedges and one central hollow cylinder) which can either be filled with sodium, or not filled with sodium depending on the economic optimization of elpipe resistance per unit length (which depends on many factors). The number of independent cavities can also be adjusted over a wide range; certainly two to twelve independent cavities are feasible for an extruded aluminum shape, and not all the cavities need be the same size nor internal volume as in 117 (resulting in an even greater ability to fine tune resistance of a segment in response to economics of a particular elpipe line).

Said cavities may be filled with sodium in the factory when the elpipe conductor is manufactured, or the system can be designed so that upgrading an existing elpipe by reducing its resistance on installation or after it is initially put in service is possible. Either way, such a design leads to flexible alternatives that will reduce inventory costs for components in the scenario that HVDC elpipe links may well be designed for a range of capacities from 2-200 GW, and energy loss during transmission may vary from 0.5-5% per 1000 km, depending on design criteria.

It is also true that an aluminum extrusion that has the shape shown in 117 will have greater strength against crushing, and therefore also greater resistance to kinking and bending compared to an aluminum tube made of the same alloy, with the same diameter 120 and mass per unit length m/L of aluminum as the simple tube 110. There exists an optimum shape and orientation for an aluminum extrusion that has a given diameter and a given volume of aluminum per unit length to have the maximum crushing and bending resistance, which can be found through the known art of mechanical design. In the specific eight-cavity case illustrated as 117 in FIG. 11 and again in FIG. 14, the set diameter 120 and volume of aluminum per unit length imply a relationship between the various dimensions 121, 122, 123, 124 that define the shape; within the allowable space of all combinations of these dimensions that produce the correct volume of aluminum per unit length, there exists a design with maximal crushing strength; this design may be optimal for aluminum and aluminum/sodium-based elpipes, since it is desirable for the elpipe segments to be robust. Note also that functionally similar shapes can be assembled from wedges, as shown by 112, 113, and 114, and shown in FIG. 4 through FIG. 6. In the case where wedges are assembled into a hollow keystone conductor 112, both bending stiffness and crush strength of the non-bonded composite hollow keystone structure is much less than the corresponding single-piece structure 117 of FIG. 11, but it can be greatly increased by welding the various wedges together along the outer perimeter, or by otherwise structurally interconnecting the wedges, for example by tightly wrapping a high modulus glass- or carbon-fiber based composite around the hollow keystone conductor.

Figure 56:
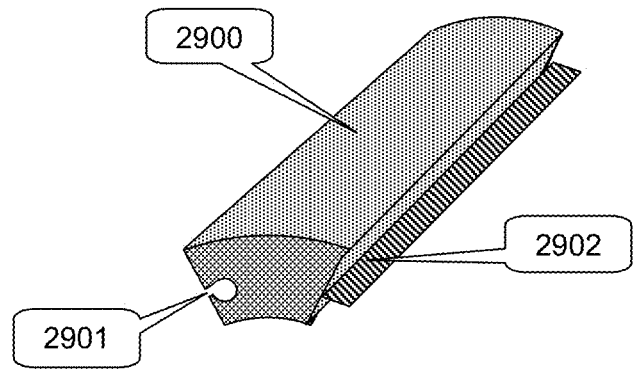
FIG. 56 is an oblique view of a keystone conductor segment with a locking tab.
Figure 57:
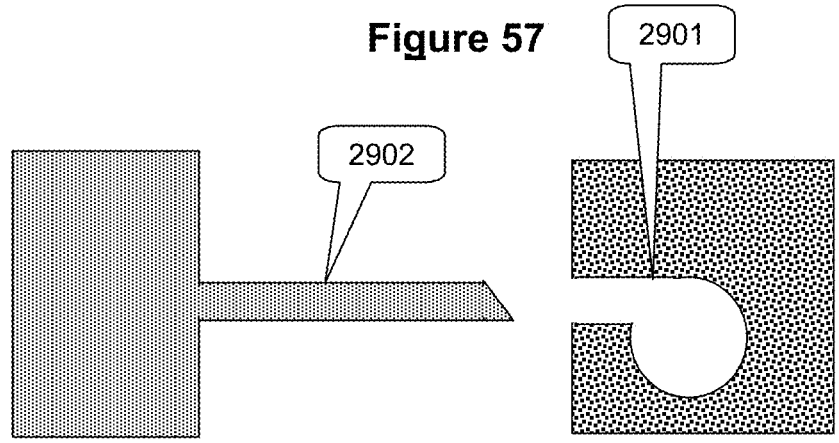
FIG. 57 is an end view of a locking tab and receptacle, prior to mating.
Figure 58:
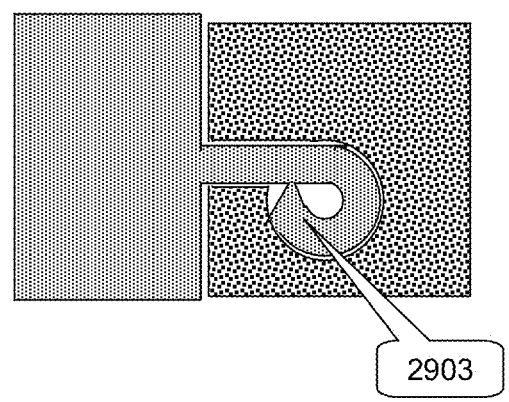
FIG. 58 is an end view of a mated locking tab and receptacle.

Another method to join keystone segments together to produce a single large conductor structure is shown in FIG. 56 through FIG. 58. Extrusion 2900 has one or more female locking slots 2901 along its full length. In a corresponding position on the opposing side of the extrusion there are an equal number of male locking tabs 2903, which can either run the full length of the extrusion or be partially removed so that they only traverse a portion of the length. FIG. 57 shows the detail one such method to design female locking slot 2901 and male locking tab 2902. In FIG. 58 the two pieces have been pressed together, resulting in the male locking tab 2902 being rolled into its locking shape 2903. To form the larger conductor, a number of extrusions 2900 are fitted together loosely to form a cylinder, and this is then squeezed circumferentially to clench the locking tabs as in 2903. Although described as a single assembly operation, it is clear that assembly could be done in multiple steps, with each leading up to the final involving fewer than the complete compliment of wedges 2900. Numerous methods, including but not restricted to rolling, can be used to apply the force needed between wedges to achieve the locking.

FIG. 15 illustrates an elpipe segment pipe-shaped conductor made from a circular hollow keystone conductor plus an optional circular core 193. This pipe-shaped conductor is made up of wedge sections (e.g., sections 190, 191, 192) and a core 193, which can merely be a hole through the middle of the structure, an aluminum solid cylinder, an aluminum pipe filled with gas or liquid coolant, or it can be a pipe filled with sodium. The wedge or core sections are attached at the ends to a splice transition conductor (not shown). The shape of the wedge sections fits into a hollow keystone pattern so that eight of these shapes can be bundled together to give a circular conductor. It is unlikely in practice that a solid wedge 190 would be combined with both hollow aluminum gas-filled wedges 191 and sodium filled wedges 192 in a single conductor but this would be possible, and FIG. 15 shows the flexibility of this design.

The volume compensation device 154, which is needed in any sodium-filled cavity that might not be level, can comprise a gas bladder or polymer foam cylinder that must be made of materials that do not react with sodium. Where it is gas filled, it should preferably contain argon or another non-reactive, slow permeating gas in such a way that it remains inflated from end to end, even if the elpipe segment contains liquid sodium and is tilted, up to a critical design angle θ from horizontal. For the case of a simple bladder, this requires that the wall tension within the gas bladder wall remains above $\rho_{Na} g L_s \sin(\theta)$ to avoid the lowest part of the bladder being pinched closed by the gravitational head pressure of the sodium melt; where $\rho_{Na}$ is the density of molten sodium; g is the acceleration of gravity, and $L_s$ is the length of the elpipe segment containing liquid sodium. It is easier to guarantee that all the gas does not flow to one end of the sodium cavity if a foam cylinder is used instead of a gas bladder. The inflated gas bladder or foam cylinder is so disposed inside the sodium-filled cavity that it:

allows for the thermal expansion of melting sodium without overstressing the walls holding in the sodium;
prevents bubbles forming within the solid phase as the sodium melts and re-solidifies even when the elpipe segment is installed on a slope.

A nearly constant cross-section in the sodium within the conductive element should be maintained, in the case that the conductive element contains sodium, since if the bladder or a gas bubble decreases the cross-sectional area of sodium in one part of the volume inside the containment shell (whether the shell is steel or Invar (as in 151), or aluminum (as in 118, 119, 125, or 151) the resistance per unit length will increase in the region of the elpipe where the area of sodium normal to the current flow is reduced due to either a bubble or increased cross-section of the volume compensation device (or both), creating a hot spot. (It is impossible for the gas bladder or cylindrical foam to be completely uniform in cross section if the elpipe segment is tilted during use, but is desirable that the variation in cross-sectional area of the sodium normal to the current flow direction does not change by more than about 5% or so.) Maintaining a near constant cross-sectional area of the gas bladder or polymer foam cylinder requires anchoring the gas bladder at its ends to the two end caps (152, 173 for example), so that it is also under axial tension.

The gas bubble or foam cylinder that exists within the sodium-filled cavity is compressed as the sodium melts, keeping pressure inside the pipe within acceptable limits while preventing bubbles forming in the solid phase as the sodium re-solidifies. The axial tension on the volume compensation device 154 plus the inflation pressure 158 (either inside the gas bladder or the individual cells of the foam) keeps the bladder or cylindrical polymer foam cross-sectional area within the enclosing pipe 151 nearly constant.

Sodium has several advantages for use in elpipe conductors. For one, sodium is the least expensive conventional conductor. Also, the endothermic melting of sodium increases the adiabatic run time of an elpipe in overload before reaching the maximum safe operating temperature for the insulation (typically 105° C. for XLPE). Another advantage is that the low strength and stiffness of sodium makes it feasible to construct an elpipe segment with very low axial thermal expansivity, as in FIG. 13.

Figure 41:
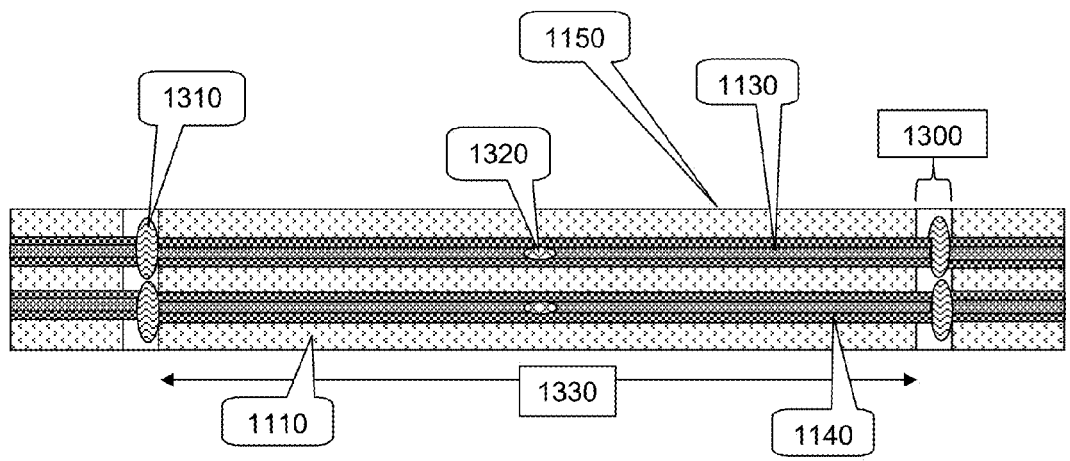
FIG. 41 is a top cross-sectional view showing a conductor segment with two joints.
Figure 53:
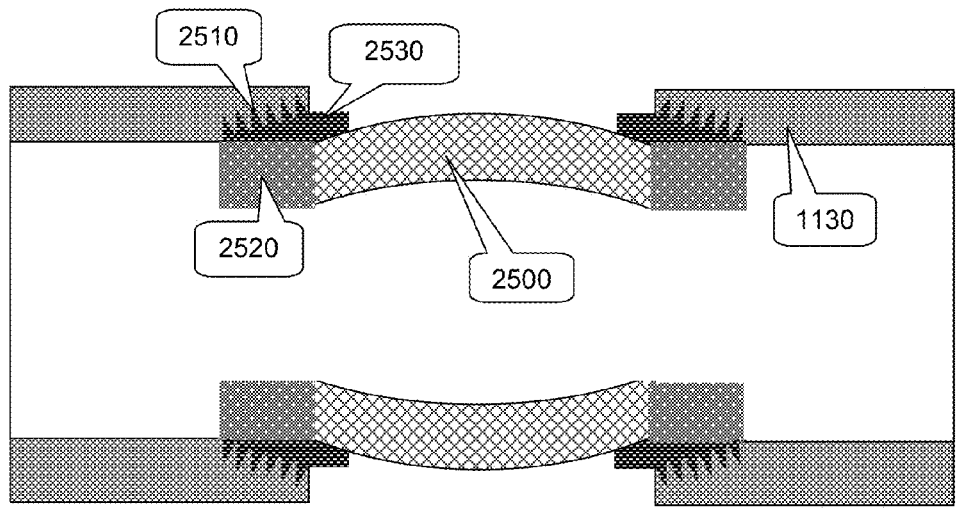
FIG. 53 is a lateral cross-sectional view of a threaded braided sleeve electrical expansion joint.

The amount of expansion and contraction expected in a 15 meter aluminum conductor segment under operational temperature extremes is a little less than ±2.5 cm. Although the unrestricted expansion of XLPE insulation is even greater (±21.5 cm), it is possible to anchor the splice modules so as to force the XLPE to go into stress rather than move; aluminum is too stiff to handle its expansion in this way. Two alternative ways to handle this thermal expansion of aluminum are to have the splice modules compensate for this entire expansion and contraction, or to create segment modules that compensate for expansion and contraction in some way, as for example the Invar alloy shell, sodium-based elpipe segment of FIG. 13, which can be designed to give much lower longitudinal expansion than an aluminum tube. It is desirable, however to have a design for an aluminum-based segment module in which the module per se also includes an expansion joint. This would simplify the splice module significantly, which then only needs to allow angular displacement. By dividing the aluminum pipe-like conductor into two sections, as shown in FIG. 41, and placing an expansion joint splice (1320) as shown in detail in FIG. 53 and FIG. 54 between the sections, the ends of the aluminum conductor in the splice area (1300), as shown in FIG. 41, will not move with changes in temperature. (In the case that the expansion joint is in the middle of the pipe, the magnitude of movements will go from zero to maximum as one moves from the ends towards the center of the section, and then zero out and change sign at the center of the expansion joint). In this case the electrical splice and its insulator (1310) in the splice area (1300) of FIG. 41 need not accommodate changes in conductor length. Also, if there are any particulates generated by the motion of the aluminum conductors within their primary insulator tubes, due to expansion and contraction of the aluminum conductor for instance, these will be relatively distant from the splice area. In the splice area there will be only very minor movements.

Figure 16:
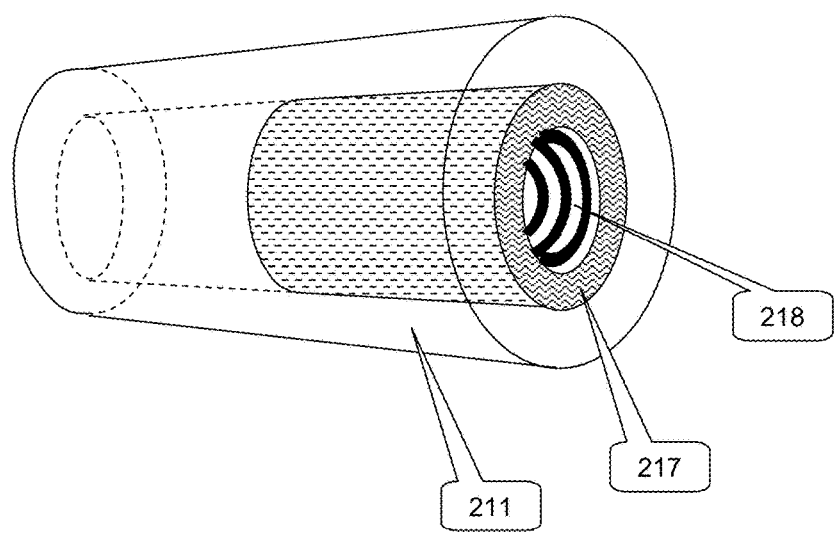
FIG. 16 shows one of two basic designs for a splice transition conductor that is installed inside the pipe-shaped conductor.

Another variant of the metallic conductor portion of an elpipe segment is shown in FIG. 16, which shows one end of an elpipe core conductor; the other end is identical. This involves a pipe-shaped conductor segment 211, to which, attached at each end, are splice transition conductors 217. In this case, the splice transition conductor 217 is a copper bushing that has been inserted into the center of the aluminum pipe-shaped conductor 211 and is electrically bonded to it. Conductors 217 have internal threads 218.

Figure 17:
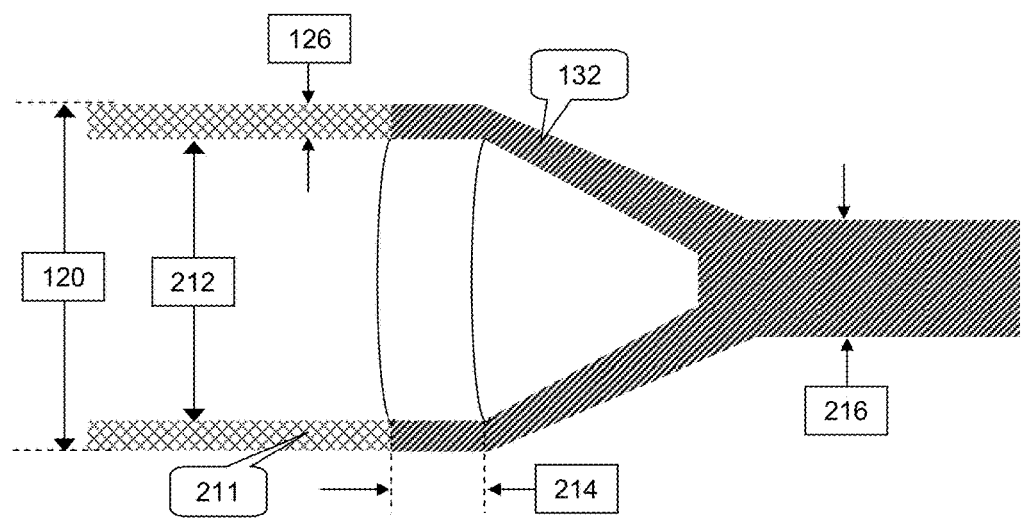
FIG. 17 shows the other basic design for a splice transition conductor that is spin-welded to the end of the pipe, and transitions to a smaller diameter for mating with the splice module.

FIG. 17 shows a second kind of splice transition conductor that does not involve copper. In this case, a pipe-like conductor 211 that is an aluminum tube has been spin-welded to a splice transition conductor 132 that reduces the diameter of the conductive core from 120 to 216; in this case after reduction, the end of the core conductor is a circular cylinder of aluminum with the same cross-sectional area as the pipe-like conductor. This splice transition conductor provides a reliable mating surface for an aluminum butt weld for example, though butt welds are not a favored way to make a connection to the splice module. Splice transition conductor 132 is spin-welded to the end of the aluminum pipe-shaped conductor 211; at a distance 214 past the junction of the pipe-shaped conductor and the splice transition conductor, the diameter of the splice transition conductor reduces from 120, the diameter of the pipe-shaped conductor, to 216, the diameter of the splice transition conductor at its end. Within this region of reducing diameter, it is desirable that the resistance per longitudinal meter of the elpipe segment does not increase. In order for this condition to be met, the amount of aluminum per longitudinal meter must increase slightly through the region of reducing diameter (because the current flows at an angle to the axis of the elpipe segment in this region). Ideally, the resistance per longitudinal meter should be less in the splice transition conductor than in the pipe-shaped conductor because it is more difficult to remove heat from the splice than from the pipe-shaped conductor. This is so for two reasons:
1. the reduction of diameter of the conductor means there is less surface area through which to shed waste heat;
2. it is desirable to apply a higher safety margin for insulation in the splice, which usually implies thicker insulation in the splice.

Splice transition conductors must be electrically connected to the pipe-shaped conductor segment well enough that the transition zone does not become a hot spot. Splice transition conductors may be affixed to the end of the main conductor segments by means such as welding, crimping, soldering, or simply through mechanical threads, optionally with lubricating and conductive paste between the threads. All these methods are capable of achieving low enough resistance through the interface between pipe-shaped conductor and the splice transition conductor that the average longitudinal resistance per unit length of the elpipe does not increase through the junction between pipe-shaped conductor and the splice transition conductor. Spin welding of the adapter to the main conductor segment is a particularly fast, reliable, and automatable way to permanently attach an adapter to the end of a pipe-shaped main conductor segment; two examples to show how spin welding can be used to attach a splice transition conductor to the end of a pipe-shaped main conductor segment are shown in FIG. 18 and FIG. 19.

Figure 18:
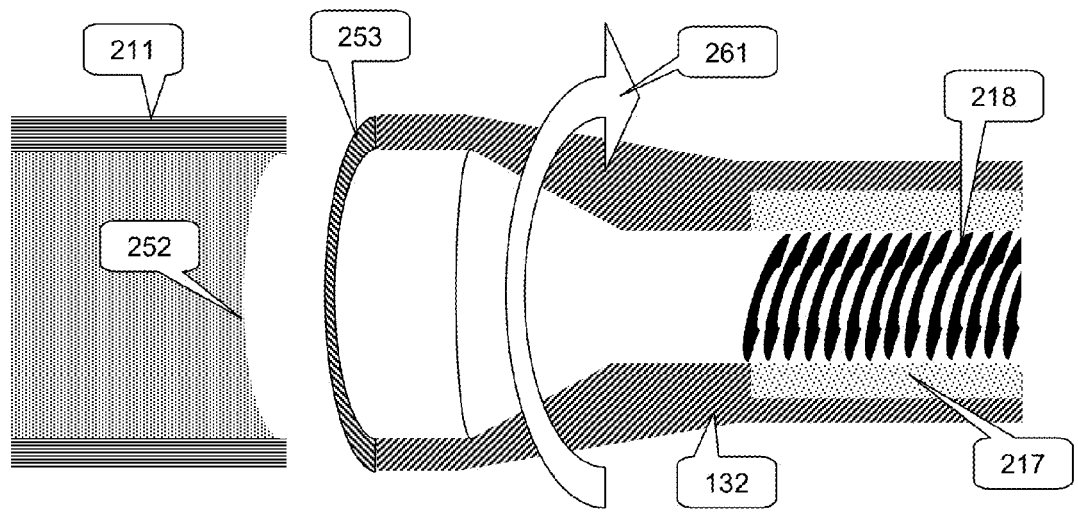
FIG. 18 shows spin welding to attach a splice transition conductor to a pipe-shaped conductor, where both have square ends.
Figure 19:
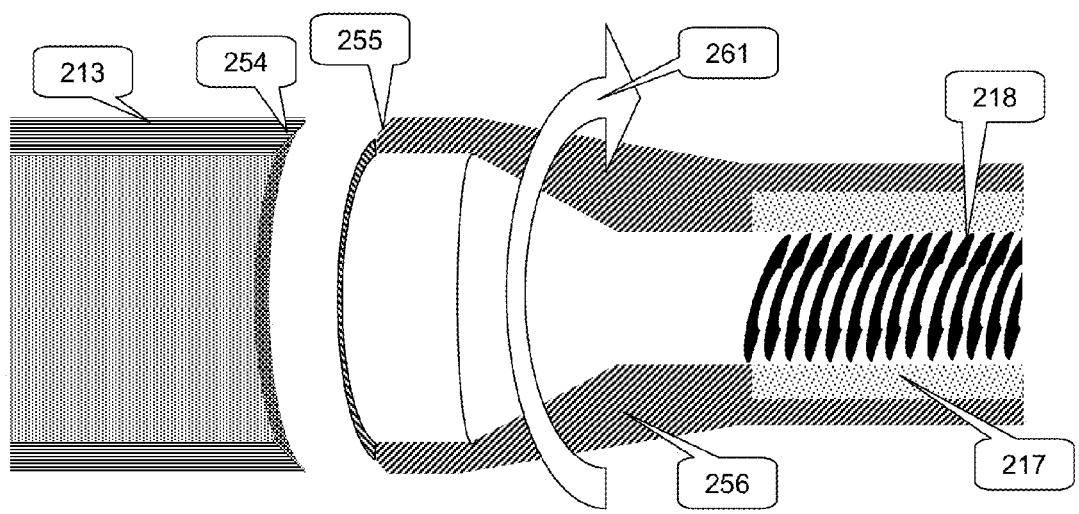
FIG. 19 shows spin welding to attach a splice transition conductor to a pipe-shaped conductor, where both have mating chamfered ends.

FIG. 18 shows an elpipe splice transition conductor 132 about to be attached to an elpipe pipe-shaped conductor 211 by spin welding at rotational speed 261 the two flat faces 252 and 253; FIG. 19 shows a tapered splice in which a chamfer 254 has been reamed out of the inside of the tubular pipe-shaped conductor 213 prior to spin welding at rotational speed 261 to the complementarily-chamfered 255 splice transition conductor 256 to give greater interfacial area through the spin weld.

Consider the overall shape of the modular elpipe segments. If they are straight, then the border between the elpipe segment and the splice module is likely to go to an even larger diameter than the segment module, because in the transition between the segment module and the splice module, there will necessarily be a junction between two insulation zones; it is normal to overlap insulation layers in such an area, which makes the insulation thicker through the splice. This is one reason it is desirable to reduce the diameter of the elpipe segment module where it joins the splice module (as in FIG. 17, 120 to 216), since for the purpose of inserting the assembled elpipe (segment modules+splice modules) into the conduit, it is not desirable to have a thickening of the elpipe at the ends of the segments. In fact, one can see from simple geometric considerations that having the diameter reduced at the ends of the elpipe segments where the junction to the splice module occurs is especially desirable in terms of enabling angular divergence of each elpipe segment from its neighboring elpipe segment within the constraint of a conduit of fixed diameter (through the splice module, which is discussed below). Having the elpipe segments thinner at their ends also gives more room to fit in the carriage modules of FIG. 25 and FIG. 36 in between the elpipe segment module and the conduit wall, as shown by FIG. 68.

Figure 68:
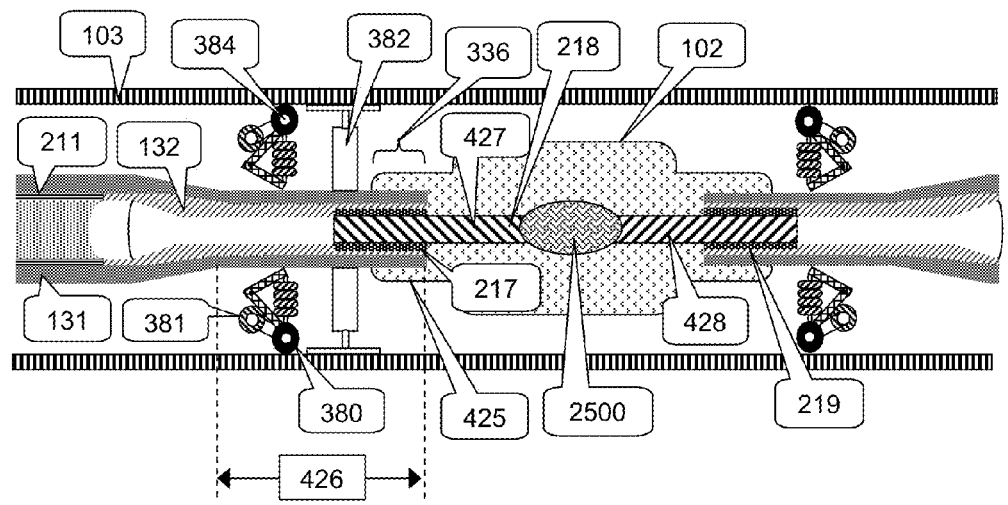
FIG. 68 shows how thinner segment ends make room for carriage modules.

FIG. 68 illustrates several desirable features of splices for an elpipe. The wheel carriages of FIG. 36 are deployed on a necked down region of an elpipe, similar to FIG. 23 and FIG. 24, but with a longer necked down region 426 to accommodate both the wheel carriage assembly and the splice transition. Air brakes 382 occur on only one side of the splice module so that the expansion/contraction between each set of locked air brakes corresponds to one segment module and one splice module. Overlap of nesting insulation collars is over the same distance shown as 336 in FIG. 31. In this case, the biaxially oriented XLPE pipe-shaped insulation 131 extends all the way to the end of the segment module, where it nests into an overlapping insulation collar 425 of the splice module 102, which is shown without interior details. The linkage between the splice module and the segment modules is created by reverse-threaded copper rods 427, 428 that extend from opposite ends of the splice module into the copper threaded features on the ends of the elpipe modules 217, 219.

Figure 20:
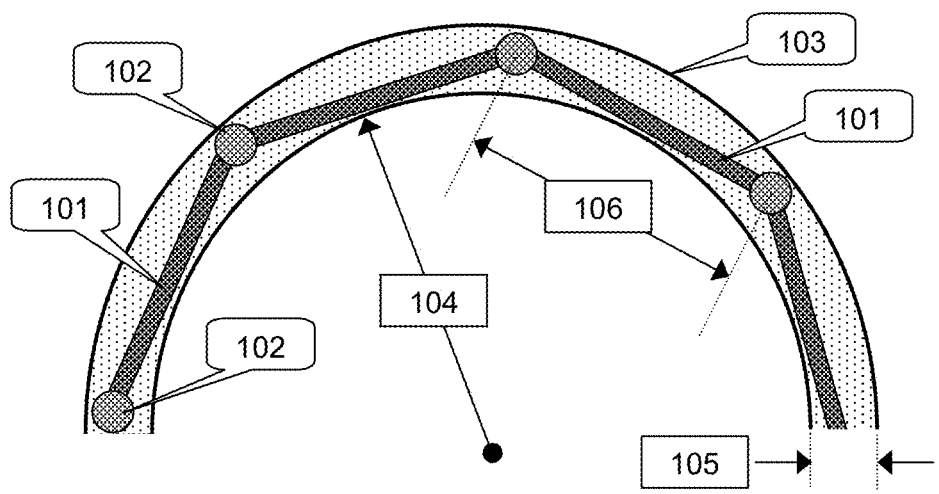
FIG. 20 through FIG. 22 show the clearance within the conduit problem in more detail.
Figure 21:
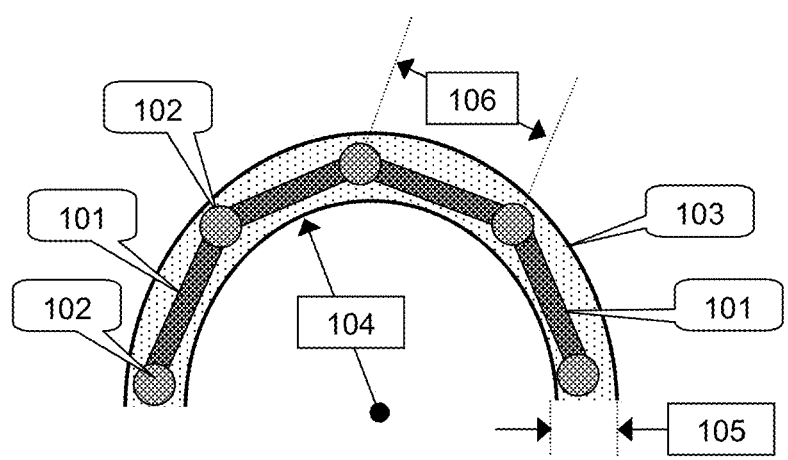
Figure 22:
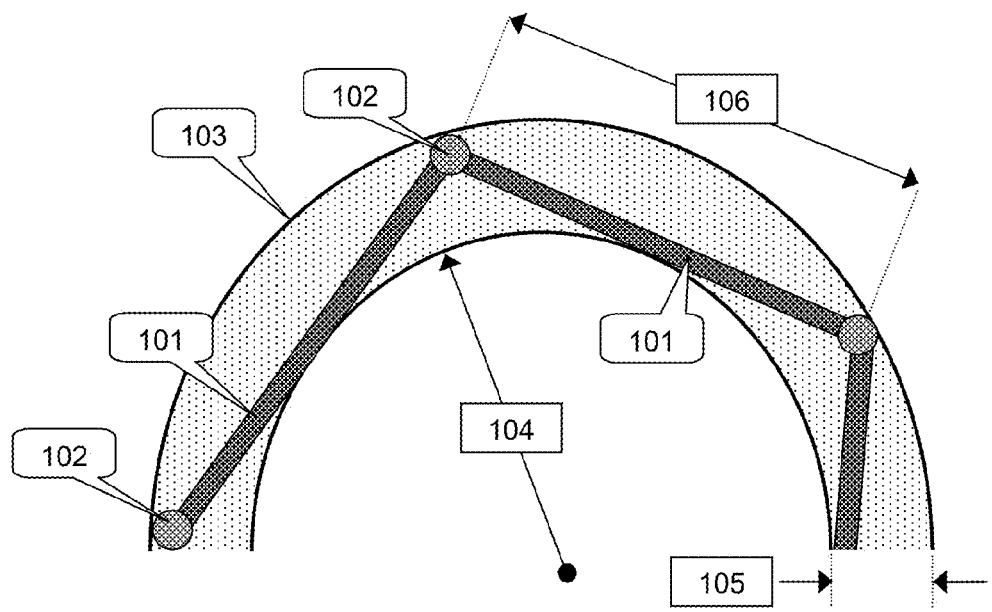

Most of the ability of an elpipe to go around curves is due to the elpipe segments fitting loosely in the conduit. FIG. 21 and FIG. 22 show how shorter segments or a larger conduit diameter allows a smaller bending radius (more curvature), compared to FIG. 20.

One implementation of the splice transition conductor is to integrate it with the end cap insulator. For example, the end cap insulator 280 can be bonded to the splice transition conductor as in FIG. 23, or the end cap insulator 281 could be designed to snap fit over the end of a tensioned elastomeric pipe-like insulator 131 (XLPE or EPDM, for example), as in FIG. 24.

(EPDM refers to polymers containing 45-75% ethylene, 2-8% of a cure site monomer, and the balance being propene. The most common cure site monomer is ENB (ethylidene norbornene) but other cure site monomers are also known, such as dicyclopentadiene and 1,4-hexadiene. It also refers to crosslinked elastomer compounds in which most of the polymer present is EPDM.)

Figure 23:
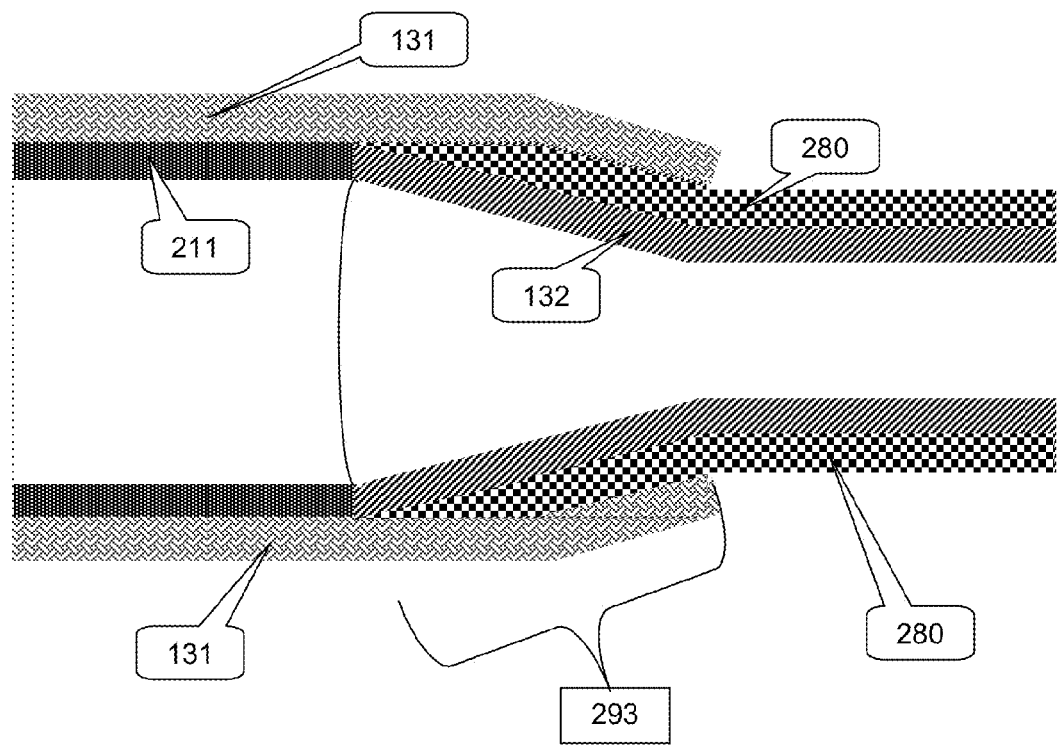
FIG. 23 and FIG. 24 show details on integration of insulation between end caps and pipe-like insulation.
Figure 24:
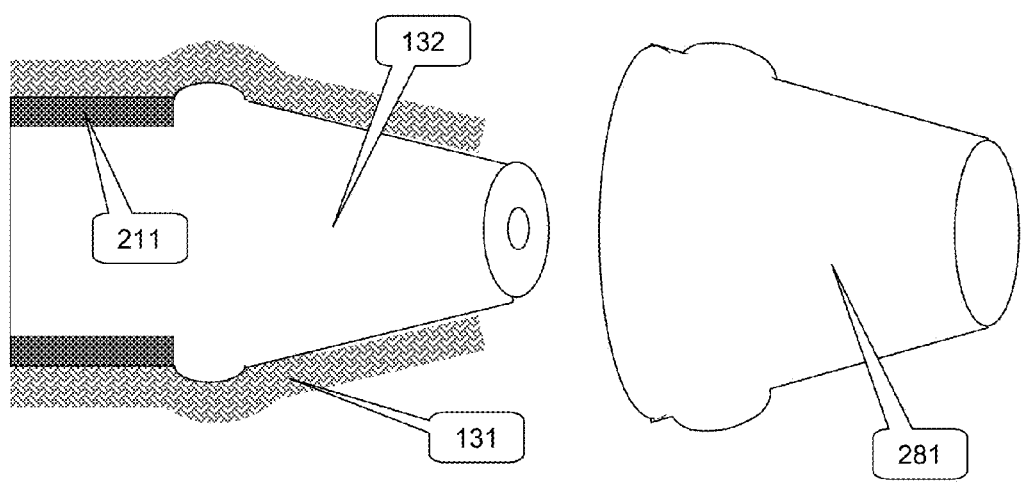

In this case (FIG. 24) there is no bonding or chemical attachment between the splice transition conductor 132 and the end cap insulator 281, but the elastomeric pipe-shaped insulator 131 is attached to the splice transition conductor 132 and snap-fit end cap insulator 281 because of a mechanical force exerted by the stressed elastomeric pipe-shaped insulator 131 attempting to expand against the snap-fit end cap insulator. In FIG. 23 the elastomeric pipe-shaped insulator 131 overlaps onto a transition region 293 of insulation 280 that is attached mechanically or bonded to the splice transition conductor. This will be discussed in more detail below.

The next component of the elpipes is the pipe-shaped insulator. This portion of the insulation is the most flexible portion of the insulation in terms of the materials that can be used, which can range from liquids to ceramics. If the insulator is a solid, it may either be bonded to the conductor or not bonded to the conductor. If the insulator is bonded to the conductor, then it is essential to know how serious a loss of bonding is. If a loss of bonding would threaten the integrity of the insulation, then one would at least have to do extensive testing to prove that the bond would survive in service. But no matter how much testing is done, there will always be a question about reliability because of possible debonding. Therefore, a preferred method is to have no mechanical attachment between the elpipe pipe-shaped conductor and the pipe-like insulator. We will discuss below these options for the pipe-like insulator:

1. elastomers
2. plastics
3. thermoset and 2-part curing polymers
4. glass and ceramics
5. hybrid designs involving both hard insulating materials and elastomers in nested designs.

Elastomeric tapes have a long history as electrical insulators, and one reason they have been favored is because layers of stretched elastomeric tape create a pressure that inhibits void formation, and increases the voltage withstand capacity of the material below the elastomer layer. Biaxially stretched elastomers are often used as sleeves over electrical joints; two particular examples are crosslinked ETFE or another fluoroplastic, which is biaxially oriented above the melting temperature of ETFE, and frozen (crystallized) in the oriented state. An insulation installer places the oriented sleeve over an electrical joint, then uses a heat gun to heat the fluoroplastic sleeve such that it shrinks biaxially to form a tight-fitting covering. Hiroaki Kurihara, et al., in "Cold Shrinkable Joint for 66-kV and 110-kV XLPE Cables Applied to Practical Transmission Lines", from the Furukawa Review #20, 2001, disclose another way to install a biaxially oriented elastomer sleeve over a high voltage joint.

Consider the elpipe segment conductor module of FIG. 12. This module has smooth, streamlined contours going from diameter 140 at the ends to diameter 141 in the middle. At the ends, the splice transition conductor is mated with the end cap insulator by a desired means (for example, this may an adhesive bond or be based on mechanical interlocking). The smooth contours of this design enable stretching and pulling an elastomeric tube over the entire segment module conductor. Examples of elastomer tubes that are useful in this application include crosslinked polyethylene and various copolymers of ethylene such as EPDM, EPR (EPR means "ethylene-propene rubber," it refers to polymers containing 40-75% ethylene, with the balance being propene; it also refers to crosslinked elastomer compounds in which most of the polymer present is EPR.), and various copolymers of ethylene with 1-alkenes, such as particularly 1-octene (Engage™ polymers from Dow Chemical Company of Midland, Mich., USA); also silicone rubber and various solution polymerized diene-based polymers, such as cis-polybutadiene (BR), cis-polyisoprene (IR), and solution SBR. (SBR is usually made by emulsion polymerization, in which case the polymer contains polar and/or ionic contaminants which are detrimental for insulation properties. When used in this document, SBR refers to SBR polymers prepared in solvent, using a non-free radical polymerization mechanism, such as the Duradene™ and Stereon™ polymers from Firestone Polymers of Akron, Ohio, USA. It also refers to crosslinked elastomer compounds in which most of the polymer present is SBR.) Generally, polymers produced in solution or in a bulk polymerization are preferred over latex based polymers (NR, SBR, NBR) because leftover residues from latex emulsifiers and/or stabilizers can affect electrical insulating properties.

Figure 28:
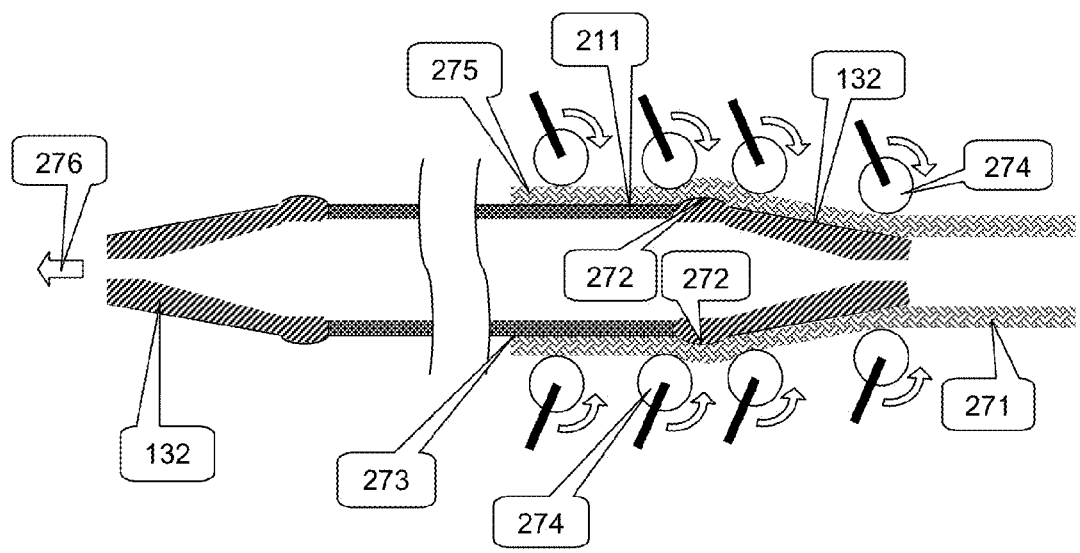
FIG. 28 shows putting an elastomeric pipe-shaped insulator over a conductor.

There would likely need to be a lubricating fluid or grease on the surface of the module to enable this pulling of an elastomer over the segment module conductor of FIG. 12, as shown in FIG. 28. This lubricant can either be compatible with the elastomer (e.g., mineral oil with EPDM), or it can be insoluble in the elastomer (e.g., a silicone oil-based lubricant with a polyolefin-based elastomer), or it can be an adhesive such as a two-part epoxy or urethane reactive system with sufficiently long gel time to allow positioning of the elastomer layer before it cures. When a compatible lubricant such as mineral oil or petrolatum is used to lubricate the segment module conductor, it is important that it not dissolve into the elastomer too quickly; however, after it has done its job with lubrication during the pulling of the elastomeric pipe-shaped conductor over the segment module conductor, it will dissolve into the elastomer and no longer be present at the interface.

Stretching of an elastomer tube over the segment module conductor can be efficiently accomplished by a robotic gripper or a series of rollers 274 as in FIG. 28 that pulls the un-oriented elastomer 271 over the lubricated segment module conductor, and in the process also imparts a force 276 on the elpipe segment conductor that requires it to be held during the operation of the puller unit of FIG. 28. Pulling the elastomeric pipe-shaped insulator over the tapered segment module conductor causes the insulator to become biaxially oriented over the middle section of the module, and results in a pressure at the conductor surface that originates from the elastic retractile force of the oriented elastomer.

Another way that an elastomer tube may be installed over the segment module conductor is to inflate the tube with a gas or liquid, and freeze the rubber in this biaxially oriented state; then the frozen rubber tube is quickly inserted over the segment module conductor, and it contracts onto the segment conductor module as it heats up. When the elastomer insulating sleeve is applied in this way (by contraction of a frozen, biaxially oriented elastomer tube), lubrication at the interface between the elastomer and the metal is not essential.

A similar setup to FIG. 28 can be used in electrical testing of an elastomeric pipe-shaped conductor before it is installed onto the elpipe segment module. In this scenario, a test mandrel is substituted for the conductive core of FIG. 28, and elastomeric tubing is tested in a biaxially oriented state by an electric field applied between the mandrel and a test electrode outside the biaxially oriented elastomeric pipe-shaped conductor.

Note that many of the elastomers that are most favorable for use in electrical insulation contain polyethylene crystalline domains at room temperature (XLPE, some grades of EPDM, EPR, and Engage™ polymers, for example). For such polymers, there is a large reduction in stiffness when the temperature is high enough to melt these crystallites (as may readily seen by running differential scanning calorimetry on the crosslinked ethylenic elastomers); it will be desirable though not essential to stretch these polymers above the melting temperature of at least most of the crystallites.

Multiple elastomer tube insulators can be sequentially applied over the segment module conductor. These may have the same or different compositions and properties in general. After the full complement of elastomer sleeves (which are embodiments of pipe-shaped insulators) are applied to the outside of the segment module conductor (e.g., the conductive core of FIG. 12), an insulated segment module is the result, additional end-cap insulators may still need to be added to complete the segment module. This approach has the advantage that biaxial orientation of the insulator creates a pressure inside the insulation that inhibits electrical breakdown, and that in the case where multiple sleeves are deployed, the test voltage for each individual sleeve is reduced.

Stressed elastomers, because of rubber elasticity, go from positive thermal expansivity to negative expansivity as a function of extension. There is a null point at fairly low elastic strain where the thermal expansivity of a stressed elastomer is zero in the direction of the extension stress. Thus, pipe-shaped insulators made of stressed elastomers may not have greater thermal expansivity than the conductor, which is desirable. There are at least two cases in which an elastomer can be held in a prestressed state in the pipe-shaped insulation layer of an elpipe:
1. an elastomeric pipe-shaped insulator sleeve can be stretched over the conductor (as described above), in which case strain in the elastomer is biaxial, and the conformation of the elastomer sleeve stretched over the elpipe conductor segment is self-stabilizing; or,
2. a uniaxial strain can be applied to the elastomer, possibly in addition to a biaxial stress, in which case the conformation is not self-stabilizing, and the ends of the elastomer sleeve need to be held in place against the uniaxial retractile force.

The second case has in part been discussed above, in the discussion relating to FIG. 24, which shows a snap-lock mechanism by which a uniaxially and biaxially oriented elastomeric pipe-shaped insulator can be held in place by the end-cap insulator. Such a means of deployment means that a dynamic tension exists between the pipe-shaped insulation (which is in tension) and the pipe-shaped conductor (which is in compression).

Another option for the pipe-shaped insulators are various thermoplastic polymers. Thermoplastic elastomers (TPEs) are one class of thermoplastic polymers that could be assembled with the segment conductor in much the same way described above for conventional elastomers, though in general TPEs will experience more rapid stress relaxation than covalently crosslinked elastomers. TPEs that are potentially useful in the biaxially oriented sleeve insulators discussed above include triblock copolymers such as SBS: styrene-butadiene-styrene multiblock copolymers such as Kraton™ D1101 (which is triblock) or D1186 (which is branched, having more than 2 polybutadiene-polystyrene arms extending from a core region). Kraton™ is a trademark of Kraton Performance Polymers US, LLC of Houston, Tex., USA. The polybutadiene portion of these polymers includes both 1,4-polymerized units (both cis and trans), in which the residual ethene group is in the polymer main chain, and a significant number of 1-2 polymerized units (20-40%), in which an ethene group is pendant from the chain. It also refers to formulated thermoplastic elastomer compounds in which most of the polymer present is SBS, and to crosslinked elastomers derived from SBS.

SIS: styrene-isoprene-styrene, refers to block polymer thermoplastic elastomers in which the outer blocks are polystyrene, and the inner blocks are polyisoprene. The polyisoprene portion of these polymers includes both 1,4-polymerized units (both cis and trans), in which the residual ethene group is in the polymer main chain, and some 1-2 polymerized units (but far less than in SBS), in which an ethene group is pendant from the chain. Unlike SBS, it has a methyl group in each monomer unit. It also refers to formulated thermoplastic elastomer compounds in which most of the polymer present is SIS, and to crosslinked elastomers derived from SIS.

SEBS: styrene ethylene-butene styrene, refers to block polymer thermoplastic elastomers derived from SBS by hydrogenation, such as Kraton™ G1650, G1651, or G1652 for example. After hydrogenation, the midblock of the SEBS has the same structure as a ethylene-butene copolymer. It also refers to formulated thermoplastic elastomer compounds in which most of the polymer present is SEBS. Formulated SEBS compounds such as Kraton™ G 2705 often contain polypropylene or another polyolefin and mineral oil or another low volatility hydrocarbon fluid.)

SEPS: "styrene ethylene-propene styrene," it refers to block polymer thermoplastic elastomers derived from SIS by hydrogenation. After hydrogenation, the midblock of the SEPS has the nearly the same structure as an alternating ethylene-propene copolymer. It also refers to formulated thermoplastic elastomer compounds in which most of the polymer present is SEPS. Formulated SEPS compounds often contain polypropylene or another polyolefin and mineral oil or another low volatility hydrocarbon fluid.

Various multiblock TPEs are also useful in the biaxially oriented sleeve insulators discussed above, including elastomeric TPUs (for example Pearlthane® TPUs from Merquinsa of Montmelo, Spain; and Hytrel™ polyester multiblock thermoplastic elastomer from DuPont of Wilmington, Del., USA. Dynamically cured TPEs, such as Santoprene™, produced by Exxon Mobil of Houston, Tex., USA may be less useful than block polymer based TPEs due contamination by chemical residues of crosslinking. Using a multiblock TPE rather than a chemically crosslinked thermoplastic vulcanizate (TPV) such as Santoprene has the advantage that these are free of crosslinking residues, which may compromise dielectric strength. Any TPE has the advantage that any scrap generated because of electrical testing of the elastomeric tube can be recycled (after removing and discarding the flawed area). Among the TPEs, those which are especially clean and free of polymerization residues, such as medical-grade SEBS and TPU are especially desirable.

(TPUs include Texin® and Desmopan® From Bayer AG, Leverkusen, Del. Thermoplastic polyurethanes bridge the gap between rubber and plastics. These materials are available in grades that go from very soft and flexible to very rigid.)

Thermoplastic polymers also include a wide variety of hard plastics, some of which are excellent insulators; for example, polyimide, polybutylene terephthalate (PBT), polyphenylene sulfide (PPS), polyphenylene ether (PPE), some types of hard thermoplastic polyurethanes (TPUs), and syndiotactic polystyrene. One potential problem with using these plastics for the pipe-type insulators of elpipe segment modules is that in almost every case the thermal expansivity of thermoplastic polymers is significantly higher than aluminum, creating a potential issue due to differential expansion of conductor versus insulator. One class of polymers does exist for which the thermal expansivity of the polymer can be well matched to that of metals, including both copper and aluminum: the liquid crystal polymers (LCP); these are thermotropic liquid crystalline polymers such as Vectra™ LCP from Ticona Engineering Polymers of Florence, Ky., USA. These are mainly polyesters that may include some polyamide linkages, in which 4-hydroxybenzoic acid is a major monomer. Unfortunately, these are not the best polymer insulators. An advantage of some of the hard polymers as a class is that some are exceptional electrical insulators, better than XLPE, and therefore capable of being used in thinner layers. Since the thermal conductivities of the polymers that are realistic candidates for high voltage insulation vary only by about a factor of 2 (most are between 0.15-0.30 watt/meter-Kelvin), reducing the thickness of the insulation is a major way that more waste heat can be removed from the elpipe.

Figure 27:
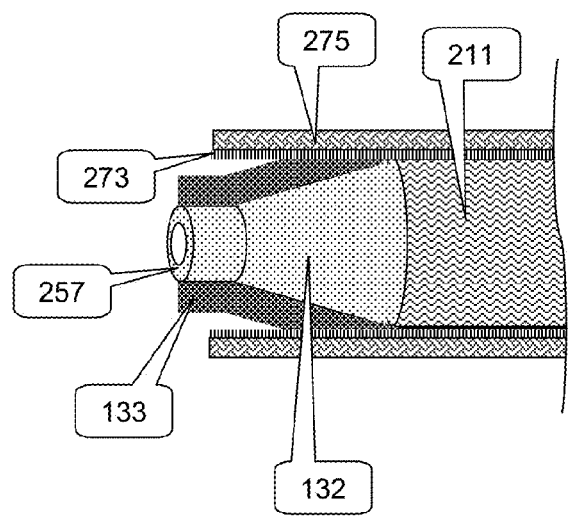
FIG. 27 shows an elpipe module using hard plastic, glass, or ceramic pipe for insulation.

FIG. 27 shows one way in which a hard insulator such as thermoplastic polymer, glass, or ceramic insulator can be used as the pipe-shaped insulator in an elpipe segment module. FIG. 27 shows an elpipe segment conductor consisting of a pipe-shaped conductor 211 bonded to a splice transition conductor 132, outside of which is a hard pipe-shaped insulator 275, which could be a hard polymer, glass, or ceramic, for example. In this case, the pipe-shaped insulator 275 slides over the pipe-shaped conductor 211 and the end cap insulator 133. In this case the pipe shaped insulator would be bonded to the conductive core at some point; perhaps in the middle, or perhaps at the opposite end cap insulator, similar to 133 but at the other end of the elpipe segment module (not shown). This constrains the differential expansion of the insulator 275 and the conductor 132, 211 so that the movement of the pipe shaped insulator 275 that is shown in FIG. 27 in respect to the end of the elpipe segment module will depend on the distance from the point where the pipe-shaped insulator is attached to the segment module core conductor. An elastomeric boot (not shown) can be used to flexibly join the movable end of the pipe shaped insulator to the end cap insulator, creating a secure reservoir for lubricating fluid 273.

Thermoset and two-part curing polymers can be used to create a pipe-shaped insulator, for example by centrifugal casting, lay-up of reactive tapes, pultrusion, or reaction injection molding (RIM). Two other commercial processes could be used in principle, molding of sheet molding compound (SMC) or bulk molding compound (BMC), though most BMC and SMC molding compounds include reinforcing glass fibers and would not be suitable in a high voltage gradient. Among the thermoset options, centrifugal casting of two part polyurethanes and polyureas into pipe-shaped insulators is especially promising for these reasons:

1. very accurate polymeric pipes can be made;
2. the component resins can be low enough in viscosity (they may need to be heated) that filtration through submicron filters is possible;
3. by separately degassing and filtering the component resins before they are combined, it is possible to produce an extremely uniform pipe, with an extremely low content of defects larger than half a micron.

Note that centrifugal casting of polyurethanes and polyureas is a flexible technique that can produce chemically crosslinked elastomers, TPEs, and hard plastics. The products can be used both as elastomers as in FIG. 12 and FIG. 28, and as a hard pipe-like insulator as in FIG. 27. It is also possible to cast pipe with multiple different layers.

Another polymeric option for the pipe-like insulators comprise options in which strips of polymer are helically wound to create an insulator, as in U.S. Patent Application 2010/0212932 (the disclosure of which is incorporated herein by reference), except that it would be preferable if these helically-wrapped insulations were created on a mandrel and separately tested before being placed onto an elpipe module. If the resultant helically wound structure is elastomeric, it can be applied to the segment conductive core as discussed above and shown in FIG. 24 and FIG. 28 for the elastomeric pipe-shaped conductors. If the resultant helically wound structure is stiffer than an elastomer, it can be applied to the segment conductive core as illustrated in FIG. 27.

Glass and ceramic insulators can also be used for the pipe-like insulator, as in FIG. 27. Both glass and ceramic insulations have advantages over polymer insulation, such as higher maximum use temperature, less change of resistivity with temperature, and higher thermal conductivity. The high stiffness of glass and ceramic combined with much lower thermal expansivity than copper or aluminum mean that it is impossible to have an elpipe in which the conductor is directly bonded to glass or ceramic, but the design of FIG. 27 is one example of how glass or ceramic insulators could be used.

Another way to create a high voltage pipe-shaped insulator is to wrap many turns of a highly insulating film, such as syndiotactic polystyrene (see U.S. Pat. No. 5,093,758) around the conductive core, or more preferably around a mandrel, following which it is tested prior to being assembled into an elpipe segment as per FIG. 27.

Given a homogeneous cylindrical non-perfect (i.e. conductivity>0) insulator of outer radius $R_4$ and inner radius $R_1$, with a DC voltage V impressed between the outer surface (at $R_4$) and the inner surface (at $R_1$) the voltage across any concentric sub-cylinder of the insulator (from $R_2$, where $R_2$ is between $R_1$ and $R_4$, to $R_3$, where $R_3$ is between $R_2$ and $R_4$) is given by Ohm's law to be the current flowing radially through the insulator multiplied by the radial resistance of said sub-cylinder. Since the circumference of a cylinder increases as its radius increases, and its radial resistance is inversely proportional to its circumference, it can be seen that there is higher resistance per increment of radius near the inside of the insulator (abutting the conductor) and lower resistance per increment of radius near the outside of the insulator. Ordinarily this causes the voltage stress (kV/mm) to be greatest abutting the conductor. The electrical stress E at radius X can be shown to be:

$$E = V/(X^* \ln(R_4/R_1))$$

Figure 71:
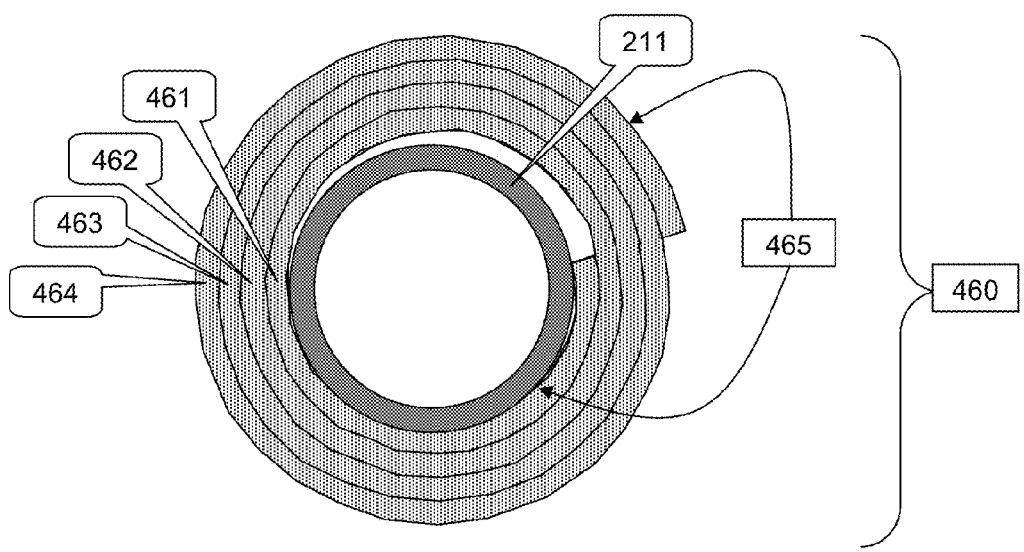
FIG. 71 shows an end view of a spirally-wound insulation structure.

Consider a spirally wrapped insulation of a single material 460, wrapped around a thermally hot inner conductor 211 that is losing heat to the environment at a steady rate, as in FIG. 71. FIG. 71 shows just four spiral wrap layers for ease of depiction, but a spirally wound insulation may contain hundreds of layers (as in prior art MIND-insulated cables). The key properties of each layer of the wrap are defined as follows: Wrap 1 of FIG. 71 has temperature $T_1$ and resistivity $\rho_1$ at the location indicated in FIG. 71 as 461. Wrap 2 of FIG. 71 has temperature $T_2$ and resistivity $\rho_2$ at the location indicated in FIG. 71 as 462. Wrap 3 of FIG. 71 has temperature $T_3$ and resistivity $\rho_3$ at the location indicated in FIG. 71 as 463. Wrap 4 of FIG. 71 has temperature $T_4$ and resistivity $\rho_4$ at the location indicated in FIG. 71 as 464. The innermost layer Wrap 1 461 of the insulation is hottest, which, given a negative temperature coefficient of resistivity for the insulator, which is typical of polymers, means this layer's resistivity $\rho_1$ is lowest, and so forth:

$$\rho_1 < \rho_2 < \rho_3 < \rho_4;\ T_1 > T_2 > T_3 > T_4$$

In the simplifying case where the conductor radius is infinite, such that the insulation layers are planar, this results in a voltage across the $i^{th}$ layer of the insulation (where i can be 1, 2, 3, 4 and $V_T$ 465 is the total voltage across the spirally wound insulation):

$$(V_i - V_{i-1}) = V_T [\rho_i / (\rho_1 + \rho_2 + \rho_3 + \rho_4)]$$

If $\rho_4 \sim 100(\rho_1)$ as may be the case in real cables insulated with XLPE film at a realistic steady state temperature profile corresponding to maximum steady state current, then the voltage stress (kilovolts/mm) across the coolest, outermost Wrap 4 will be dramatically higher than the stress on the warmest, innermost layer Wrap 1. This is the same even if the layers are mathematical constructs within a solid cable wall composed of one material; this is known as the "voltage stress inversion problem," where the highest stress is at the outside surface of the insulation instead of on the inside surface, and is particularly discussed in the paper by Fothergill et al.

Figure 72:
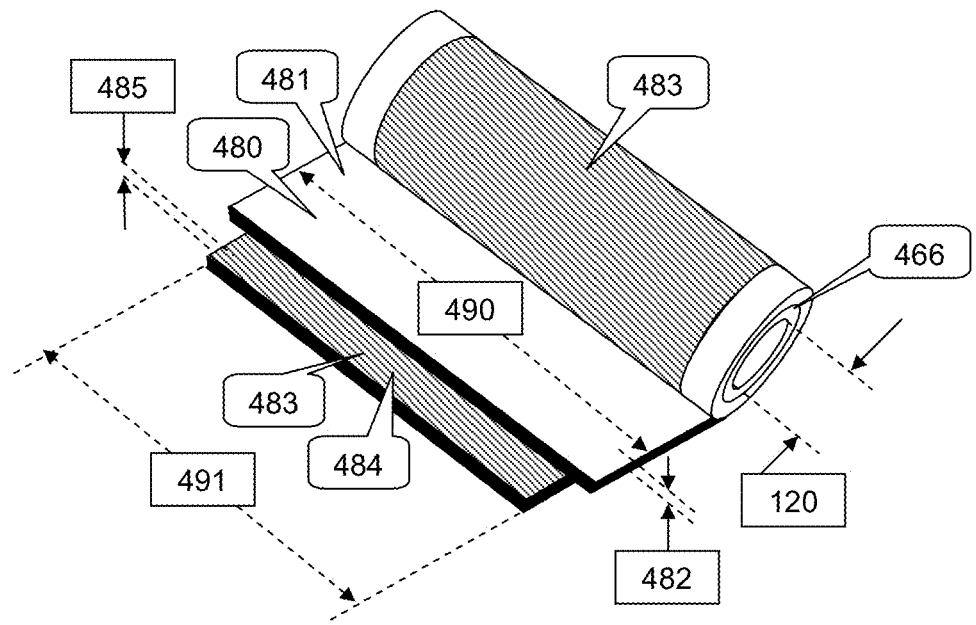
FIG. 72 shows an oblique view of a spirally-wound insulation structure.
Figure 73:
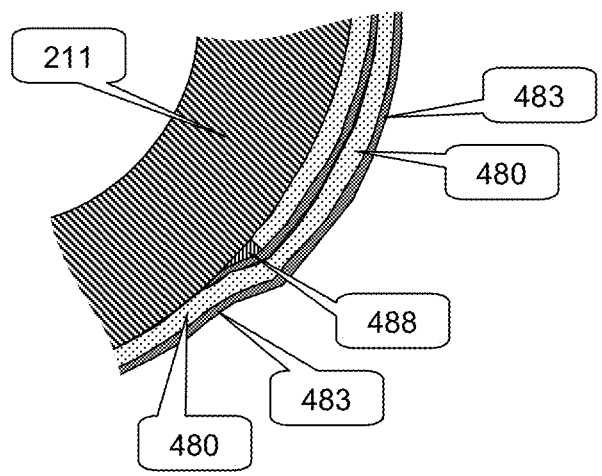
FIG. 73 shows a close-up of the center section of a spirally-wound insulation structure.

The spiral winding methodology for HVDC insulation of FIG. 71 can be refined so as to greatly reduce the electrical stress inversion problem by spirally winding a cylindrical conductor with many turns of a bilayer polymeric laminate as in FIG. 72 consisting of at least these two layers:

1. insulating Layer A 480 with high DC voltage endurance and very high resistivity $\rho_A$, with thickness $T_A$ 482 and width 490; and,
2. semiconductive Layer B 483 with high DC voltage endurance but much lower resistivity $\rho_B$ than Layer A, with thickness $T_B$ 485 and width 491, which is less than width 490. This semiconductive layer is on the outside of the high resistivity layer 480, but should not extend all the way to the edges of the laminate unless special accommodations are made to prevent shorting through this layer, such as encapsulation of the ends of the structure in a high dielectric strength insulation such as certain epoxy resins and/or polyurethanes, or simply covering the ends of Layer B with overlapping flaps of Layer A.

It is possible to limit the maximum voltage gradient though any one layer of insulation in such a composite spiral winding to a much lower total voltage difference than would occur in a similar single film winding of FIG. 71 without the semiconductive layer. Where properly designed, the overall voltage difference from the inner conductor to the outer environment can be nearly evenly distributed between each composite layer. This allows materials to be used at the much higher voltage endurance limits (volts/mm) observed for thin films compared to thick monolithic layers of the insulation. In a sense, this is analogous to MIND paper/oil insulated cables, where about 250 turns of the MIND oil-impregnated paper "film" is wrapped around a 500 kV cable; this implies about 2000 volts per layer on average, except that MIND wrapped insulations do not defeat the voltage stress inversion problem, so higher voltage stress occurs in the outermost layers when there is a significant thermal gradient that makes the inner layers warmer than the outer layers, whereas the alternating insulative and semiconductive layers of FIG. 72 make it possible to greatly reduce voltage stress inversion (though at a penalty of leaking some current to ground through the semiconducting layer).

FIG. 72 shows an oblique view of a spirally-wound insulation structure that represents one form of the annular insulator 275 of FIG. 27. The inside radius of said insulation 120, nests with a segment module inner conductor and end cap insulator as shown in FIG. 27; these parts are not shown in FIG. 72. The spirally wrapped insulation 466 takes the form of a spirally-wrapped bilayer polymeric laminate. Said laminate comprises two nested spiral layers, insulating Layer A 480 with high DC voltage endurance and very high resistivity $\rho_A$ 481, and with thickness $T_A$ 482; and semiconductive Layer B 483 with high DC voltage endurance but much lower resistivity $\rho_B$ 484 than Layer A, with thickness $T_B$ 485.

Said insulating Layer A 480 can be a plastic film or an elastomer film. Specific examples include polyimide, polytetrafluoroethylene (PTFE) and other fluoroplastics, syndiotactic polystyrene, polybutylene terephthalate (PBT), polyphenylene sulfide, polyphenylene ether (PPE) and known alloys of PPE with other plastics, XLPE, and other known highly insulating polyolefins with adequate temperature resistance to safely serve as insulators to at least 105° Celsius. Some highly insulating crosslinked polyurethane films that span the range from elastomers to hard crosslinked polymers can also be used for Layer A, as can highly insulating TPUs that span the range from thermoplastic elastomers to hard plastics.

Said semiconducting Layer B 483 can be any of the materials of Layer A doped with submicron conductive and/or semiconductive particles to produce a controlled low level conductivity such that the resistivity of Layer B is between 6-12 powers of ten lower than that of Layer A, depending on relative thickness of the layers and the diameter of the conductor 120, as discussed below. Said submicron conductive and/or semiconductive particles include zinc oxide, carbon black, and co-precipitated carbon/silica particles such as Eco-Black™ co-fumed silica/furnace black from Cabot Corporation of Boston, Mass., USA. Layer B can also comprise intrinsically semiconductive polymers. Semiconductive Layer B can also be quite thin, and may be applied to the surface of Layer A as an ink or coating applied by spray, rollers or the like; by sputtering or other coating methods that occur in a vacuum chamber; or the surface of Layer A can be chemically modified to produce a semiconductive surface, as for example by corona treatment, plasma etching, or UV radiation (for some polymers).

In one method, applicable primarily to the case that both the highly insulating Layer A, and the semiconducting Layer B are elastomers, the first layer of the multilayer insulation is adhered to the metallic core with high temperature adhesives, then the bilayer polymeric laminate wraps around the conductor a second time and is bonded to the first layer, etc. This method only works where the insulation has adequate compliance and/or well-matched thermal coefficient of expansion (TCE) to the elpipe segment conductive core, which is difficult to achieve for hard plastics like crystalline syndiotactic polystyrene. For such hard plastics, the insulation method of FIG. 27 is preferred, in which thermal expansion and contraction of the insulating annulus 275 is independent of expansion and contraction of the conductor, and in which each wrap is bonded to its neighboring spiral insulation wraps only. The spirally wrapped structure of FIG. 72 is shown partially unwrapped, to make it easier to describe the components thereof, but in normal use, the structure is wrapped into a near cylinder, with a total of N spiral wraps. With each complete wrap, the radius increases by $T_A$, 482+$T_B$, 485 so that the total thickness of the insulation is $N(T_A+T_B)$. A spiral conductive path through the semiconductive layer (thickness $T_B$, 485) is established along the whole length of the spiral insulation, except at the very ends. If the amount of current leaking out along this spiral semiconducting pathway exceeds the amount that would have leaked through an equal thickness layer of pure insulator, then the flow through the semiconductor will tend to equalize the voltage gradient through individual layers of the insulator. This works by deliberately leaking some current to ground, and so the leakage current must not become so large as to significantly reduce the efficiency of the electric pipeline insulation. For this to work well, the spiral path leakage flow through each and every spiral wrap (per meter of conductor length) must be at least on the same order of magnitude, and preferably greater than the flow through the insulating layer that also separates subsequent spiral wraps.

For insulators where the ratio of outer diameter to inner diameter is close to 1.0, this offers a way to force the voltage gradient to be nearly uniform for each layer of insulation, even though the resistivity $\rho_A$ of the insulating Layer A could be changing a lot with temperature. For example, cross-linked polyethylene or "XLPE" changes its resistivity by two orders of magnitude, from $\sim 10^{19}$ ohm-cm at 20° C., to $\sim 10^{17}$ at 105° C. If the spiral path electrical leakage current is much greater than the leakage through the insulation at 20° C., and about equal to the leakage current through the insulating layer at 105° C., then the spiral flow leakage current will nearly control the voltage change per spiral loop, creating a more uniform voltage gradient through the insulation, and defeating the "voltage stress inversion" that is usually a problem for HVDC cable insulation.

When the ratio of the outer diameter to inner diameter of the insulator is not close to 1.0, then one will see the 1/R stress relationship typical of cylindrical insulations without a temperature gradient, as discussed above.

If either the thicknesses $T_A$, $T_B$ or the resistivity $\rho_B$ are altered as a function of the radius of the layer while creating a wrapped insulator, in a manner so that there is constant resistance per turn instead of constant resistance per unit length of the layer 483, then the electrical stress will be uniform instead of varying as 1/R.

It is known in the prior art to have semiconducting polymer composites that have higher resistivity as the temperature increases; an example of a type of product that uses this change of resistivity with temperature are self-regulating heaters, often used for heat tracing on water pipes (to keep them from freezing) for example. This is opposite to the change in resistivity with temperature seen in good insulators. By having the resistivity change in the opposite direction for the insulating layer $T_A$, 482 compared to the semiconducting layer $T_B$, 485 the desired effect of equalizing voltage gradient per layer may be achieved with a lower total leakage through the semiconductive spiral path. This may not be possible to achieve exactly, since the change of resistivity in both Layer A and Layer B are non-linear, and the resistivity of Layer A may not be well controlled in the first place, possibly varying by an order of magnitude from batch to batch. This method becomes more feasible if the properties of Layer A and Layer B are controlled during layup (for example by measuring resistivity and varying thickness of each layer in response to this data). It is also possible to use three or more layers per wrap (two semiconductive layers B1 and B2) to create a composite resistivity that has closer to a zero temperature coefficient, thus electrical stress distribution throughout the insulator that is more nearly independent of temperature gradients. It is particularly interesting to incorporate as one layer a polymeric varistor, which will tend to level out voltage gradients within Layer B. Should the electric field build up disproportionally as a function of radius, the varistor layer in that region would assume a lower resistance, reducing its I×R drop and thus dropping the local electric field while increasing it elsewhere within the insulator, resulting in a more even electric field distribution.

If the spirally wound insulation layer were bonded to the conductor, it is desirable for rigid electric pipelines insulated by the bilayer polymeric laminates of this invention to use as the insulating Layer A a material that is well matched in terms of thermal expansivity (in the plane of the insulating film layer, the rθ·z curved surface in the typical r, θ, z coordinate system) to the metal conductor, or else is elastomeric and has much lower stiffness than the conductor, plus good bonding to the conductor. Alternatively a spirally wound elastomeric insulation of FIG. 72 can be biaxially oriented and held in place mechanically as in FIG. 24. The method illustrated in FIG. 27 is a highly flexible way to utilize spirally wound insulators of FIG. 72, that can even work with plastic films whose TCE is not well matched to the segment conductor core. It is desirable to select a material as Layer A that has a better ratio of thermal conductivity in the r-direction to DC voltage endurance in the r-direction than crosslinked polyethylene. Potentially good candidates for Layer A include polyimides, syndiotactic crystalline polystyrene, PTFE (tetrafluoroethylene), PFA (tetrafluoroethylene/perfluorovinylether copolymers), FEP (perfluoro(ethylene-propylene) copolymers), crystalline PPS (polyphenylene sulfide), PBT (polybutylene terephthalate), and PEEK (poly(etheretherketone)) films in particular. Note that the in-plane thermal expansivity of biaxially oriented polymer films is a strong function of the degree of orientation of the film, which gives some degree of control so as to make it more feasible to match the thermal expansivity of the conductor (normally aluminum but also potentially copper or another metal).

Another desirable characteristic for both Layer A and Layer B is for electrical resistivity to be relatively stable between 0-200° Celsius. Unfortunately, all feasible insulation materials experience major changes in resistivity over this temperature range. There are however variations among feasible insulators that can at least be used to get closer to a temperature-independent resistivity composite. The less is the increase of resistivity of the primary insulation Layer A from the inside where it touches the conductor to the outside, where it is cooler, the less current needs to be leaked through Layer B to control the electrical field and prevent voltage stress inversion.

Various "static dissipative" range (resistivity from $10^6$-$10^{12}$ ohm-meters) semiconductive elastomers are suitable for Layer B; the best target resistivity for the semiconducting polymer layer depends on the dimensions of the film, the electric pipeline diameter, and the resistivity of Layer A. Insofar as Layer B does not contribute directly to the insulation, it is desirable for this layer to be much thinner than Layer A; if Layer B can be reduced in thickness by a factor of ten and increased in conductivity by a factor of ten, the effect on controlling the electric field gradient is equivalent, while using less material. Layer B can be applied as a thin film as described above, directly onto Layer A. It is best if Layer B adhere to the insulating film layers immediately above and below it in the multilayer wrapped insulation, to prevent void formation during repeated stress application (as may occur due to thermal cycling). This is particularly simple to achieve if Layer B is itself an adhesive for Layer A. Alternatively, the entire spiral wrapped structure can be submerged in a dielectric fluid that prevents accidental bubble formation.

A manufacturing method to produce long (15 meters, for instance) insulators of this type from shorter (1 meter, for instance) width components is to create a scaled-up-but-shorter preform from components that are N (in this instance, 15) times thicker and larger in diameter, and then draw the preform down to the final diameter while also increasing its length by a factor of N. This is comparable to the method used to create glass fiber-optic fibers. Alternatively, 15 meter circumference blown polymer films can be produced directly (this is commonplace for polyethylene, and most but not all polymers can be processed in this way).

The following particular example illustrates a spirally wrapped insulation involving alternating insulative and semiconductive layers. An aluminum pipe conductor of outer radius 20 cm ($R_A$) is wrapped by a bilayer film comprised of a 50 micron thick ($T_A$) Layer A insulating layer (polyimide, crystalline syndiotactic polystyrene, or PEEK, for example) which is coated on one side by a 20 micron ($T_B$) semiconductive elastomeric film which also serves as an adhesive (20/70, or about 28.6% of the thickness of each spiral wrap is semiconductive in this case). If the insulating Layer A can withstand 5000 volts (implies 100 kV/mm, in the range of insulating film voltage endurance for commercial capacitors), then one needs 160 turns of the film (spiral wraps) to withstand 800 kV, one target voltage for electric pipelines. This layer would be 1.12 cm thick, which compares favorably with the 8 cm+thickness that would be required for a monolithic crosslinked polyethylene layer. In this case, the spiral path length of the first insulating layer would be $2\pi R_A$, the second spiral wrap will have path length $2\pi(R_A+T_A+T_B)$, etc. For an arbitrary wrap, let R* represent the average radius of that wrap, and L be the length 491 of the overlap between Layer A and Layer B in a particular wrap. The condition to force a constant electrical gradient between each wrap of the insulation is most easily met if the resistivity of the insulating material is not a strong function of temperature, and if more current leaks through the semiconducting layer than leaks through the insulating layer. This implies that this condition must be met for each and every wrap:

$$\rho_A T_A / 2\pi L R^* > \rho_B (2\pi R^*) / L T_B; \text{ or } \rho_B (2\pi R^*)^2 / T_B < \rho_A T_A$$

In words, this means that the resistance through (perpendicular to) the highly insulating Layer A must be greater than the resistance along the spiral wrap direction through (parallel to) Layer B. Ignoring for the moment the changes in resistivity with temperature, if we take $\rho_A = 10^{19}$ ohm-cm (corresponds approximately to HDPE, polyimide, or syndiotactic polystyrene, for example), then this implies that $\rho_B < 10^9$ ohm-cm for the particular example. For the case that $\rho_A = 10^{19}$ ohm-cm, and $\rho_B = 10^8$ ohm-cm, the leakage flow through the spiral semiconductive path is ~63 times as much as the flow through the insulating layer. This is enough to nearly equalize the voltage gradient between subsequent spiral wraps, and is not enough to result in significant energy loss from the line at near full capacity (resistance to ground over a 2000 km length of electric pipeline, considering both directions, is 15,500 ohms, compared to 1.15 ohms along the electric pipeline). This implies an energy loss due to the leakage flow of current along the spirally wound semiconductor of 4.14E7 watts or 20.6 W/m which is 0.2% of transmitted power per thousand kilometers at full capacity of 10 GW (this is 20% as high as $I^2R$ losses at full load). At lower levels of transmitted power of only one GW (10% capacity factor), the spiral leakage flow is the same, but now represents 2% transmission loss per 1000 km. (Note that in this scenario of 10% capacity factor, the leakage to ground would become the dominant transmission loss, though total losses would still be below that of a typical 2000 km overhead 800 kV line.) The advantage of the spirally wrapped insulation would primarily be to allow more efficient passive heat dissipation by enabling thinner insulation, which also allows higher losses per 1000 km and smaller elpipe diameters at particular current ratings (so less material is used in the elpipe, resulting in lower capital cost per km). Whether this approach is practical for a particular elpipe will depend on many factors such as average capacity utilization, the thermal environment of the elpipe, and the relative cost of components, and of electrical losses. The spirally wrapped insulation technology of FIG. 72 is especially applicable to extending the maximum capacity of practical diameter passively cooled elpipes that operate at 1% loss per 1000 km up to capacities from 20-50 GW.

Alternatively, in the above example, a value of $\rho_2 = 10^9$ ohm-cm would imply that 6.3 times as much current flows in the plane of the spirally wound semiconductive Layer B compared to passage through (perpendicular to the plane of) the insulating Layer A, which may be enough to approximately equalize the voltage gradient through each wrapped layer of insulation sheet, if an insulator can be found such that the insulator's resistivity changes by less than a factor of 6.3 over the temperature range of interest.

Hybrid designs that are sometimes referred to herein as "sleeved insulators" are possible for pipe-like insulators. See FIG. 32 through FIG. 34. These can involve both hard conical insulators 290 (elastic modulus>10 MPa), elastomeric O-rings 291, and a very soft elastomer gel or even liquid filling 292 in the remaining voids between the hard sleeves pieces. It is also the case that both 291 and 292 can be the same material, a cone-shaped elastomer. Because the thermal expansivity of elastomers is higher than aluminum or copper, while the thermal expansivity of glass or ceramic is lower than aluminum or copper, by stacking these two different kinds of sleeves together it is possible for the sleeved insulator to match the thermal expansivity of the conductor. Sleeved insulators in which cones of high stiffness, high voltage withstand capability, and preferably high thermal conductivity are interleaved with elastomer as in FIG. 32 through FIG. 34 have an improved ability to conform to expansion, contraction, and bending of the conductor compared to purely ceramic, glass, or hard plastic designs, and improved ability to pass waste heat out of the elpipe compared to a purely elastomeric design. This may be true in some cases even if the hard cones are made of high dielectric strength plastics with about the same thermal conductivity as the elastomer phases 291, 292 between the plastic cones, if the overall thickness of the insulating layer can be reduced.

Figure 32:
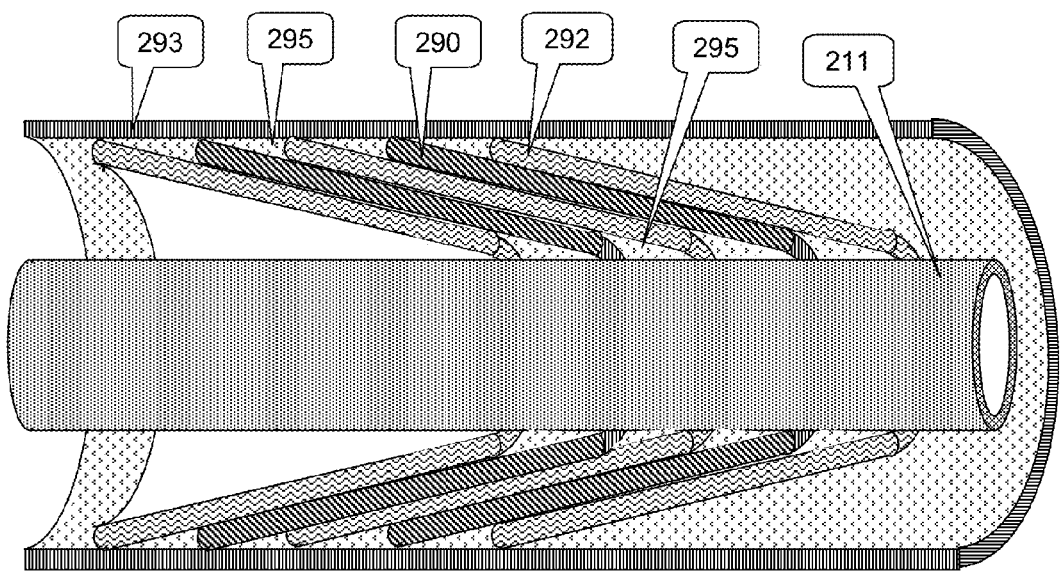
FIG. 32 shows a nested cone based pipe-shaped insulation in which hard cones alternate with elastomer gel cones in forming a stack that comprises a composite pipe-like insulator.
Figure 33:
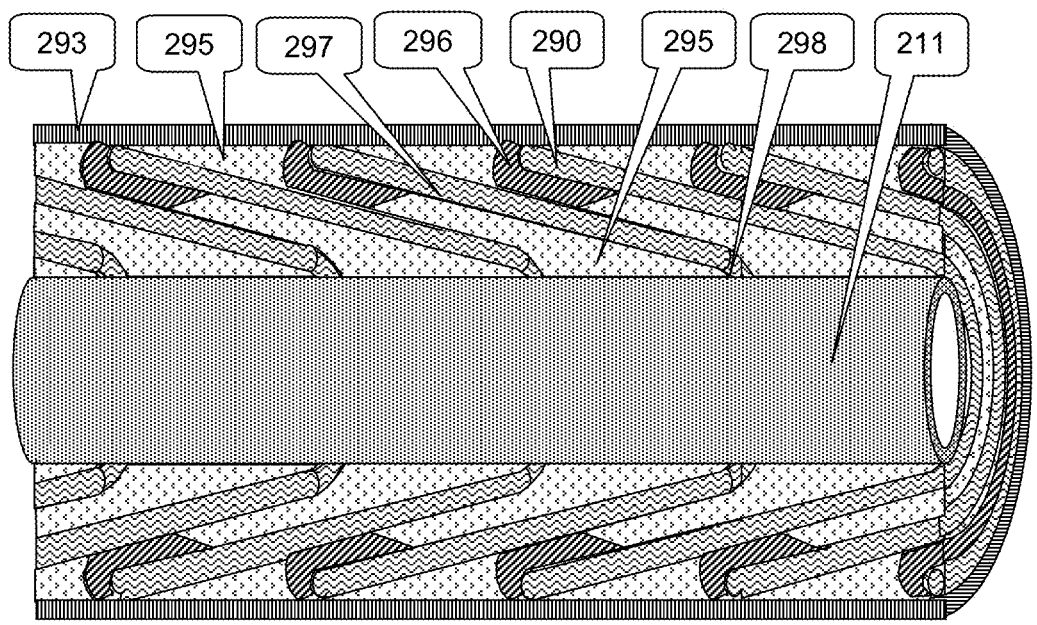
FIG. 33 shows nested hard cone insulators bonded together and uniformly separated by narrow strips of relatively high strength elastomers; remaining spaces are filled by high dielectric strength fluids.
Figure 34:
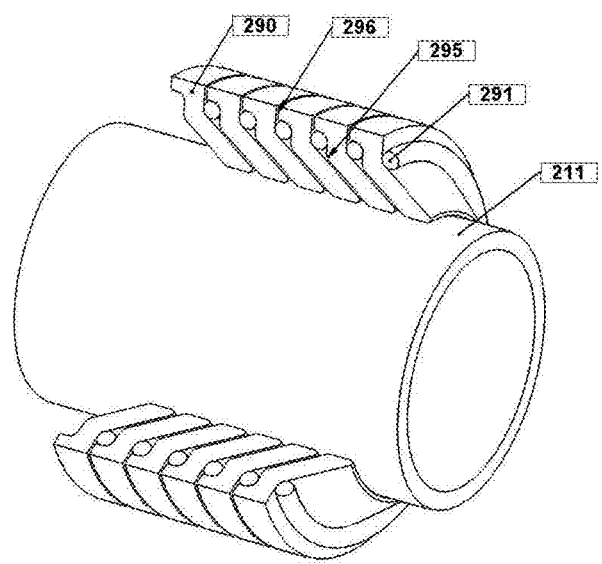
FIG. 34 shows nested hard cone insulators uniformly separated by elastomer O-rings; remaining spaces are filled by high dielectric strength fluids.

In general the hard cones of FIG. 32 through FIG. 34 are highly efficient solid insulators; with greater voltage withstand capability than the elastomers between them, such as alumina, glass, crystalline syndiotactic polystyrene, or certain rigid polyurethanes. A feature of this design is that the hard insulating cones 290 have either greater voltage endurance, greater thermal conductivity, or both compared to typical elastomeric insulators such as silicone rubber, solution-polymerized diene-based elastomers (IR, BR, SBR), or crosslinked polyolefins such as EPR, EPDM, or polyethylene (XLPE). The conical shape of the non-elastomeric insulators allows for greater angular movement of the conical insulators relative to the conductor compared to flat stacked designs, and shifts the deformation of the elastomers that are between the cones more towards a shear deformation, where elastomers have their most reliable performance.

FIG. 32 shows a nested cone based pipe-shaped insulation in which hard cones 290 alternate with elastomer gel cones 292 in forming a stack that comprises a composite pipe-like insulator. The cone stack surrounds the pipe-like conductor 211 and is in turn surrounded by a fabric-reinforced elastomeric hose and/or a pipe 293, which could be polymeric or metallic. A high dielectric strength fluid, preferably a grease 295 fills the voids that form at the edges of the nested cones; this grease should not swell the elastomeric gel 292.

FIG. 33 shows nested hard cone insulators 290 bonded together and uniformly separated by narrow strips of relatively high strength elastomers 296. The cone stack surrounds the pipe-like conductor 211 and the void space between next neighbor cones and the conductor is filled with dielectric fluid 295, which may in general be a liquid, a grease, or a very soft elastomer gel; this fluid also occupies the volume outside the nested cones, between the cones and the outer tube 293. Said outer tube 293 is a fabric-reinforced elastomeric hose and/or a pipe 293, which could be polymeric or metallic. The outer tube 293 preferably maintains the entire assembly inside it under hydraulic pressure of 0.1 to 10 MPa, to increase the dielectric strength and safety margin for the fluid 295 and elastomeric insulators 296 inside the tube. The inner surface 297 of each highly insulating hard cone 290 may optionally contain a special semiconductive layer for control of the electric field in the zone between next neighbor nested hard cones. Said coating may be a thin semiconductor with a temperature versus conductivity behavior that changes in the opposite sense to the insulators 290, 295, 296, or the coating 297 can have the properties of a varistor. Said semiconductive layer 297 is electrically connected to the conductor by a conductive contact 298 which can be a semiconducting elastomer seal that is lubricated by fluid 295.

FIG. 34 shows nested hard cone insulators 290 uniformly separated by elastomer O-rings 291; remaining interstitial volume between the conductor 211 and the outer protective hose or pipe 293 is filled by a high dielectric strength fluid, which is in most cases is grease that does not swell the elastomer 296.

Particular examples of suitable elastomeric gels include very soft silicone elastomers and SEBS gel thermoplastic elastomers containing 90-95% by weight mineral oil (both with IRHD harness less than 20). The elastomeric layers control the spacing between the hard insulating cones, and because they are in compression, they allow for highly flexible adjustment of the end-to-end length of the stack of cones that in FIG. 32 through FIG. 34 surround the pipe-shaped conductor 211.

Note that containing the nested conical insulators in a pressurized hose 293 would also place the insulators under hydrostatic pressure, which is known to inhibit breakdown in gases, liquids, and elastomers. A desirable implementation would be a design that has adequate voltage withstand even without pressurization, but pressurization then significantly increases the safety margin on voltage withstand. The conductive core of the elpipe or cable is either in contact with the innermost parts of each cone, or at least in close proximity. Thus, the cones are radially restrained by the conductive core.

The hard cones 290 of FIG. 32 through FIG. 34, where they are polymers, could be produced by molding the individual cones, or by cutting the cones out of a thick-walled pipe shape, or by thermoforming discs into cones. Where these cones are glass or ceramic, they can be produced by well-known methods used in those fields.

The next component of the elpipe segment module to consider is the end cap insulator. As was previously mentioned, the end cap insulator can in some cases be integrated with the splice transition conductor, as in FIG. 12, FIG. 23, FIG. 24, and FIG. 27. When the end cap insulator and the splice transition conductor are integrated together, this can be done either by separately fabricating the two parts and then joining them together, or by overmolding the insulation onto the segment module conductor. The same argument in favor of modularity that was mentioned in regard to the desirability of separating the manufacture and testing of the pipe-shaped insulator from the pipe shaped conductor applies here as well: if the relatively inexpensive and preferably recyclable end cap insulator is formed separately, it can be exposed to more severe testing, therefore throwing out the largest flaws. If this is done prior to assembly with the far more expensive segment module conductor, the cost of failure is quite low.

By adjusting the test voltage during production of end cap insulators so as to average 2-5% failures, one would both be collecting vital quality data and sorting the product into "quality bins." This is different than the normal QC method, in which every component part is tested to the acceptance voltage only; then a few parts from each lot are tested to failure. In the normal method, QC records will show that a particular lot is especially good, but the acceptance tests were done only up to the specified minimum voltage, so these parts cannot be guaranteed to withstand a higher voltage than the tested voltage. If one instead varies the test voltage so as to maintain a consistent scrap rate of ~3.5% failures, there may well be some component part lots that are surviving to 500 kv/mm, and it is valuable to know this. This procedure of testing to a variable voltage, which must be above some minimum test voltage, and keeping track of the test results for every part, means that over the course of many production hours, and different raw material lots, one will obtain lots that have survived to different test voltages. This opens the possibility of tracking this for each tested component part of the elpipe; this information will make it possible for the very best components to be selected for the most critical parts of a project (for example, river crossings that are difficult for repair crews to access).

For the aforesaid reasons, it may be desirable to produce the end cap insulators separately, and then to assemble them together with the elpipe segment module conductors. To be clear, these end-capped segment module conductors are still considered "segment module conductors" herein, as for example shown in FIG. 12, FIG. 23, and FIG. 27. There is always an overlap region between the pipe-shaped insulator and the end cap insulator. If the pipe shaped insulator is an elastomer tube that is stretched over the segment module insulator as in FIG. 23 and FIG. 28, then it is desirable for the end cap insulator to be attached to the splice transition zone prior to the elastomer tube being placed over the end-capped segment module conductor.

Figure 29:
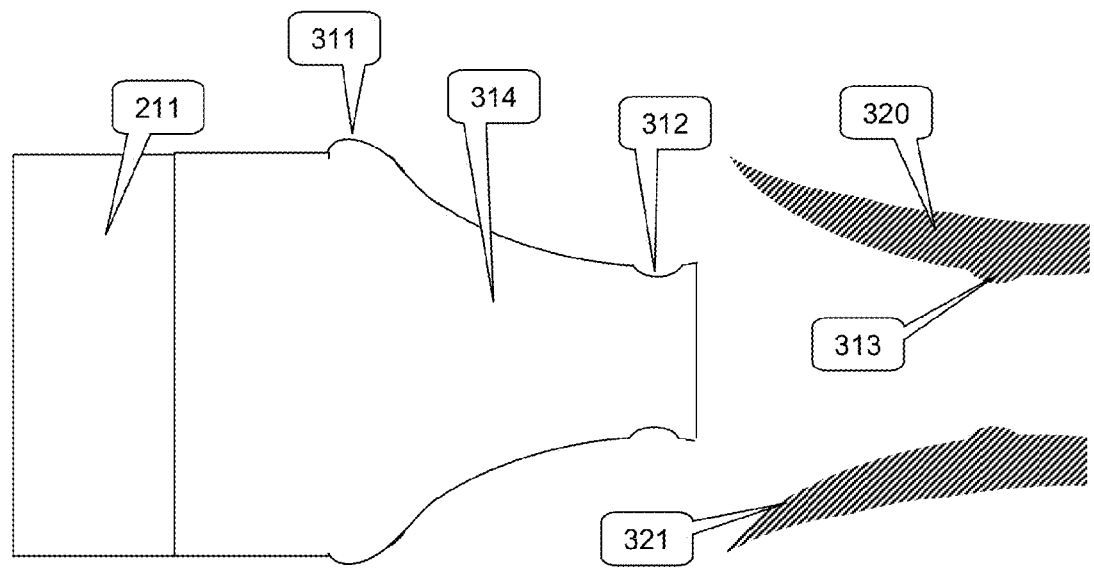
FIG. 29 shows the snap fit of an end cap insulator onto the end of a segment conductor.
Figure 30:
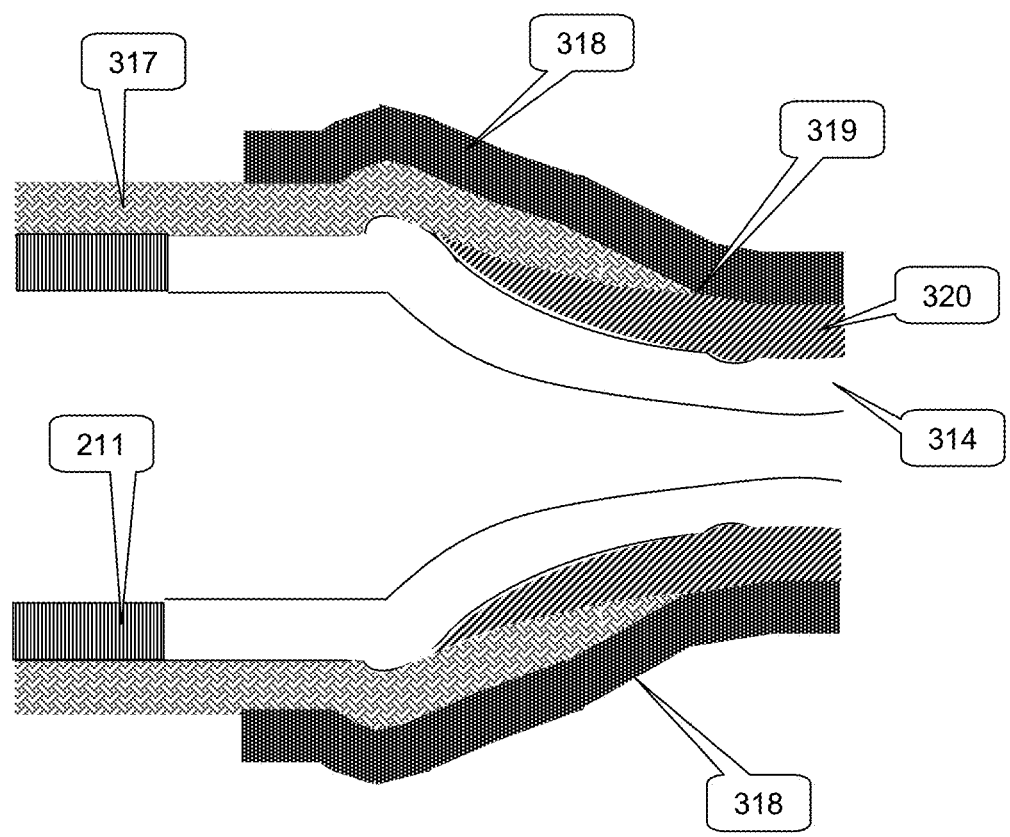
FIG. 30 shows the components in FIG. 29 assembled together with an elastomeric pipe shaped insulator and a second outer snap fit end cap insulator.

Two particular methods that are useful for attaching an end cap insulator to a splice transition conductor are adhesive bonding and snap-fit assembly. In comparing these two methods, snap-fit assembly is faster, and far easier to certify for a 50-year life by QC methods than an adhesive joint, which is intrinsically more complicated than a snap-fit joint to test and certify. It is also the case that it will be faster to replace a faulty end cap insulator that is mated to a splice transition conductor via a snap-fit attachment than would be the case if these two components are glued together with an adhesive. Therefore the snap-fit attachment method is preferred where feasible. FIG. 29 and FIG. 30 show an example of a snap-fit attachment of an end-cap insulator onto the end of a segment module conductor. In this case (which corresponds to FIG. 24), the end cap insulator has two components, an inner snap-fit end cap 320, and an outer snap fit end cap 318. FIG. 29 shows a view of two components, the inner end cap insulator 320 and the splice transition conductor 314 that are so oriented to be pressed together into a snap fit.

Note that though as illustrated in FIG. 29, the splice transition conductor with depressions and bumps 314 is already joined to the pipe-shaped conductor 211 at the time the inner snap fit is assembled, it is also possible to assemble the inner end cap insulator 320 to the splice transition conductor with depressions and bumps 314, and then join this assembly to the pipe-shaped conductor 211 (for example by spin welding, as in FIG. 18 and FIG. 19). In FIG. 30 these two components shown separately in FIG. 29 are shown already assembled together, with two additional segment module components, the pipe-like insulator (an elastomer tube) 317 and the outer end cap insulator 318. The end of the pipe-like insulator 317 is trapped between the inner 320 and outer 318 end cap insulators. There is a pocket between the end of the pipe-like insulator and the position where the inner and outer end cap insulators merge that is filled by a high dielectric strength grease 319.

One objection that might be raised about a snap fit in a high voltage insulation application might be that small gaps could exist between the surface of the splice transition conductor 314 and the inner end-cap insulator 320; if there is a high voltage gradient in this region, then a gas breakdown in this region could initiate a breakdown in the neighboring insulation 320. To prevent this, the inner surface of the inner end-cap insulator 321 should be conductive. However, one cannot do the same thing with the inner surface of the elastomeric pipe-shaped insulator, though the inner surface of that tube can be somewhat more conductive than the bulk of the tube, though not enough so that the pipe-shaped insulator inner surface brings full voltage out to the end of the pipe-shaped insulator, which is sandwiched between the inner and outer end cap insulators.

Next comes a description of the elpipe splice module, and methods of assembly and installation, but first a few words about the interface between the segment module and the splice module. The connection between the segment module and the splice module can be permanent, as for example by crimping, welding, or high temperature soldering, which would require destruction of the interface to separate the splice module from the segment module. This is not desirable from the standpoint of rapid reparability and/or replacement of defective modules, so solutions for joining the segment modules to the splice modules that are reversible without damaging the components are also appropriate.

Among reversible methods of attachment, screw threads are one of the best known and most widely used methods. A threaded electrical splice, as shown by the splice module core conductor shown in FIG. 54, preferably has tapered threads 2530 on both ends which mate with corresponding threads 218, 2510 in the segment module core conductor. This assures contact between the joint and the aluminum conductors over the entire thread area, once tightened. The threads can be reverse (one right-handed, one left-handed) to allow the coupler to be threaded between sections without needing to rotate either section—only the coupler. With reverse threads, the splice can be longitudinally compressed, placed between two stationary conductor sections, and then as it is threaded on to each simultaneously, the splice expands to reach its normal length once fully seated.

Figure 54:
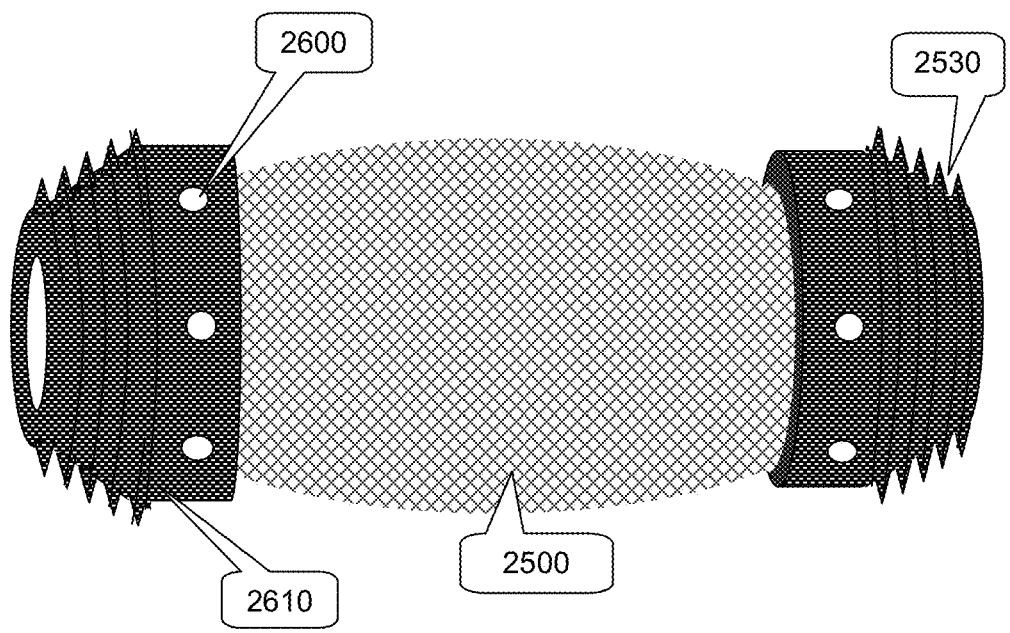
FIG. 54 is a lateral view of a threaded electrical expansion joint.

By placing holes 2600 in the circumference of the end bushings 2610, as shown in FIG. 54, a suitably large torque can be applied to the splice with a spanner wrench to attain the necessary contact pressures for a low loss splice, as discussed below. This splice has the advantage that the finished diameter of the splice need not be greater than the diameter of either attached conductor, so that a jointed assembly can fit within a primary insulator sized for the aluminum conductor alone. A splice adapter bushing such as that shown in FIG. 16 is especially suitable for interfacing with the splice module of FIG. 54.

Area 2500 is axially and laterally compliant so that it can make up for axial misalignment of the primary conductors. It is preferable that a solid metal filler, such as a solder (for instance, #604 3-in-1 Rod, made by Aladdin Welding Products, Grand Rapids, Mich., USA), fill the gaps between individual wires in the braid in the region where the braid contacts the end bushings 2610, and that that solder also adhere to the end bushings.

The braided area 2500 may optionally be covered with an elastomeric boot, or impregnated with a flexible compound to capture any particulates that it may emit. However, there is no electrical field in the region of this splice (the conductor and surrounding wall of the insulator are at the conductor potential). Such a boot could also optionally be filled with a liquid or gel. Useful examples of liquids that could be used include:

1. a free-convecting liquid that is not corrosive; an example could be water or alcohol containing an oxygen scavenger such as sodium nitrite; however if water escaped it could damage other components, so anhydrous liquids with high flash points and low viscosity are preferred, such as mixtures of propylene carbonate and ethylene carbonate;
2. sodium to decrease resistance, and increase thermal conductivity; sodium in this scenario could carry most of the current across the splice;
3. an elastomer gel to reduce fatigue of the component wires of the wire braid; such a gel would likely be formulated for high thermal conductivity and modest electrical conductivity (~one ohm-cm resistivity).

Other forms of attachment between the two threaded ends 2530 besides wire braid can be used as 2500 of FIG. 54; for example copper or aluminum wires or straps arranged to allow sufficient movement without fatiguing; possibly embedded in an elastomer to reduce fatigue. Sodium within a rubber boot was mentioned above. The sodium would probably be sharing the inside of the boot with copper or aluminum wires, possibly coated to inhibit the formation of inter-metallic compounds at the sodium interface. In the case of a sodium-filled boot, the wires need not run all the way from the splice module connector on one end to the splice module connector on the other end, as their main function will be to electrically couple each of the splice module connectors to the sodium; the sodium will carry most of the current across the splice module.

Figure 31:
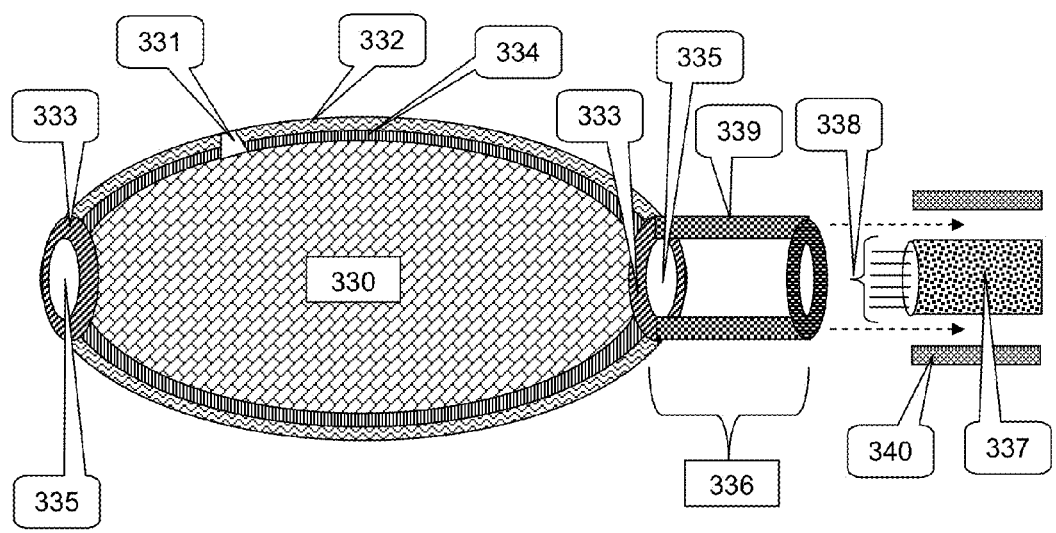
FIG. 31 shows a splice module that uses sodium that is held inside an elastomer balloon.

FIG. 31 shows an additional splice module design based on sodium conductor 330 and elastomers. The sodium is contained within an elastomer bag 334, which was filled through hole 331. The bag, which is not reactive with the sodium, has desirable needle puncture resistance, as is known in the art of medicinal vial stoppers. A good medicinal vial stopper can be punctured up to a hundred times by a needle, and the vial still holds pressure. Many different elastomers could be used for this bag, but among these options, EPDM, EPR, solution polymerized cis-polyisoprene, and solution polymerized SBR, which are also compatible with sodium, are good thermoset elastomer candidates for this elastomeric bag. It is also the case that some thermoplastic elastomers (TPEs) are known to be useful in vial stoppers (Santoprene™ and Kraton™ in particular). It is preferred that no curing residues from the elastomer react with sodium, since these residues may precipitate on the conductive needles used later to puncture through the elastomer into the sodium (increasing electrical resistance), and the reaction may also generate hydrogen gas. For this reason TPEs such as Kraton™ G 2705 is particularly appropriate, because it is very clean, has good room-temperature puncture properties, good ozone resistance, and adequate high temperature properties to handle a bag of molten sodium safely.

To make a junction, the bag 334 of sodium 330 is held within a protective shell 332 that is also an electrical insulator. This shell could be a fabric-reinforced elastomer, or a molded plastic for example. This shell has ports 333 that expose the rubber surface of the sodium containing bag 334 at selected places 335 on the bag. Each of these ports also has an insulating collar 339 that sticks out some distance 336 from the port (the length of the collar is determined by the design voltage). To make a connection, a conductive end of an elpipe module 337 is inserted into the collar 339. This conductive end has many conductive needles 338 extending out, which puncture through the elastomer 334 at 335 and into the sodium 330 to make the electrical connection. The elpipe segment module end also has an electrically insulating collar 340 that slips over the insulating collar 339 to create a region 336 of overlapping insulation. The region between the two insulating collars 339 and 340 is preferably filled with a high dielectric strength grease or adhesive that is also capable of resisting the temperature in this region over the design service life.

Figure 38:
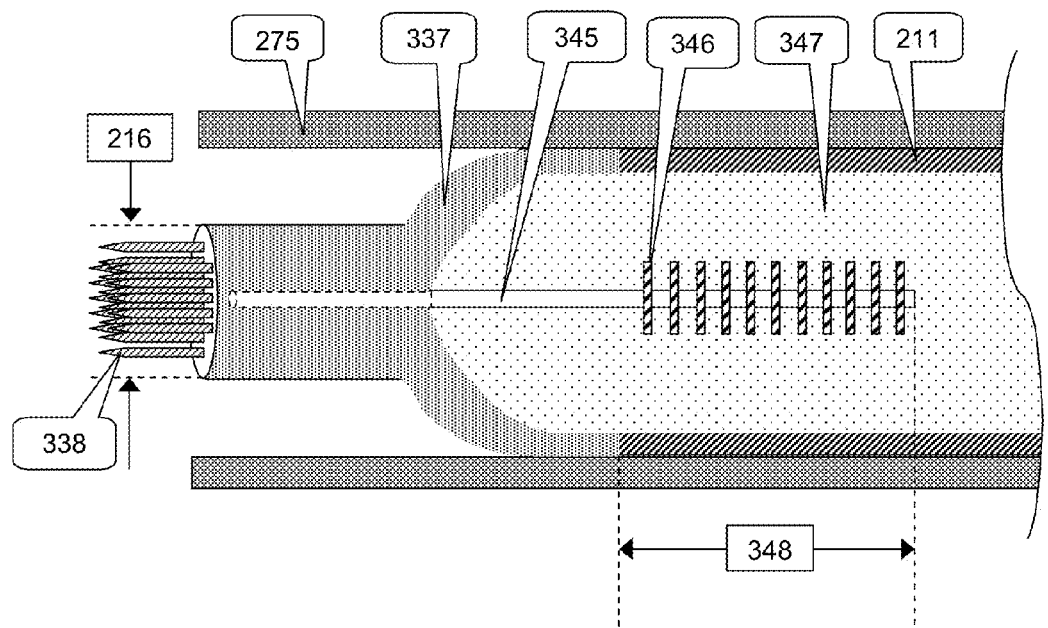
FIG. 38 is a cross-section view of an end segment with integrated heat pipe.

The conductive needles 338 have to be strong enough to penetrate the elastomer 334 and into the sodium 330 to make the electrical connection. This may require that a stronger alloy than pure copper, such as copper-beryllium be used, or a plated needle such as copper plated with hard chrome, or stainless steel coated with copper, a different metal with a higher strength than copper, and an electrical conductivity that is at least close to that of sodium, such as chromium or tungsten. It is likely, even in the best scenario, that the short region that the current must pass through the conductive needles will have higher resistance than the average resistance per unit length than the elpipe, and so will constitute a hot spot. On the splice module end of the needles, the surrounding sodium will provide an excellent heat sink, which can also melt and convect heat away from the zone penetrated by the needles to control any excess heating. On the opposite side of the junction, at the end of the segment module conductor, it is also desirable to deal with the added difficulty of heat dissipation due to the redundant insulating collars; 345 of FIG. 38 is a heat pipe installed inside the conductive metal at the end of the splice transition conductor, and extending far enough back 348 inside the segment module to spread any excess heat generation at the splice over a substantial length of the segment module. Finned radiator 346 may be added to assist in heat transfer.

Aluminum is the material of choice for the conductor in this invention, since it is historically many times more cost effective (7.7× as of November, 2009) than copper to transport a given current over a given distance with a given loss. Sodium can transport current more cheaply than aluminum, but is difficult to handle and will likely be a concern to firefighters, safety professionals, and other individuals. Use of sodium thus may require special equipment, procedures, and specially trained technicians; for this reason elpipes may be based primarily on aluminum conductors with some copper used in splices and connectors, where its greater ductility and conductivity can be used for specific effects.

Many aluminum alloys are suitable for use as the conductor. In addition to needing low electrical resistivity, the alloy selected must not be susceptible to cold flowing under pressure. It also needs to extrude well, and have a low cost. There are many aluminum alloys perfected by the aluminum industry to meet these requirements. Some are the AA8000 series or NUAL®.

Figure 42:
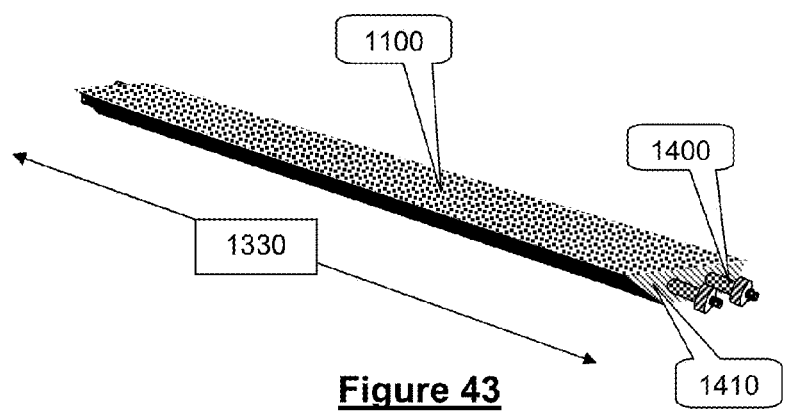
FIG. 42 is an oblique view showing a twin conductor section prior to burial.

Another embodiment of a transmission line is depicted in FIG. 39 through FIG. 55. In FIG. 42, for example, a pair of insulated conductors 1400 are factory assembled into a robust, rigid, self-supporting vessel 1150 plus top 1100, that is, for instance, primarily made out of pre-stressed concrete. Instead of inserting segment modules and splice modules into a previously buried conduit, this method integrates the conduit with the conductors, and the segments are interconnected with a different type of splice module, composed of a protective encasement, shown in FIG. 43, within which electrical and insulation splices are made in the manner of FIG. 45, which will be explained in more detail henceforth.

Figure 39:
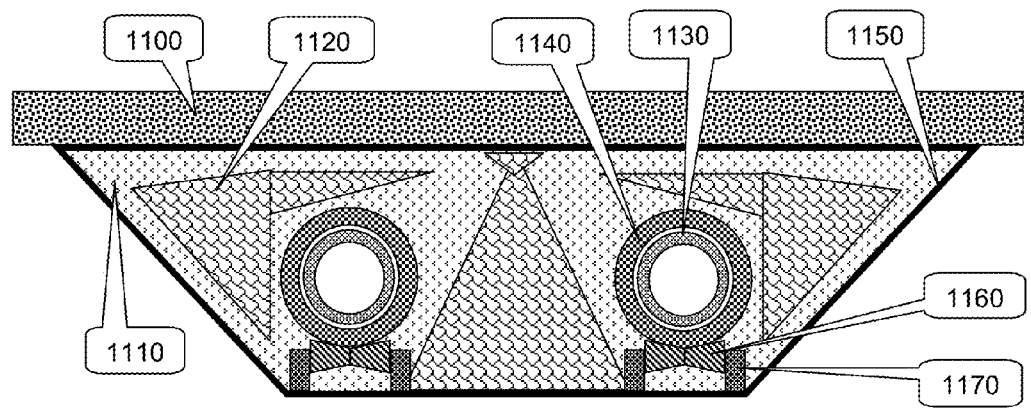
FIG. 39 is an end view cross-section of a twin conductor underground section, away from a joint.

FIG. 39 shows a cross-section of this type of segment module, showing two conductors 1130, that use the same construction methods discussed earlier to make the similar pipe-shaped conductor 211, however different end terminations and splicing methods may be used for this approach. The insulation 1140 of these conductors is similar to the pipe-shaped insulator discussed previously, except for its end terminations. Both the interior and exterior surfaces, down to a suitable depth of 2 mm for instance, are semiconductive. This assures that the conductor-insulator interface is away from the surface so that any shallow surface abrasions won't result in electrical field concentrations.

Figure 40:
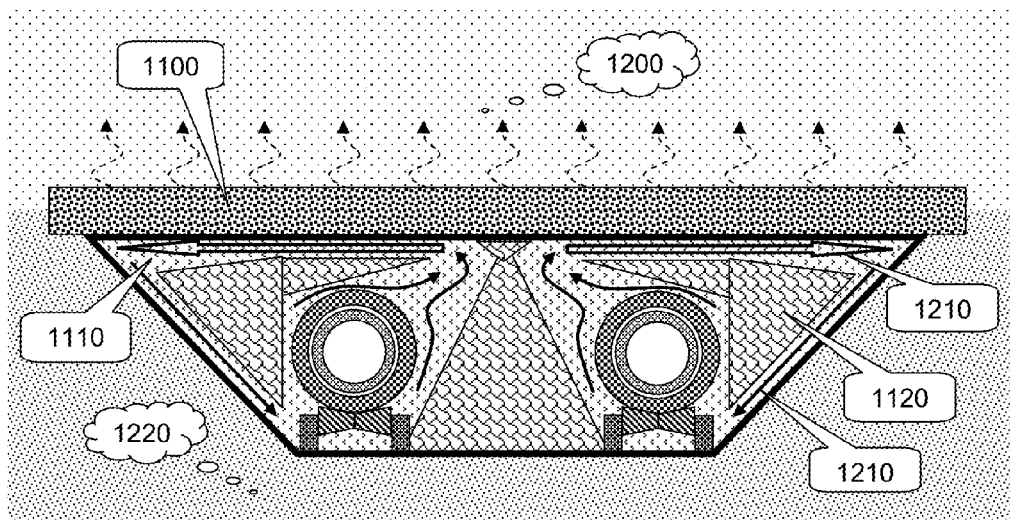
FIG. 40 is an end-view that shows fluid convection and heat flow in an underground section.

For a typical installation per this invention, the segment module of FIG. 42 is installed so that the top surface is at or slightly above grade, as shown in FIG. 40. Although two conductors are shown, this invention is not constrained by the number of conductors comprising a single assembly.

Heat is radiated from the top surface 1100 to the surrounding air 1200, unimpeded by vegetation. This surface can be made of concrete, for instance, to provide durability in weather while also clearly signaling to construction crews that they must not dig there. Since the surface is almost flush with the terrain, this construction only minimally impacts vistas and need not impede wildlife and vehicle crossings.

Optionally, a heat transfer fluid 1110 can be used to facilitate the removal of heat from the walls of the insulated conductors to the top surface of the vessel. This fluid can be liquid or gaseous; including air, dry nitrogen, water with antifreeze, oil, etc. It does not need to be a dielectric, but does need to be compatible with the other materials it is in contact with. Optionally, convection is enhanced by creating a chimney, for example using blocks of flexible closed-cell foam 1120 directing the convective flows 1210 up and along the upper portion of vessel 1150, as shown in FIG. 40. Since the heat transfer fluid, along with the conductors and insulators, etc. all expand and contract as the temperature changes, the foam structures also serve as hydraulic accumulators would and adjust the internal volume with only a minor change in pressure, should the heat transfer fluid be non-compressible (similar in function to volume compensation device 154 of FIG. 13, FIG. 14, and FIG. 15).

This technique gives controlled and predictable thermal dissipation, independent of the soil conditions, and independent of the details of the segment module construction and the splice module construction. The basic structure is simple to manufacture, transport, and install. If made out of pre-stressed concrete, the structure is quite similar to the "double tee" beams that are routinely used to make pre-fabricated parking garages. Massive reinforced concrete tops would make this particular implementation of elpipe placement more resistant to purposeful or inadvertent damage than directly buried designs.

Rigid, liquid-tight vessel 1150 can be made from a number of watertight materials. The amount of compliance needed in expansion joints between successive sections is minimized by minimizing the thermal coefficient of expansion (TCE) of the vessel walls. Some possible material choices are reinforced (preferably pre-stressed) concrete, steel (with an anti-corrosion coating), and fiber-reinforced polymer or plastic (FRP); pultruded FRP based on carbon fibers can have a nearly zero thermal expansivity in the fiber axis direction.

It is desirable for the TCE of the primary insulator 1140, as in FIG. 41, to match or be slightly less than that of the rigid vessel 1150. The reason it is desirable to be less is that the primary insulator will see a larger temperature excursion in use than the rigid vessel. It is also desirable for the primary insulator to have high thermal conductivity. Since the primary insulator is not flexed, it may be made of a rigid material in principle. Candidate materials include polymers, polymer composites, porcelain, and glass.

Figure 59:
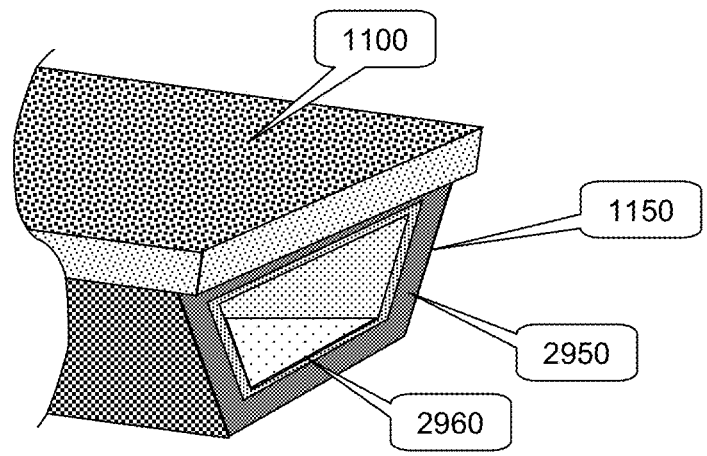
FIG. 59 is an oblique end view of the liquid-tight vessel and its lid before the conductor(s) and insulator(s) are installed.

A preferred construction method for rigid liquid-tight vessel 1150 is shown in FIG. 59. A concrete shell 2950 surrounds an FRP liner 2960, where the FRP formulation has been selected to match the thermal expansivity of the concrete. It is likewise preferred that the liner be metalized to increase its vapor barrier qualities. Some methods to achieve this are by application of a foil with adhesive, by sputtering, by flame spraying, by various vacuum deposition methods, etc. The liquid-tight vessel 1150 is then topped by a concrete slab 1100 that contains tension members to pre-stress it, as is commonly known to industry for constructing long concrete members resistant to cracking. If a liquid heat transfer fluid is employed, of which a blend of ethylene carbonate and propylene carbonate is especially preferred, it is also desirable to line the inside surface of the liquid-tight vessel with a rubber bladder, which will prevent leakage should the vessel become cracked, and to use for the elastomer lining a composition that has low swelling in, and good compatibility with the liquid heat transfer fluid. Any heat transfer fluid used should be extremely dry, and this can be achieved by passing it through a molecular sieve sized to trap water molecules before it is inserted into the liquid-tight vessel 1150. It is further desirable to have dry molecular sieves within the fluid volume to adsorb any water that leaks into the fluid volume. If a liquid heat-transfer fluid is used, then a compressible member similar in function to 1120 will be included within the coupling tray to keep the liquid in contact with the lid 3200 while allowing for inward and outward movements of the adjoining bulkheads in response to thermal expansions and contractions, without letting the pressure within the coupling tray vary significantly from ambient pressure.

Figure 60:
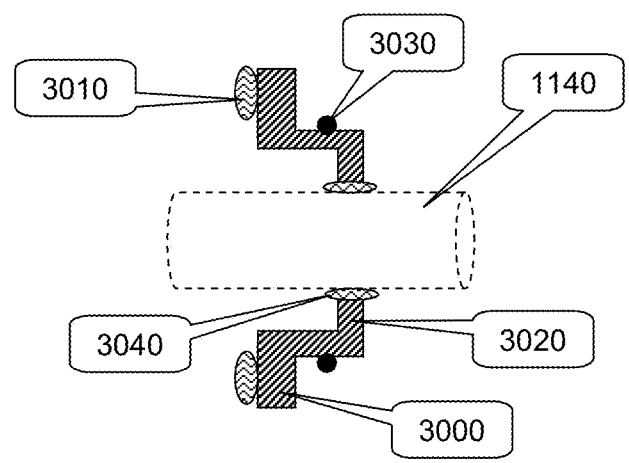
FIG. 60 is side cross-sectional view of a bulkhead.

A bulkhead 1410 is attached to each end of the vessel 1150, to create a sealed volume. FIG. 60 shows such a bulkhead in cross section. Baseplate 3000 of the bulkhead attaches to an end of the vessel 1150 using mastic or glue 3010, or removable fasteners and a gasket. The inner portion of the bulkhead consists of a raised platform 3020 containing one or more holes 3110, each of which a primary insulator 1140 and conductor 1130 can pass. This piece can be composed of two separable pieces if the insulator ends, as in 1630, are larger than hole 3110. The bulkhead can be fabricated from FRP, again preferably metalized, with or without concrete. Access port 3260 and associated plug 3270 allow for filling and draining the interior of the liquid-tight vessel 1150.

If the primary insulator is composed of a material that degrades in the presence of water vapor, such as XLPE, then it is desirable to coat its outer surface with a moisture barrier that is suitably compliant to accommodate the changes in diameter and restraint in length seen by the insulator due to temperature excursions while in service, while still being electrically conductive.

When a somewhat elastic material is used for insulator 1140, then seal 3040 can consist of an adhesive bond 1650 that restrains lateral movement of the insulator within the bulkhead and segment module. In this case, bulkhead 1410 resists the longitudinal expansion and contraction forces of the insulator, forcing the insulator instead to be in compression or tension and to expand or contract in diameter to accommodate its volume change due to changing temperature, which will occur due to varying electrical loading and soil and surface temperature conditions. The insulator surrounds a comparatively stiff aluminum cylinder, which includes a flexible electrical expansion joint 1320, so buckling of the insulator while under compression is not an issue except at the expansion joint. Locating a series of rollers 1160 against the primary insulator at a point corresponding to the expansion joint ensures sufficient rigidity at this point to counter any buckling tendencies. In an implementation where the insulator 1140 is rigid, seal 3040 can be a lubricated O-ring to accommodate the lateral motion of the insulator due to thermal expansion and contraction while keeping the vessel liquid-tight.

Figure 45:
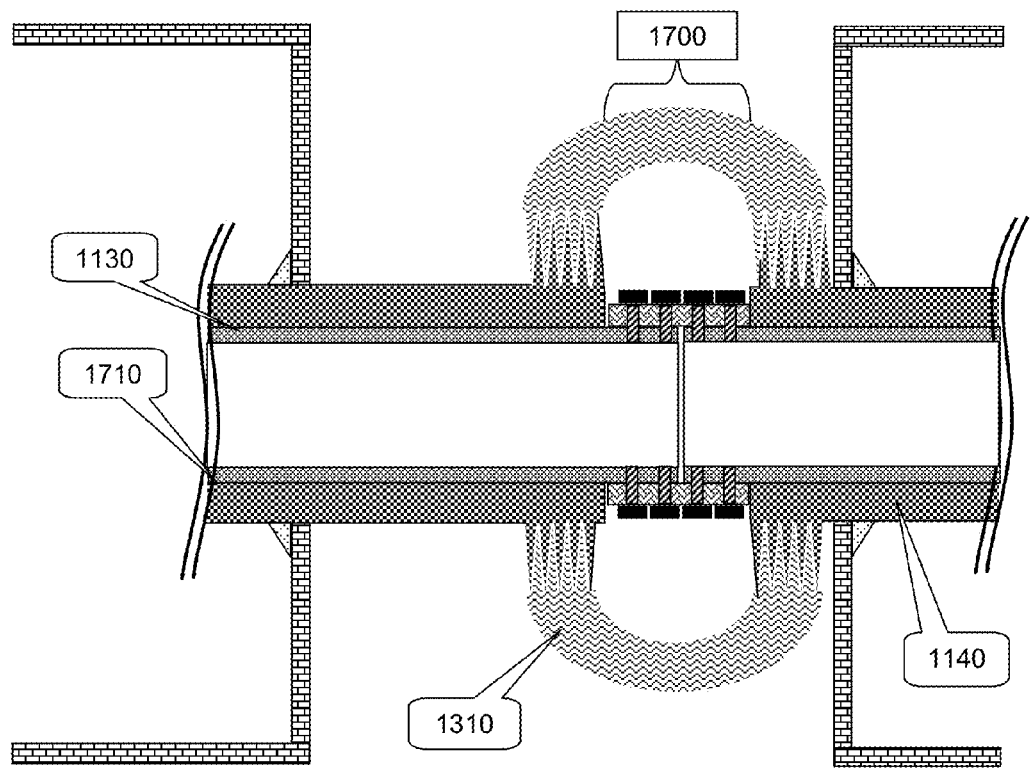
FIG. 45 is a lateral cross-sectional view showing the joint area after its insulating coupler is threaded into position.

In the case where the primary insulator is firmly attached to the bulkhead, the only expansion and contraction that the splice insulation 1310 between segment modules must accommodate is that of the rigid vessel, and the very small amount 1400 of the primary insulator that extends beyond the bulkhead, as shown in FIG. 45. In the rigid insulator case, when the primary insulator passes through a sliding seal in the bulkhead, the splice insulation 1310 must accommodate the entire expansion or contraction of the full segment length of the primary insulator 1140, and thus it is preferable in this case for the insulation to have a low TCE.

Figure 61:
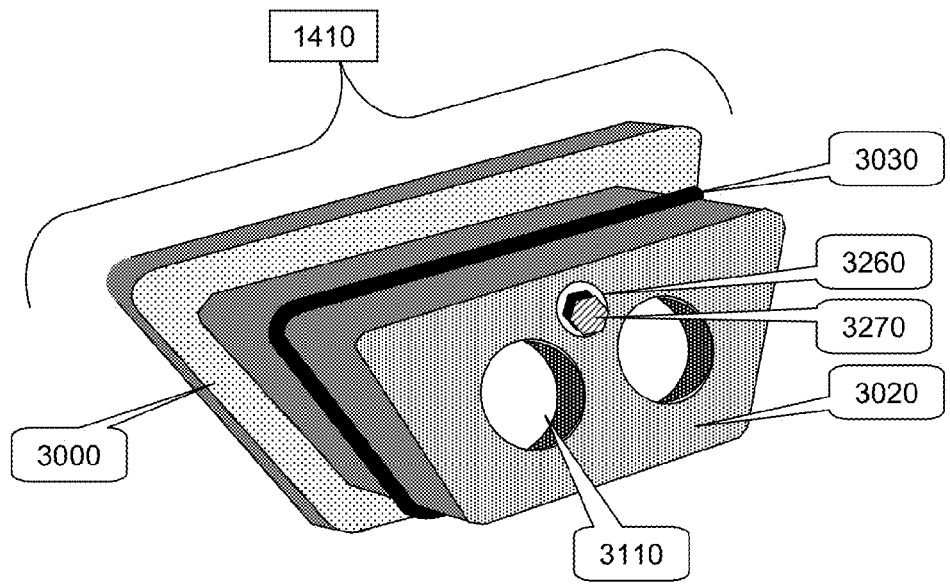
FIG. 61 is an oblique front view of a bulkhead.

The raised platform 3020 incorporates an O-ring seal 3030, as shown in FIG. 61. This lets the bulkheads slide back and forth within the coupling tray 3100 shown in FIG. 62 as needed to accommodate thermal expansion and contraction of the attached liquid-tight vessel 1150. If deemed desirable, the O-ring seal can be augmented with an elastomeric boot as a backup to trap accidental fluid leakages.

The primary insulator is supported periodically over the length of the rigid vessel. One way of doing this is with roller supports 1160, held in position by supports 1170, as is shown in FIG. 39.

With expected temperature excursions once installed, the amount of expansion and contraction with steel or concrete as the rigid vessel walls would be ±8 mm for a 15 meter section.

Each aluminum conductor 1130 is slid into a hollow primary insulator tube 1140. The conductor may be lubricated, however if so, the lubrication must not interfere with the desired electrical contact between the conductor and the semiconductive layer on the inside of the primary insulator tube, upon which it rests.

This sliding operation would be best done without the weight of the conductor against the primary insulator while it is being slid. Since the conductor 1130 optionally includes a flexible expansion joint 1320 at its center, as in FIG. 41, this insulation sleeving operation can be done by first placing an insulator tube 1140 over a horizontal support rod that is smaller in diameter than the I.D. 212 of the conductor and longer than the insulator. The insulator is then lifted to center it on the support rod, and the conductor is lifted and moved so that one end slides over the exposed end of the support rod and into the insulator. The other end of the conductor is then supported with a second rod that can be inserted as far as the splice 1320. Thus the conductor is supported from both ends, and the insulator is likewise supported over its length, whereby the insulator can continue to be slid over the remaining length of the conductor. Optionally the outer conductor surfaces 1710, away from the splice zone, can be anodized or otherwise treated to facilitate sliding between the conductor and insulator without damage to either.

Figure 43:
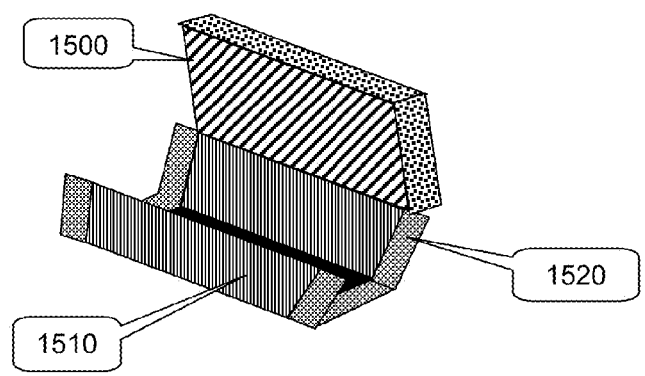
FIG. 43 is an oblique view showing a section coupling tray.
Figure 62:
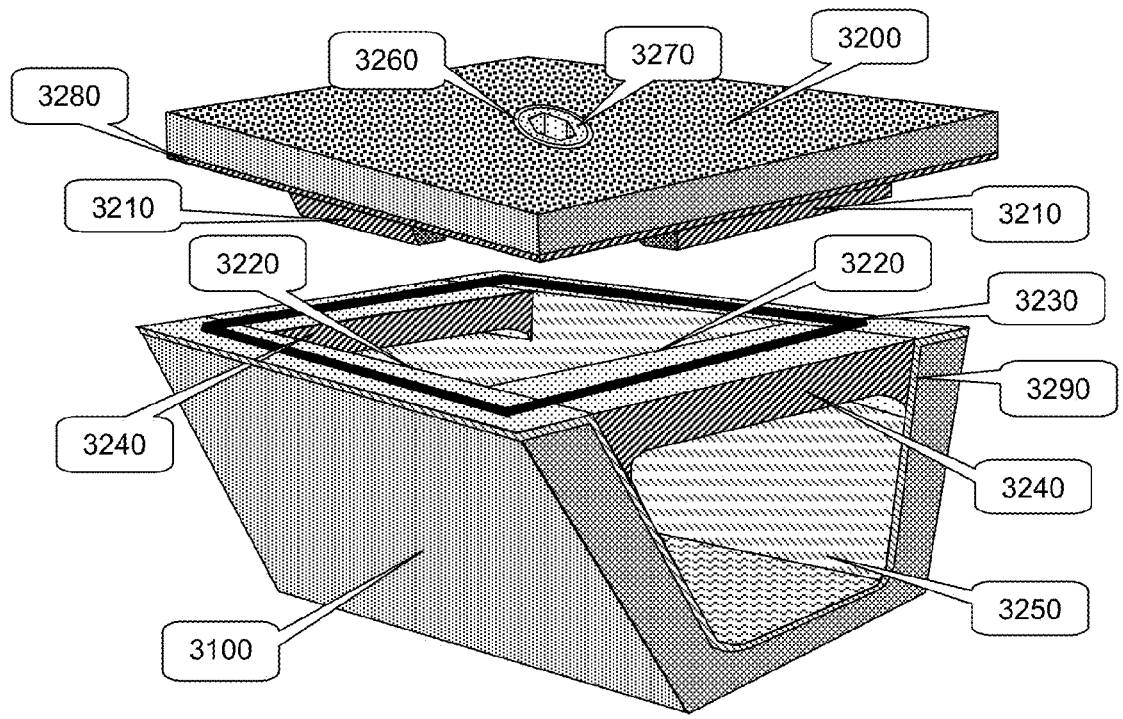
FIG. 62 is an oblique view of a straight coupling tray.
Figure 63:
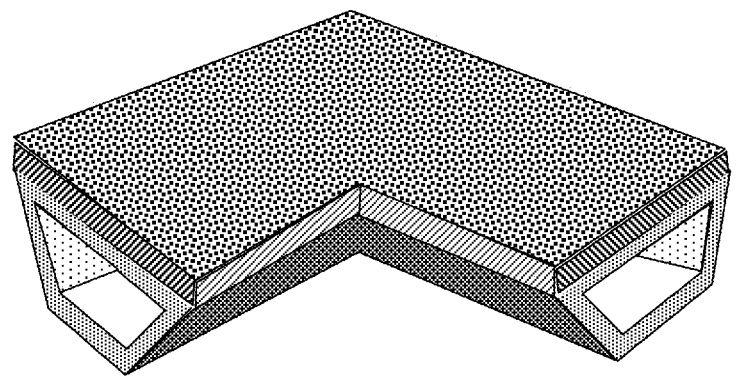
FIG. 63 is an oblique view of a horizontally-angled coupling tray.
Figure 64:
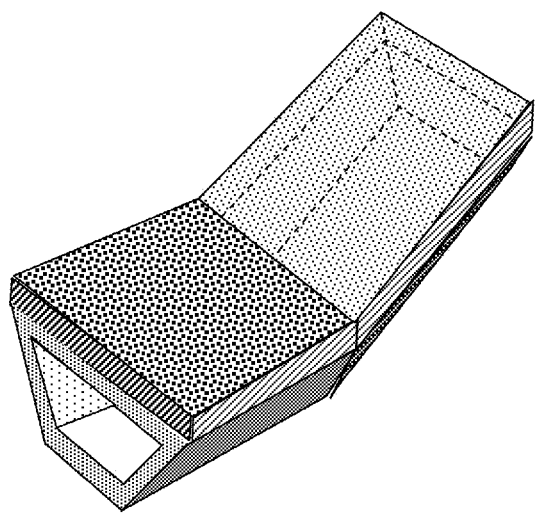
FIG. 64 is an oblique view of a vertically-angled coupling tray.

To assemble this type of electric transmission line, a flat-bottom trench with sloping walls is dug to the appropriate depth, for example 1½ meters. "U" shaped coupling trays 1510, as shown in FIG. 43, or 3100 in FIG. 62, are placed in the trench at each splice area 1300. Then elpipe sections 1330, each typically 15 meters long so that they are easily truck transportable, as shown in FIG. 42, are laid into the trench. The coupling trays 1510 allow for angular (up to 10°, for instance) displacements between conductor sections, and also some vertical, lateral, and longitudinal misalignment. Coupling trays 3100 allow for less misalignment, but the variations shown in FIG. 63 for horizontal-axis bends and FIG. 64 for vertical-axis bends accommodate changes of direction.

On coupling tray 1510 flexible sealing flaps 1520 are bonded to bulkhead 1410 during installation to give a watertight connection to the adjoining elpipe sections, while allowing for thermal expansion and contraction of the rigid vessel of each elpipe section, and the aforementioned misalignments. A lid 1500 (which may also be covered in concrete), seals, with calking, elastomeric seals, hot melt glue, or inflatable seals, for instance, to the coupling tray 1510 and the adjoining bulkheads to cover and keep the splice area dry once the splice is completed. Alternatively, the splice area can be flooded with a heat transfer fluid, which may be a high thermal conductivity gas (such as hydrogen or helium) or liquid. If the splice area is not filled with heat transfer fluid, then the methods of heat extraction from this area will be by air convection to the lid and walls and by conduction back through the aluminum conductors into the rigid vessel. The lid 1500 is removable so that the splice area 1300 can be easily serviced should the need arise. Incorporated within lids 1500 and 3200 is an access port 3260, which is sealed with plug 3270. This allows filling the coupling tray with a heat transfer fluid or gas, if desired, after the lid is in place, and also provides a means for a suction hose to be inserted to remove such fluid or gas prior to removal of the lid for service access.

Figure 65:
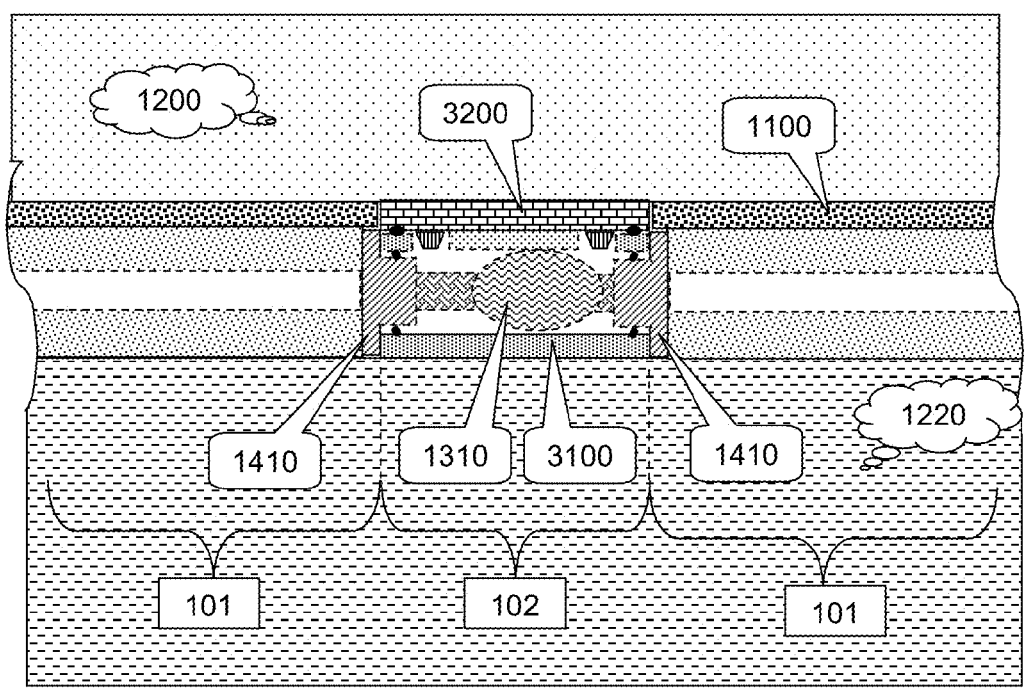
FIG. 65 is a side cross-sectional view of an assembled splice area.

The procedure to alternately use coupling tray 3100 to mate two segment modules entails optionally removing the bridges 3240 of FIG. 62 allowing segment modules to be lowered so that their attached bulkhead platforms seat into the dovetail channel 3250, as shown in FIG. 65. Then the bridges can be reinstalled, either with removable fasteners or with adhesives, completing the seal between O-rings 3030 and the dovetail channel 3250. Alternatively, the ends of the segment modules can be slid into the coupling tray directly to make a seal with O-rings 3030. The coupling tray lid 3200 can be lowered into place once all electrical splicing and insulating are complete. Tabs 3210 seating against surfaces 3220 maintain lid alignment. Preferably bridges 3240, coupling lid bottom 3280, and dovetail channel liner 3290 are constructed of FRP, to provide smooth surfaces to achieve good seals. It is also preferred that these be metalized to minimize ingress of water vapor. The balance of the coupling tray 3100 is preferably constructed from concrete. The weight of the lid against gasket 3230 forms a liquid-tight and/or gas-tight seal. A completed elpipe splice module 102 per this technique is shown in FIG. 65.

Heat pipes can be used to extract heat from the splice area and transport it out to the conductor 1130 away from the splice, in a similar manner to that shown in FIG. 38, so that thicker electrical insulation within the splice area or added heat generation will not cause a hot-spot.

Instrumentation, not shown in the figures, monitors each splice area for water ingress, splice temperature, and heat transfer fluid (if used) level and temperature in the adjacent conductor sections and the splice area. Measurements are reported to a centralized monitoring system that can dispatch service personnel if a degradation is observed.

Figure 44:
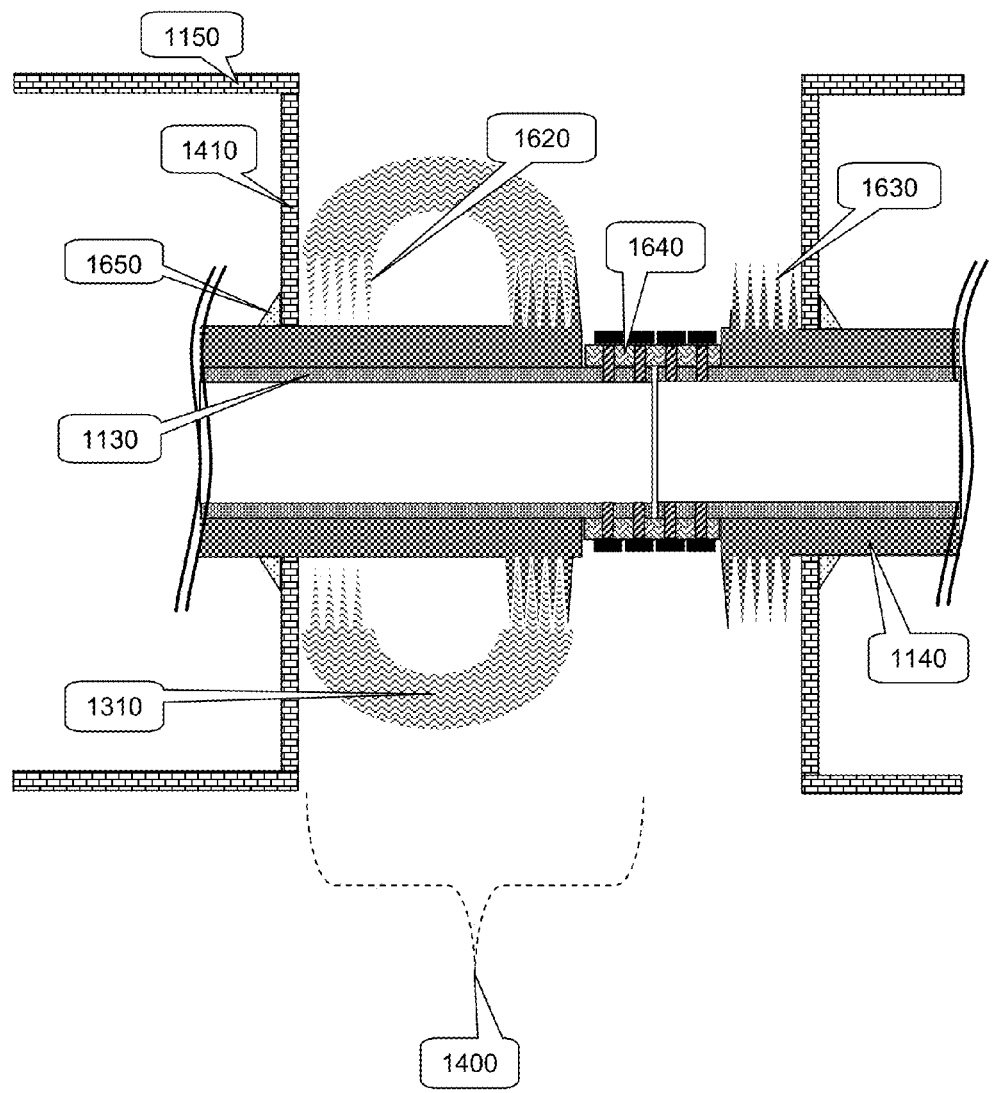
FIG. 44 is a lateral cross-sectional view showing the joint area before its insulating coupler is threaded into position.

The ends of the primary insulators are fitted with deep threads 1630, as shown in FIG. 44, that are preferably molded into the primary insulator, but could be attached by other means such as bonding while preserving the integrity of the insulation across the thread region. Since the electrical field runs perpendicular to the thread points, the threads do not concentrate the electrical field around them. The threads can alternatively be designed with a rounded profile, however that will produce an undulating, instead of a homogeneous electrical stress in the insulating coupler 1310, requiring increased thickness. The surface path length through these threads, either from peak to valley to peak, etc. or following the valley helically over the length of the thread, is selected to exceed the length of a column of air at atmospheric pressure, or another dielectric fluid selected to fill gap 2240, that would have a working breakdown voltage equal to the desired transmission line working voltage, with margin. For 800 kVDC, with clean air, in the absence of anything that would concentrate the electric field, this length would be 0.8 meters. The typical dimensions for a primary insulator end for 800 kVDC at 10 GW capacity with 1% loss in 1,000 km, for FIG. 55, where 2730=15 cm, 2740=30 cm, 2770=10 cm, and 2790=10 cm, result in 1 meter from peak to valley to peak, and 8 meters following the valley of the threads helically.

Figure 48:
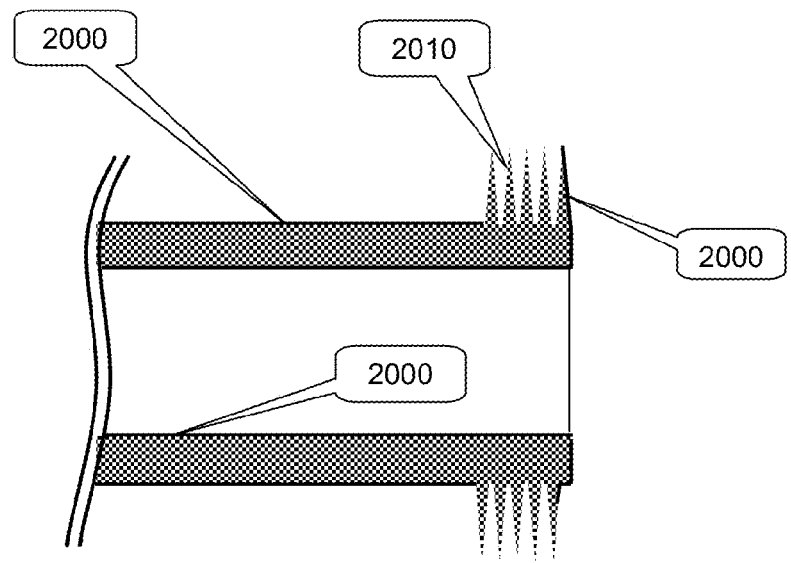
FIG. 48 is a lateral view cross-section of a primary insulator end.

The inner and outer surfaces and ends of the primary insulators are made to be semiconductive 2000, with the exception of the threads that extend outward past the nominal outer surface of insulator 2010, as shown in FIG. 48.

Figure 51:
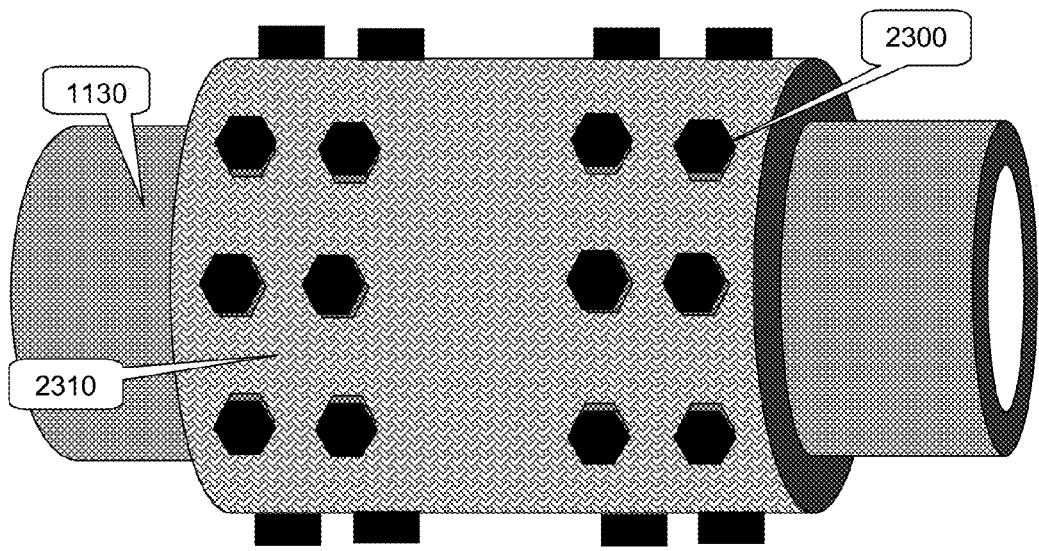
FIG. 51 is a lateral view showing a braided sleeve electrical splice.
Figure 52:
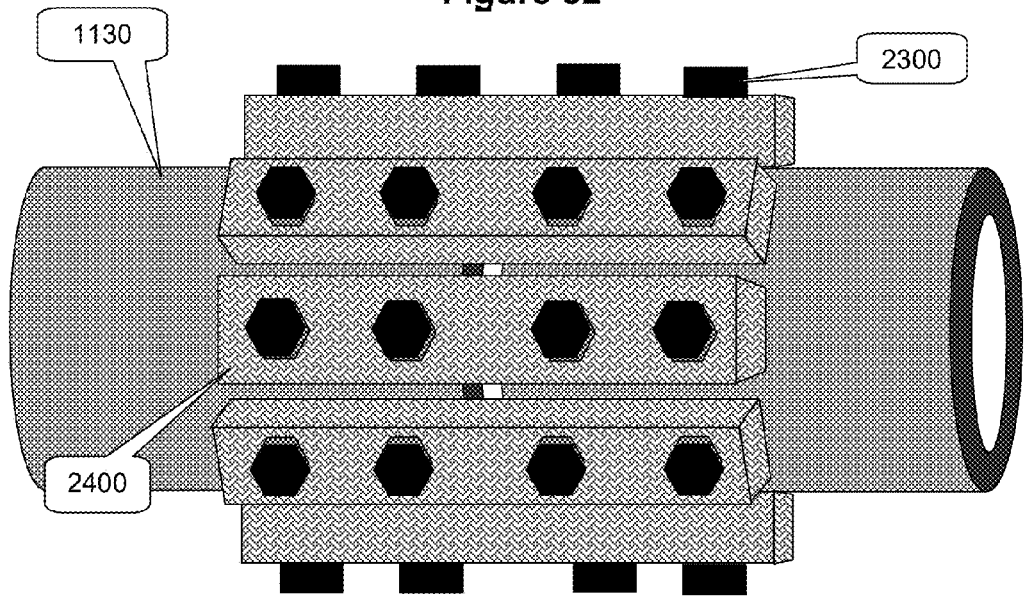
FIG. 52 is a lateral view showing a braided strip electrical splice.

The electrical splice in the splice area can be made using a compliant copper braid sleeve 2310, as in FIG. 51, or a number of compliant copper braid strips 2400, as in FIG. 52, or with rigid straps since this joint is immobile, or by other methods.

If the overlap of the braid with the rigid aluminum conductors is sufficient, and the braid cross-sectional area is sufficient, and the contact pressure at the braid-to-aluminum junction is sufficient, and the contact zone is properly treated with an aluminum oxide-inhibiting electrical joint compound, then the resistance of the joint section can actually be less than that of a comparable length of just the hollow aluminum conductor.

Angular or lateral or vertical or longitudinal displacements can be accommodated by distorting the braid or by using oversized or oval mounting holes. The cap screws 2300 to couple sleeve 2310 to conductors 1130 are preferably selected to have the same TCE as the conductor (aluminum) to retain consistent pressure under varying temperature.

Various formulations of aluminum oxide-inhibiting electrical joint compound are offered commercially, such as Noalox® from Ideal Industries, Inc., Sycamore, Ill., USA, which is composed of a suspension of zinc particles along with silicon dioxide in polybutene. The paper "Improvement of metallic joint electrical conductivity using a novel conductive paste produced from recycled residues" by Erivelto Luis de Souza, et al. shows that with a pressure of 150 $kgf/cm^2$ aluminum-aluminum joints achieve a resistance of a little over 0.1 micro-ohms per square centimeter with a proper aluminum oxide-inhibiting electrical joint compound.

Calculations based on this joint resistance show that by having each joint area equal to the cross-sectional area of the aluminum conductor being joined, that the resistive loss of the joint is equivalent to a very manageable 0.1 meter of additional length of the aluminum conductor. By increasing the ratio of joint area to cross-sectional area, this number proportionally decreases. If the joint area is set to be 3× the conductor cross-sectional area, calculations show that the requisite joint pressure is achievable with 27 metric tons of tightening force at the conductor O.D., resulting in 42,000 N-m of torque, and 44 MPa of tension in the wall of the conductor, based on the conductor dimensions of 2740=30 cm and 126=2.5 cm in FIG. 55, for a 10 GW capacity line at 1%/1,000 km loss at +/−800 kVDC.

The aluminum in the joint area could also be de-oxidized and plated with a noble metal or another metal less likely to oxidize than aluminum, such as nickel. This method is likely more costly, with only modest improvement in performance projected, compared to the oxide-inhibiting paste method described above.

Key to obtaining low cost in high voltage electrical splices is the reliable insulation of those splices. FIG. 44 shows the compliant insulated threaded coupler 1310 positioned so that the conductors 1130 are exposed so that they can be spliced. Once the electrical splice is made, coupler 1310 is rotated a sufficient number of turns to cause its threads to move it from left to right in FIG. 44 over threads 1630 of both adjoining segment modules until it totally covers the splice area, as shown in FIG. 45.

Figure 46:
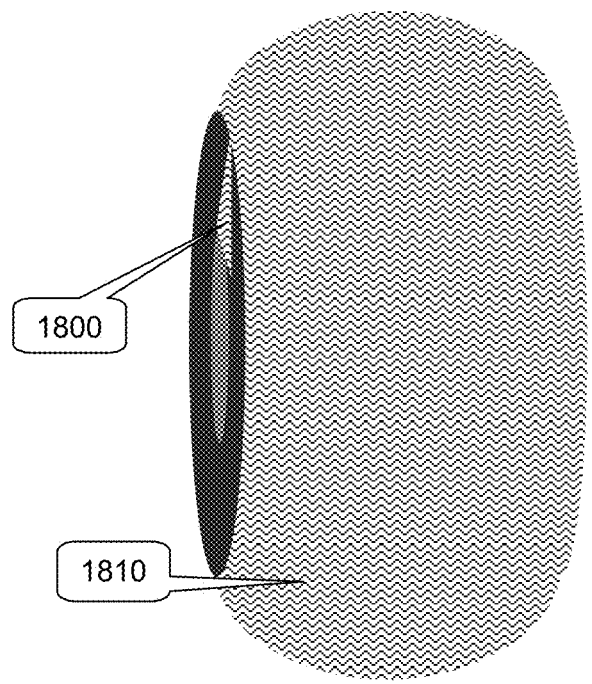
FIG. 46 is a lateral view showing a compliant insulating threaded coupler.
Figure 47:
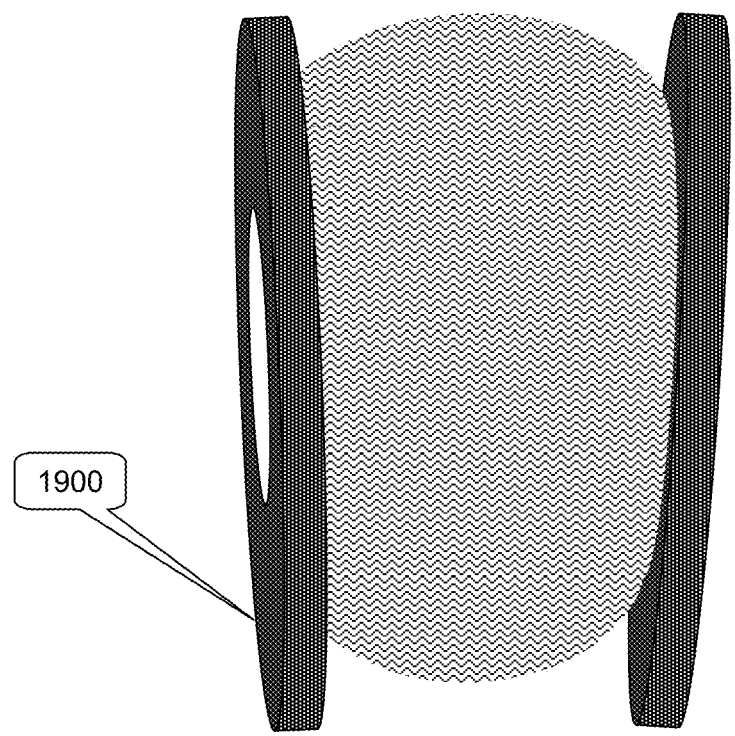
FIG. 47 is a lateral view showing a compliant insulating threaded coupler that is capable of joining segments with an angular displacement.

This coupler, shown in isolation in FIG. 46, with its internal entry thread 1800, can optionally have flanges 1900 either permanently or temporarily attached to its ends that allow the coupler to be differentially compressed and expanded, as shown in FIG. 47, as it is rotated so as to align the threads on each side with the corresponding threads of that side's primary insulator. This facilitates threading the coupler without chance for cross threading even if the primary insulators are misaligned in angle, laterally, longitudinally, or vertically.

The coupler is made (in a factory under well controlled conditions) from a flexible, electrically insulating material, such as an elastomer 1810, for example silicone rubber, EPDM, EPR, or ethylene/1-octene copolymers (Engage). The durometer of this material can optionally be varied so that it is hard (high durometer, e.g., IRHD hardness of greater than 90 per ASTM D1415) in the thread area and soft (moderate durometer, e.g., IRHD hardness of 45-60) in the bulb area 1700. This will allow for greater angular misalignment with smaller coupler dimensions, and thus less material required, than if the coupler were made only of a harder formulation, for instance.

Figure 50:
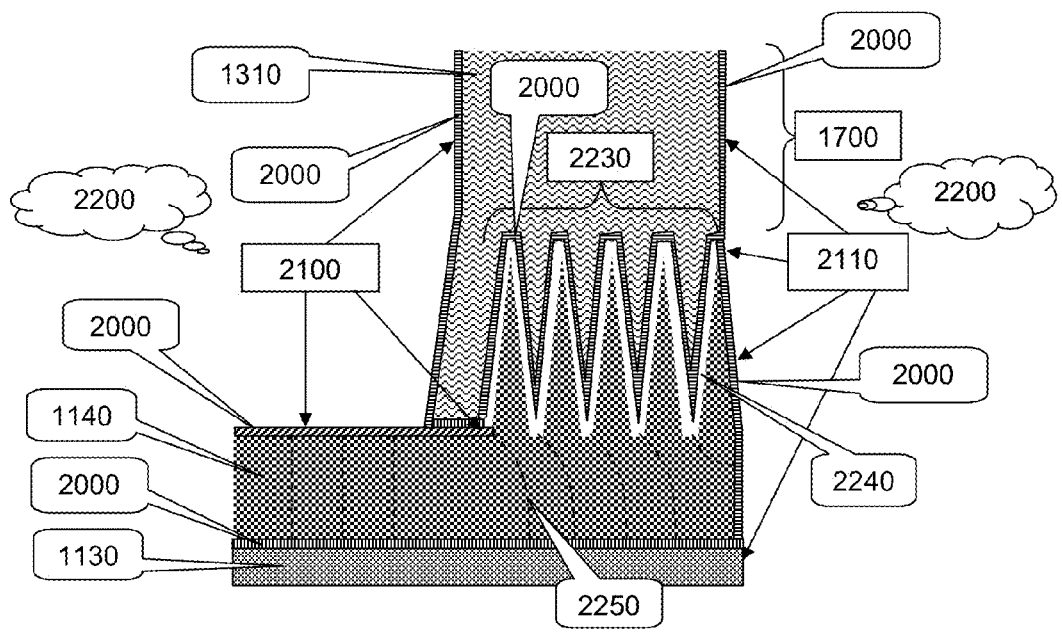
FIG. 50 is a detail of the lateral cross-section of FIG. 49 showing electric fields in the insulation within the joint area.

The entire (inner and outer) surface 1620 of the coupler, including the threads, is treated to be semiconductive. Since the inner surface of the coupler's bulb 1700 is connected electrically to the semiconductive layer on the outermost thread of the primary insulator 1140, as shown in FIG. 50, it is held at the conductor's electrical potential 2110 (+ or −800 kVDC, for instance). Likewise the outer surface of the bulb 2100 is held at ground potential, since it is in contact with the semiconductive layer on the outside of the primary conductor, and that is grounded (at 0 VDC) through the supports and rigid vessel 1150, as shown in FIG. 39.

This potential difference between the inside and outside of the bulb induces a current through the portion of the semiconductive layer that covers the threads. This current creates a quasi-uniform electric field 2250 over the region 2230 that follows the gap 2240 between threads of the primary insulator and the threads of the coupler. In addition to air, this gap can be filled with another gas, a dielectric grease, a dielectric gel, etc. Roughly halfway through the threads 2120 the voltage will be one-half of the conductor potential. As stated above, the path length along this gap is set to be such that the voltage gradient is smaller than the safe working dielectric strength of the material filling gap 2240. Since the surface is conductive, there won't be an inhomogeneous buildup of charge across it, as can happen on an insulator. Any foreign particles in the gap between threads thus will not initiate discharge events.

Figure 55:
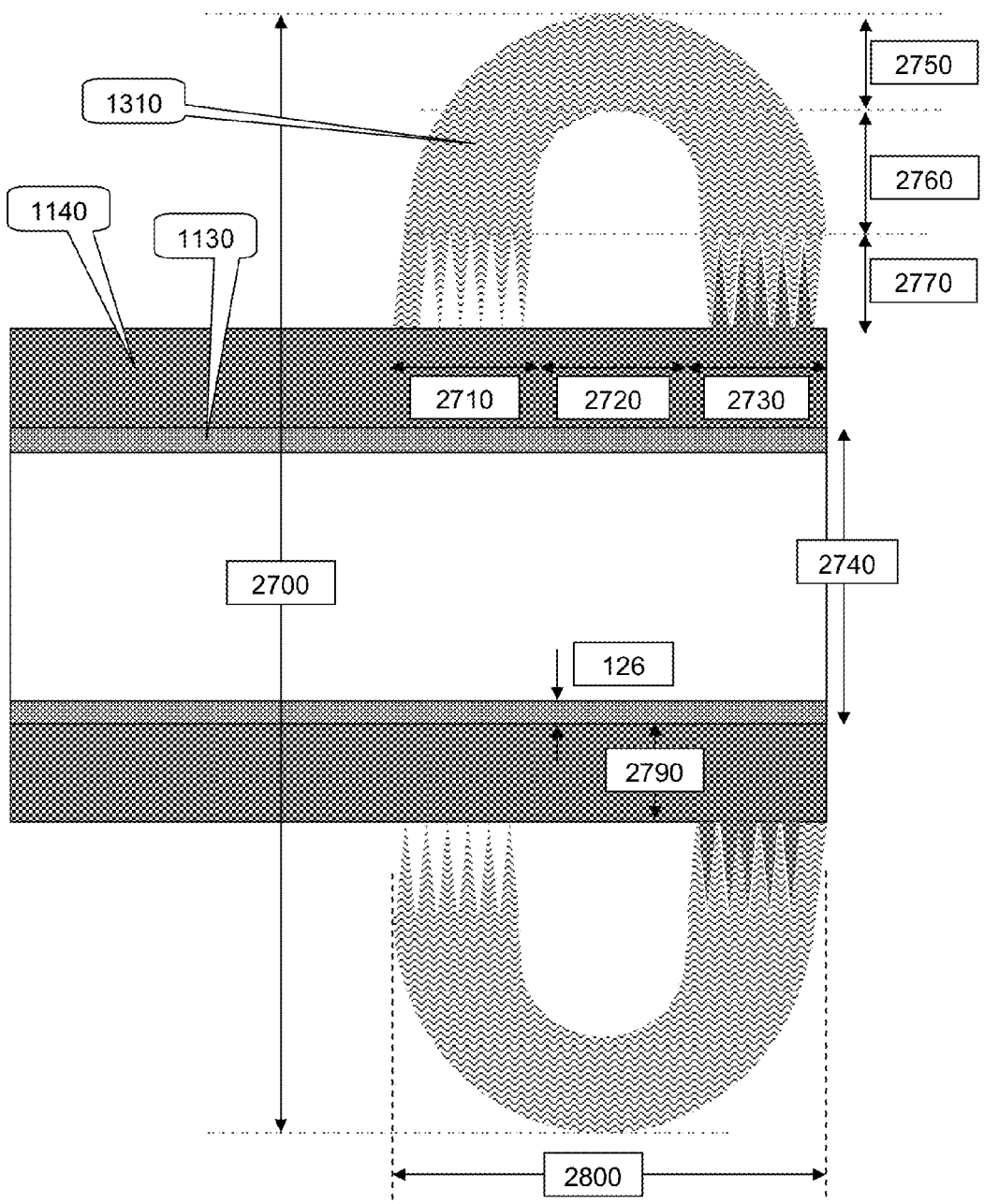
FIG. 55 is a lateral view cross section of the insulation for a splice, showing representative dimensions.

Using the coupler dimensions for a transmission line with 1% loss per 1,000 km at +/−800 kVDC, thus in FIG. 55 2700=115 cm, 2710=15 cm, 2720=15 cm, 2730=15 cm, 2740=30 cm, 2750=10 cm, 2760=10 cm, 2770=10 cm, 126=2.5 cm, 2790=10 cm, and 2800=45 cm, a sheet resistivity of $3\times10^{12}$ ohms per square will give a current flow of 1 microampere, which will produce an inconsequential power loss of 0.8 watts per coupler, independent of the current being carried by the conductors (as long as they are at + or −800 kVDC).

The inside and outside threads of the coupler can be sized to create an airtight seal with the threads on the primary insulators. This would prevent pressure changes, for instance, from forcing air flow, and thus potentially particulates, through the region where there is an electrical field.

Figure 49:
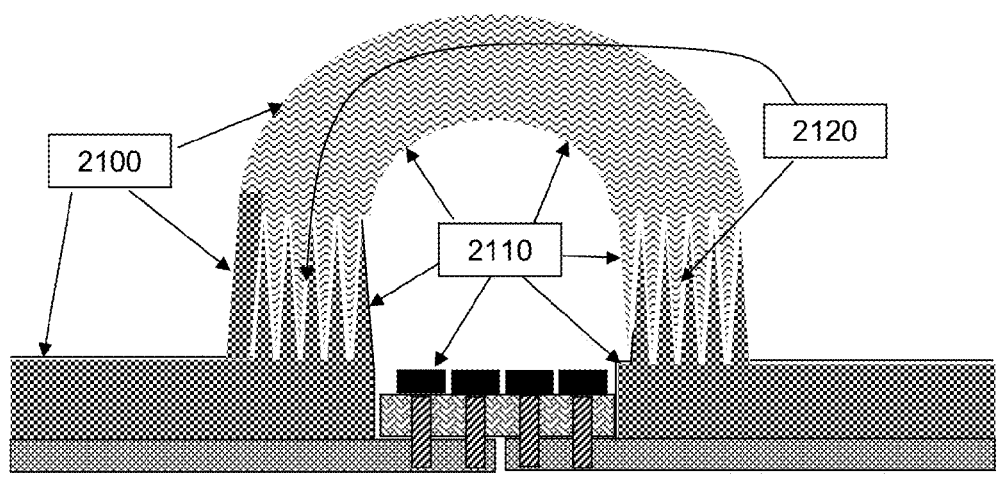
FIG. 49 is a lateral cross-section view showing electrical potentials in the joint area.

The inside of the bulb 1700 of the coupler may optionally be coated with a sticky substance. If there are any particulates floating in the junction space, they will adhere to this substance should they contact it, and no longer be a potential discharge-nucleating site. As it is, there is no potential gradient (electrical field) 2200 within the bulb, as it and the conductor are all at the same electrical potential 2110 (+ or −800 kVDC, for example), as shown in FIG. 49. Likewise, there is no potential gradient 2200 at the outer bulb surface, where everything is at ground potential 2100.

Figure 69:
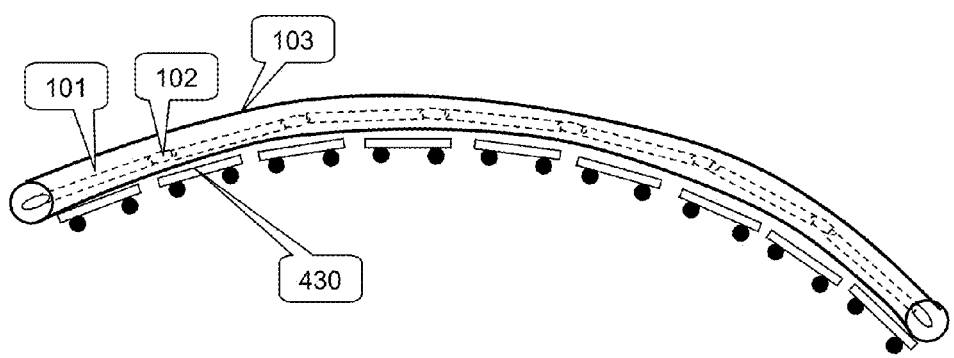
FIG. 69 shows elpipe transport by railroad.

One economically advantageous option for installation of elpipes involves transporting long pieces of elpipe from a factory to an installation corridor beside a railroad track by train. This option may involve longer segment modules in principle, or alternatively the segment modules may not be longer, but the assembly of these modules in a factory may reduce costs substantially. In this scenario, the maintenance vaults, if used at all, would be used to splice the train-transported segments rather than to field-assemble the elpipe, which would be train-transported to the site as an integrated elpipe/conduit unit that would be placed beside the tracks or into a trench by coordinated unloading cranes (see FIG. 69). A long piece of assembled elpipe, involving many segment modules 101 and many splice modules 102, but only one piece of conduit 103 is carried on a train consisting of many rail cars 430 to an installation site which is either a trench or a corridor beside the railroad tracks. One example of such a corridor could comprise a railroad line, and the elpipe could be installed above ground, adjacent to the rail lines.

Figure 70:
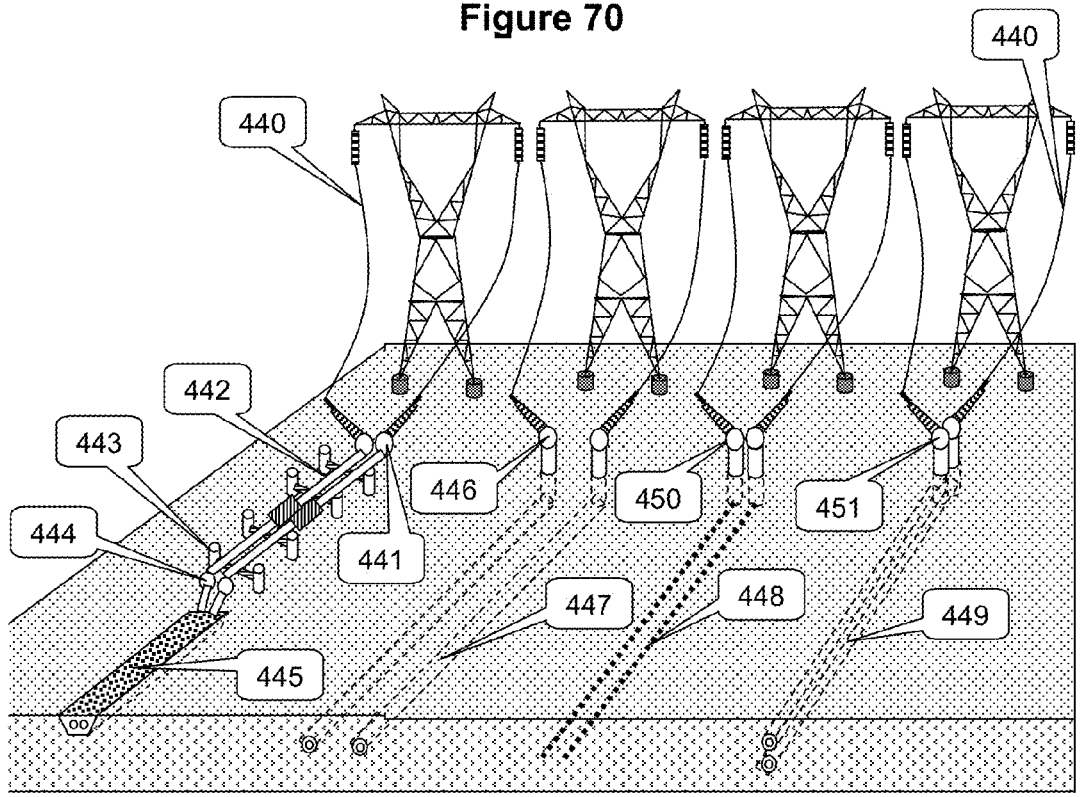
FIG. 70 shows HVDC grid transmission components.

The elpipes can be used as components of an HVDC grid (FIG. 70). The HVDC grid will likely include one or more of overhead power lines 440, underground cables 448, gas insulated lines 449, above ground elpipes 442 (which are supported on short pylons 443), flush mounted elpipes 445, and fully buried elpipes 447. There may be instances where it is necessary to transition from one type of transmission line to another, and FIG. 70 shows some of these, for example 441 is a transition from an overhead line to an above ground elpipe; 444 is a transition from an above-ground elpipe to a flush-mount elpipe; 446 is a transition from an overhead line to a fully underground elpipe; 450 is a transition from an overhead line to an underground cable; and 451 is a transition from an overhead line to a fully underground gas insulated line (GIL). All the other interconnections between different types of HVDC transmission lines not specifically enumerated and shown in FIG. 70 may also be components of the HVDC grid, as will circuit breakers, AC/DC converters, high frequency filters, etcetera.

ACRONYMS USED IN THE DESCRIPTION

AC means alternating current
BMC means bulk molding compound
BR means butadiene rubber
CPV means Contaminants, Protrusions, or Voids
DC means direct current
EPDM means ethylene-propene-diene monomer
EPR means ethylene-propene rubber
ENB means ethylidene norbornene
FRP means fiber-reinforced polymer;
GC means gas chromatography
GIL means gas insulated line
GW means gigawatts
HTS means high temperature superconducting
HVDC means high voltage direct current. As used herein, HVDC refers to voltages above 200 kilovolts (kV)
IR means isoprene rubber
kV means kilovolts
LCP means liquid crystal polymers
MIND means mass-impregnated, non-draining insulation
NR means natural rubber
PBT means polybutylene terephthalate
PPE means polyphenylene ether (sometimes known also as polyphenylene oxide PPO)
PPS means polyphenylene sulfide
RIM means reaction injection molding
SBR stands for styrene-butadiene rubber
SBS means styrene butadiene styrene
SEBS means styrene ethylene-butene styrene
SEPS means styrene ethylene-propene styrene
SIS means styrene isoprene styrene
SMC means sheet molding compound
TCE means thermal coefficient of expansion
TPE means thermoplastic elastomer
TPU means thermoplastic polyurethane
XLPE means crosslinked polyethylene
PTFE means tetrafluoroethylene
PFA means tetrafluoroethylene/perfluorovinylether copolymers
FEP means perfluoro(ethylene-propylene copolymers
PEEK means poly(etheretherketone)

REFERENCE NUMERALS USED IN THE DESCRIPTION

100 Transmission line
101 Elpipe segment module
102 Elpipe splice module
103 Conduit
104 Radius of curvature of innermost point of conduit
105 Inner diameter of conduit
106 Segment length
110 Extruded pipe conductor, circularly cylindrical cross-section
111 Extruded pipe conductor, elliptically cylindrical cross-section
112 Straight hollow keystone conductor with circular cross-section
113 Elliptical-shaped hollow conductor
114 Helically twisted hollow keystone conductor
115 Extruded solid curved conductor wedge
116 Strip-cast solid conductor wedge
117 Cylindrical conductor with keystone voids
118 Keystone void
119 Hollow core of complex circular extrusion
120 Outside diameter of conductor
121 Outer wall thickness
122 Rib subtended angle
123 Void height
124 Central cylinder wall thickness
125 Extruded hollow conductor wedge
126 Conductor wall thickness
127 Hollow core
128 Octagonal hollow keystone conductor made from strip-cast wedges
129 Conductive elastomer layer that is attached to the inside of elastomeric pipe-shaped insulator
130 Conductive elastomer layer that is attached to the outside of elastomeric pipe-shaped insulator
131 Pipe-shaped insulator that is a biaxially oriented elastomer in the middle of the segment module
132 Splice transition conductor with square end
133 End cap insulator
140 Diameter of ends insulated conductor module
141 Diameter of middle of insulated conductor module
150 Volume filled by sodium
151 Vessel
152 End plate 153 Connection rod
154 Volume compensation device
155 Conductor length
156 Sodium fill hole
157 Connection rod hole
158 Pressure inside the gas of volume compensation device
159 Vacuum port
173 End cap for multiple keystone cavities
190 Solid aluminum wedge
191 Gas-filled wedge
192 Sodium-filled wedge
193 Gas-filled core
194 Conductor with solid aluminum, sodium-filled, and gas-filled keystone wedges
211 Pipe-shaped conductor, aluminum, with square end
212 Conductor inner diameter
213 Pipe-shaped conductor, aluminum, with chamfered end
214 Junction lead-in
216 Outer diameter of transition end
217 Copper insert with right-hand internal threads
218 Threads
219 Copper insert with left-hand internal threads
252 Square end of pipe-shaped conductor
253 Square end of splice-transition conductor
254 Female chamfer
255 Male chamfer
256 Splice transition conductor with chamfered end
257 End of elpipe segment module
261 Rotation
271 Elastomeric tube, not stressed
272 Slight bulge for outermost snap-fit end cap insulator (the one that snaps over the biaxially oriented elastomer to hold it in place)
273 Lubrication
274 Roller that is driven to pull elastomer tube onto segment module conductor
275 Rigid pipe-shaped insulator; could be a plastic, ceramic, or glass pipe
276 Force exerted on segment by rollers
280 End cap insulation (attached with adhesive)
281 Inner snap-fit end cap insulation transition conductor
282 Insulation transition conductor underneath the overlapping elastomeric pipe-shaped insulator
290 Hard insulating cones
291 Elastomeric O-rings
292 Elastomer gel cone designed to nest with hard cones 290
293 Fiber reinforced elastomer hose or pipe (which may be plastic or metal)
295 Dielectric fluid, used in interstices portion of conical stacked composite insulation (FIG. 32, FIG. 33, FIG. 34)
296 High strength elastomer layer that is bonded on each side to a hard conical insulator.
297 Semiconducting and or current limiting (varistor) coating on hard ceramic cone inner surface of conical insulating cones
298 Conductive point of contact between innermost edge of hard conical insulator (coated with the semiconductive or varistor layer 297) and high voltage conductor 211
300 Wheels in the form of a roller harness to support elpipe segment module (not powered)
301 Spring mount for wheels to hold tension against the conduit walls
311 Seating bump on elpipe splice transition conductor
312 Depression on elpipe splice transition conductor
313 Seating bump on inner end-cap insulator
314 Splice transition conductor with depressions and bumps
317 Pipe-shaped insulator with skived ends
318 Outer support end cap
319 High dielectric strength grease
320 Inner end-cap insulator
321 Inner surface of inner end-cap insulator
330 Sodium inside bag
331 Fill hole for sodium
332 Protective shell
333 Hard plastic mating surface
334 Inner bag
335 Area of inner bag exposed to needles
336 Insulation overlap
337 Perforating end-segment type of splice transition conductor
338 Electrically conductive needles
339 Inner insulation collar
340 Outer insulation collar
345 Heat pipe
346 Finned heat radiator
347 Fill gas
348 Heat pipe extension beyond splice transition conductor
380 Wheels on powered elpipe carriage module
381 Reversible variable speed and variable torque motor
382 Brake
383 Inclinometer
384 Torque load cell on wheel
385 Load cell between segment module and splice module
386 Control module
387 Intranet connection
388 Power cable
401 Sand/gravel backfill
402 Wall
403 Clean room working area
405 Support rail
406 Lid of maintenance vault
407 Half-round conduit
408 Inflatable seal
409 Floor of maintenance vault
410 Forced-air filter
411 Truck
412 Storage of elpipe module segments
413 Crane
420 Ordinary maintenance vault
421 Conduit junction/maintenance vault
422 Side-track conduit
425 Overlapping insulation collar
426 Necked-down region
427 Copper rod, right-hand threaded
428 Copper rod, left-hand threaded
430 Rail car
440 Overhead HVDC power line
441 Transition to above-ground elpipe
442 Above-ground elpipe
443 Supports for above-ground elpipe
444 Transition from above-ground elpipe to flush-mount elpipe
445 Flush-mount elpipe surface installation
446 Transition to fully underground elpipe
447 Fully underground elpipe
448 Underground HVDC cable
449 Underground HVDC GIL
450 Overhead to HVDC underground HVDC cable
451 Overhead to HVDC GIL
460 Conductor with spirally wound insulator
461 Insulation layer 1
462 Insulation layer 2
463 Insulation layer 3
464 Insulation layer 4

465 Voltage from conductor to outer shield
466 Spirally-wrapped insulation
480 Insulation layer A
481 Resistivity of layer A
482 Thickness of layer A
483 Semiconductor layer B
484 Resistivity of layer B
485 Thickness of layer B
488 Electrical stress smoothing feature
490 Width of layer A
491 Width of layer B
1100 Concrete slab
1110 Heat transfer fluid
1120 Closed-cell compressible foam
1130 Hollow aluminum conductor
1140 Primary insulator
1150 Rigid, liquid tight vessel
1160 Roller support
1170 Supports for rollers
1200 Ambient air
1210 Currents in thermal fluid
1220 Underground
1300 Splice area
1310 Compliant insulating threaded coupler
1320 Electrical expansion joint
1330 Elpipe section
1400 Insulated conductor before splicing
1410 Bulkhead
1500 Removable sealing lid
1510 "U" shaped tray
1520 Sealing flaps
1620 Inner and outer surfaces of the compliant insulating threaded coupler
1630 Molded deep threads
1640 Flexible electrical splice
1650 Bond
1700 Bulb area
1710 Hollow conductor outer surfaces
1800 Thread entry
1810 Insulating elastomer
1900 Flange
2000 Semiconductive layer
2010 Main insulator threads where no semiconductive layer is applied
2100 Electrical potential on exterior of splice area
2110 Electrical potential within splice area
2120 Electrical potential at thread midsection
2200 Region of zero electrical field
2230 Controlled electrical field region
2240 Gap of thin but uncontrolled width
2250 Electric field lines
2300 Cap screw
2310 Conductive braided sleeve
2400 Conductive braided strip
2500 Braided tinned copper sleeve
2510 Mating tapered thread in aluminum wall
2520 Braided copper soldered to bushing and solder impregnated
2530 Taper-threaded bushing with anti-oxidant joint compound on threads
2600 Spanner wrench gripping hole
2610 Bushing
2700 Outer diameter of the insulating coupler
2710 Inner thread length
2720 Bulb inner length
2730 Outer thread length
2740 Conductor outside diameter
2750 Bulb wall thickness at peak
2760 Bulb inner height above threads
2770 Thread depth
2790 Primary insulator thickness
2800 Insulating coupler length
2900 Extruded solid curved conductor wedge with locking system
2901 Female locking slot
2902 Male locking tab prior to mating
2903 Male locking tab after mating
2950 Shell
2960 Liner
3000 Baseplate
3010 Glue
3020 Raised platform
3030 Raised platform O-ring
3040 Insulator seal
3100 Coupling tray
3110 Hole for conductor/insulator
3200 Coupling tray lid
3210 Coupling tray lid locating tab
3220 Locating surface
3230 Lid gasket
3240 Bridge
3250 Dovetail channel
3260 Access port
3270 Plug
3280 Coupling lid bottom
3290 Dovetail channel liner

The invention claimed is:

1. A modular high-voltage direct current electric power transmission system, comprising:
   a plurality of segmented insulated conductors on wheels, wherein the segmented insulated conductors are flexibly linked together;
   wherein at least some of the segmented insulated conductors comprise a plurality of metallic wedges that have a void that contains a volume compensation device and sodium; and
   a track or mating surface on which the wheels run.

2. The modular high-voltage direct current electric power transmission system of claim 1 wherein the metallic wedges comprise a low thermal expansivity alloy; and wherein the majority of the current flowing through each segmented insulated conductor that comprises sodium flows within the sodium.

3. The modular high-voltage direct current electric power transmission system of claim 1 wherein:
   the sodium and the volume compensation device together substantially fill each void;
   the volume compensation device is constructed and arranged to change its volume enough to equal or exceed the total volume change of the sodium over a temperature range; and
   the volume compensation device is under axial tension, and a cross-section of the volume compensation device is nearly constant when the sodium is at the upper limit of the temperature range.

4. The modular high-voltage direct current electric power transmission system of claim 1 in which the segmented insulated conductors each comprise at least one cable segment.

5. The modular high-voltage direct current electric power transmission system of claim 1 wherein at least one of the segmented insulated conductors comprises sodium within a shell and a volume compensation device within the shell, wherein the majority of the current flowing through the segmented insulated conductor flows within the sodium, and wherein the volume compensation device is under axial tension, and a cross-section of the volume compensation device is nearly constant.

6. The modular high-voltage direct current electric power transmission system of claim 1 wherein at least some of the segmented insulated conductors comprise at least one portion of a superconducting insulated cable.

7. The modular high-voltage direct current electric power transmission system of claim 1 wherein at least two segmented insulated conductors are electrically linked through a polymeric elastomer bag, and further comprising a metal with a resistivity less than $10^{-7}$ ohm-m between the at least two segmented insulated conductors.

8. The modular high-voltage direct current electric power transmission system of claim 1 further comprising:
  a plurality of splice insulators that define opposing internally threaded ends; and
  a plurality of module insulator segments that comprise external threads;
  wherein at least one of the spice insulators is coupled to the external threads on two adjacent module insulators segments.

9. The modular high-voltage direct current electric power transmission system of claim 1 further comprising:
  a primary insulator that has a rigid pipe-like construction; and
  a semiconducting lubricant;
  wherein the primary insulator is mechanically attached to the segmented insulated conductor; and
  wherein the semiconducting lubricant is between the primary insulator and the segmented insulated conductor.

10. The modular high-voltage direct current electric power transmission system of claim 9 further comprising at least one biaxially-oriented retractable elastomeric sleeve that is located over the segmented insulated conductor; and
  wherein an interface between the biaxially-oriented retractable elastomeric sleeve and the segmented insulated conductor is dry.

11. The modular high-voltage direct current electric power transmission system of claim 4 wherein at least one cable segment comprises a subsea cable.

12. The modular high-voltage direct current electric power transmission system of claim 10 further comprising:
  an outer elastomer boot; and
  a high dielectric strength grease;
  wherein the outer elastomer boot overlaps a portion of the biaxially-oriented retractable elastomeric sleeve; and
  wherein the high dielectric strength grease is located between the biaxially-oriented retractable elastomeric sleeve and the outer elastomer boot.

13. The modular high-voltage direct current electric power transmission system of claim 1 further comprising a containment system, wherein the wheels are located between the insulated conductors and the containment system.

14. The modular high-voltage direct current electric power transmission system of claim 1 wherein the conductor insulation comprises a spirally-wrapped insulation structure, the spirally-wrapped insulation structure comprising at least two layers, wherein at least one of the layers is insulative and at least one of the layers is semiconductive.

15. The modular high-voltage direct current electric power transmission system of claim 14 wherein the semiconductive layer is in the form of a spiral semiconducting path from the segmented insulated conductor to an electrical ground.

16. The modular high-voltage direct current electric power transmission system of claim 1 further comprising:
  at least one generally conical insulator; and
  an elongated containment system for the segmented insulated conductors, the elongated containment system comprising a dielectric fluid;
  wherein there is a distance between the segmented insulated conductors and the elongated containment system;
  wherein the at least one generally conical insulator spans the distance between a first portion of a segmented insulated conductor and the elongated containment system; and
  wherein the dielectric fluid is maintained at a positive pressure and fills the distance where the at least one generally conical insulator does not exist between a second, different portion of the segmented insulated conductor and the elongated containment system.

17. The modular high-voltage direct current electric power transmission system of claim 6 further comprising a cryostat surrounding the superconducting insulated cable.

18. The modular high-voltage direct current electric power transmission system of claim 10 further comprising a lubricant between the biaxially-oriented retractable elastomeric sleeve and the segmented insulated conductor.

19. A modular high-voltage direct current electric power transmission system, comprising:
  a plurality of segment modules, each with a central portion, the central portions comprised of primary conductors that are elongated, generally annular and rigid;
  a plurality of generally annular primary insulators, wherein each of the primary conductors is surrounded by a primary insulator;
  a plurality of compliant conductive electrical splice members each located between and electrically coupled to opposed ends of two primary conductors;
  a plurality of splice insulators, wherein each compliant conductive electrical splice member is surrounded by a splice insulator; and
  a plurality of wheels that are constructed and arranged to support the segment modules.

* * * * *